United States Patent
Ma et al.

(10) Patent No.: US 9,807,644 B2
(45) Date of Patent: Oct. 31, 2017

(54) HIERARCHICAL TRAFFIC DIFFERENTIATION TO HANDLE CONGESTION AND/OR MANAGE USER QUALITY OF EXPERIENCE

(71) Applicant: VID SCALE, INC., Wilmington, DE (US)

(72) Inventors: Liangping Ma, San Diego, CA (US); Samian Kaur, Plymouth Meeting, PA (US); Dimitrios Karampatsis, Reading (GB); Avi Rapaport, Hamitspe (IL); Gregory Sternberg, Mt. Laurel, NJ (US); Yuriy Reznik, San Diego, CA (US); Ariela Zeira, Huntington, NY (US); Weimin Liu, Chatham, NY (US); Naresh Soni, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 74 days.

(21) Appl. No.: 14/376,973

(22) PCT Filed: Feb. 16, 2013

(86) PCT No.: PCT/US2013/026550
§ 371 (c)(1),
(2) Date: Aug. 6, 2014

(87) PCT Pub. No.: WO2013/123467
PCT Pub. Date: Aug. 22, 2013

(65) Prior Publication Data
US 2015/0009826 A1    Jan. 8, 2015

Related U.S. Application Data

(60) Provisional application No. 61/754,939, filed on Jan. 21, 2013, provisional application No. 61/747,200,
(Continued)

(51) Int. Cl.
*H04W 28/02* (2009.01)
*H04W 72/12* (2009.01)
(Continued)

(52) U.S. Cl.
CPC ..... *H04W 28/0289* (2013.01); *H04L 47/2408* (2013.01); *H04W 28/0263* (2013.01);
(Continued)

(58) Field of Classification Search
CPC ............... H04L 47/2408; H04L 47/32; H04W 28/0263; H04W 28/0268; H04W 28/0289;
(Continued)

(56) References Cited

U.S. PATENT DOCUMENTS

| | | | |
|---|---|---|---|
| 6,865,185 B1 * | 3/2005 | Patel | H04L 47/12 370/310 |
| 6,937,566 B1 | 8/2005 | Forslow | |

(Continued)

FOREIGN PATENT DOCUMENTS

| | | |
|---|---|---|
| CN | 102026303 | 4/2011 |
| CN | 102300264 | 12/2011 |

(Continued)

OTHER PUBLICATIONS

"3rd Generation Partnership Project, Technical Specification Group Services and System Aspects, Feasibility study on user plane congestion management (Release 12)", 3GPP TR 22.805 V12.1.0, Dec. 14, 2012, 36 pages.

(Continued)

*Primary Examiner* — Mohamed Kamara
(74) *Attorney, Agent, or Firm* — Quasim A. Shah

(57) ABSTRACT

Methods, apparatuses and systems for performing hierarchical traffic differentiation and/or employing hierarchical traffic differentiation are provided. These methods, apparatuses and systems may be implemented to, for example, handle
(Continued)

congestion and/or to manage user quality of experience (QoE). Performing the hierarchical traffic differentiation may include differentiating or otherwise classifying (collectively "differentiating") traffic mapped to, or within, a bearer formed in accordance with a QoS class into multiple traffic sub-classes. Employing the hierarchical traffic differentiation may include scheduling and/or policing (e.g., filtering) the differentiated traffic for transmission based on a prioritization of, and/or policy for managing, the multiple traffic sub-classes.

34 Claims, 21 Drawing Sheets

Related U.S. Application Data filed on Dec. 28, 2012, provisional application No. 61/600,568, filed on Feb. 17, 2012.

(51) Int. Cl.
*H04L 12/851* (2013.01)
*H04L 12/823* (2013.01)
*H04W 88/16* (2009.01)

(52) U.S. Cl.
CPC ... *H04W 28/0268* (2013.01); *H04W 72/1242* (2013.01); *H04L 47/32* (2013.01); *H04W 88/16* (2013.01)

(58) Field of Classification Search
CPC .. H04W 72/1242; H04W 88/16; H04W 28/02
USPC ....... 370/229, 230, 233, 235–236, 310, 336, 370/328–32; 709/223–225
See application file for complete search history.

(56) References Cited

U.S. PATENT DOCUMENTS

| | | | |
|---|---|---|---|
| 7,324,553 B1 | 1/2008 | Varier et al. | |
| 8,130,655 B2 | 3/2012 | Foottit et al. | |
| 8,346,225 B2* | 1/2013 | Raleigh | H04W 28/0268 370/230 |
| 8,416,690 B2 | 4/2013 | Zhao et al. | |
| 8,681,739 B1 | 3/2014 | Zhao et al. | |
| 8,743,829 B2 | 6/2014 | Guan et al. | |
| 9,014,116 B2* | 4/2015 | Sridhar | H04W 28/0289 370/329 |
| 9,197,378 B2 | 11/2015 | Ikeda et al. | |
| 9,225,726 B2 | 12/2015 | Liang et al. | |
| 9,585,054 B2 | 2/2017 | Ahmad et al. | |
| 2002/0114305 A1 | 8/2002 | Oyama et al. | |
| 2004/0132436 A1 | 7/2004 | Dupont et al. | |
| 2004/0166835 A1 | 8/2004 | Johansson et al. | |
| 2004/0205752 A1 | 10/2004 | Chou et al. | |
| 2004/0215828 A1 | 10/2004 | Li et al. | |
| 2005/0058131 A1 | 3/2005 | Samuels et al. | |
| 2007/0097926 A1 | 5/2007 | Liu et al. | |
| 2007/0259673 A1* | 11/2007 | Willars | H04W 52/0225 455/453 |
| 2008/0020775 A1 | 1/2008 | Willars | |
| 2008/0212583 A1 | 9/2008 | Rey et al. | |
| 2008/0214189 A1 | 9/2008 | Taaghol | |
| 2009/0069025 A1 | 3/2009 | Pischella | |
| 2009/0253433 A1 | 10/2009 | Voyer et al. | |
| 2009/0279522 A1 | 11/2009 | Leroy et al. | |
| 2009/0300207 A1 | 12/2009 | Giaretta et al. | |
| 2009/0305701 A1 | 12/2009 | Giaretta et al. | |
| 2010/0034089 A1 | 2/2010 | Kovvali et al. | |
| 2010/0040024 A1 | 2/2010 | Wu | |
| 2010/0067400 A1 | 3/2010 | Dolganow et al. | |
| 2010/0080172 A1 | 4/2010 | Jin et al. | |
| 2010/0081444 A1 | 4/2010 | Jin et al. | |
| 2010/0195503 A1 | 8/2010 | Raleigh | |
| 2010/0208698 A1 | 8/2010 | Lu et al. | |
| 2010/0208706 A1 | 8/2010 | Hirano et al. | |
| 2010/0216462 A1 | 8/2010 | Aso et al. | |
| 2010/0216484 A1 | 8/2010 | Zhou et al. | |
| 2011/0007706 A1 | 1/2011 | Shaikh | |
| 2011/0038304 A1 | 2/2011 | Lin et al. | |
| 2011/0044279 A1* | 2/2011 | Johansson | H04W 92/20 370/329 |
| 2011/0055572 A1 | 3/2011 | Vogt et al. | |
| 2011/0090794 A1 | 4/2011 | Cherian et al. | |
| 2011/0103260 A1 | 5/2011 | Jeyatharan et al. | |
| 2011/0158171 A1 | 6/2011 | Centonza et al. | |
| 2011/0170408 A1 | 7/2011 | Furbeck et al. | |
| 2011/0170410 A1 | 7/2011 | Zhao et al. | |
| 2011/0170517 A1 | 7/2011 | Bakker et al. | |
| 2011/0194535 A1 | 8/2011 | Johansson et al. | |
| 2011/0280130 A1 | 11/2011 | Foottit et al. | |
| 2012/0002608 A1 | 1/2012 | Vesterinen et al. | |
| 2012/0030331 A1 | 2/2012 | Karampatsis | |
| 2012/0039175 A1 | 2/2012 | Sridhar et al. | |
| 2012/0044804 A1 | 2/2012 | Rahman et al. | |
| 2012/0069797 A1 | 3/2012 | Lim et al. | |
| 2012/0079559 A1 | 3/2012 | Reznik et al. | |
| 2012/0147750 A1* | 6/2012 | Pelletier | H04W 28/02 370/235 |
| 2012/0178416 A1 | 7/2012 | Miklos et al. | |
| 2012/0188895 A1 | 7/2012 | Punz et al. | |
| 2012/0201137 A1 | 8/2012 | Le Faucheur et al. | |
| 2012/0246325 A1 | 9/2012 | Pancorbo et al. | |
| 2012/0257499 A1* | 10/2012 | Chatterjee | H04W 28/0284 370/232 |
| 2012/0314568 A1* | 12/2012 | Tan | H04W 28/24 370/230 |
| 2012/0324100 A1* | 12/2012 | Tomici | H04L 45/123 709/224 |
| 2012/0327779 A1 | 12/2012 | Gell et al. | |
| 2013/0021916 A1 | 1/2013 | Zhou et al. | |
| 2013/0028193 A1 | 1/2013 | Rommer et al. | |
| 2013/0058275 A1 | 3/2013 | Melia et al. | |
| 2013/0121206 A1 | 5/2013 | Turanyi et al. | |
| 2013/0195204 A1 | 8/2013 | Reznik et al. | |
| 2013/0201824 A1* | 8/2013 | Venkatachalam | H04W 28/12 370/230 |
| 2014/0003391 A1 | 1/2014 | Vesterinen et al. | |
| 2014/0126362 A1 | 5/2014 | Ogura | |
| 2014/0341109 A1 | 11/2014 | Cartmell et al. | |
| 2015/0016299 A1* | 1/2015 | Zhang | H04L 43/028 370/253 |

FOREIGN PATENT DOCUMENTS

| | | |
|---|---|---|
| EP | 2170002 | 3/2010 |
| EP | 2192799 | 6/2010 |
| EP | 2448194 | 5/2012 |
| JP | 2006-101400 | 4/2006 |
| JP | 2011-525319 | 9/2011 |
| JP | 2013-530640 | 7/2013 |
| WO | WO-2004/084500 | 9/2004 |
| WO | WO-2010/022374 | 2/2010 |
| WO | WO-2010/072652 A1 | 7/2010 |
| WO | WO-2010/080966 | 7/2010 |
| WO | WO-2010/102652 | 9/2010 |
| WO | WO-2010/121191 | 10/2010 |
| WO | WO2011/025438 | 3/2011 |
| WO | WO-2011/039985 | 4/2011 |
| WO | WO-2011/069096 A2 | 6/2011 |
| WO | WO-2011/149533 | 12/2011 |
| WO | WO-2012/018824 | 2/2012 |
| WO | WO-2012/033774 A2 | 3/2012 |

OTHER PUBLICATIONS

"3rd Generation Partnership Project; Technical Specification Group Core Network and Terminals; Access to the 3GPP Evolved Packet Core (EPC)", 3GPP TS 24.302 10.3.1, Apr. 2011, 57 pages.

(56) References Cited

OTHER PUBLICATIONS

"3rd Generation Partnership Project; Technical Specification Group Core Network and Terminals; IP multimedia call control protocol based on Session Initiation Protocol (SIP) and Session Description Protocol (SDP); Stage 3 (Release 10)", 3GPP TS 24.229 V10.3.0, Mar. 2011, 702 pages.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.3.0, Jun. 2012, 335 pages.

"3rd Generation Partnership Project; Technical Specification Group Core Network and Terminals; User Data Convergence (UDC); Technical realization and information flows; Stage 2 (Release 10)", 3GPP TS 23.335 V10.0.0, Mar. 2011, 39 pages.

"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.5.0, Mar. 2012, 255 pages.

"3rd Generation Partnership Project; Technical Specification Group SA; Feasibility Study on User Plane Congestion Management (Release 12)", 3GPP TR 22.805 V0.3.1, May 2012, 32 pages.

"3rd Generation Partnership Project; Technical Specification Group Services and System Aspects ; IP flow mobility and seamless Wireless Local Area Network (WLAN) offload; Stage 2 (Release 10)", 3GPP TS 23.261 V10.0.0, Jun. 10, 2010, 20 pages.

"3rd Generation Partnership Project; Technical Specification Group Services and System Aspects; Architecture enhancements for non-3GPP accesses (Release 10)", 3GPP TS 23.402 V10.3.0, Mar. 2011, 227 pages.

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0, Sep. 2010, 22 pages.

"3rd Generation Partnership Project; Technical Specification Group Services and System Aspects; IP Multimedia Subsystem (IMS); Stage 2 (Release 11)", 3GPP TS 23.228 V11.0.0, Mar. 2011, 272 pages.

"3rd Generation Partnership Project; Technical Specification Group Services and System Aspects; Multi access PDN connectivity and IP flow mobility (Release 9)", 3GPP TR 23.861 V1.3.0, Sep. 2009, 49 pages.

"3rd Generation Partnership Project; Technical Specification Group Services and System Aspects; Policy and charging control architecture (Release 11)", 3GPP TS 23.203 V11.1.0, Mar. 2011, 136 pages.

"3rd Generation Partnership Project; Technical Specification Group Services and System Aspects; Study on Policy solutions and enhancements (Release 10)", 3GPP TR 23.813 V0.5.0, Feb. 2011, 40 pages.

"International Search Report and the Written Opinion of the International Searching Authority", International Application No. PCT/US2013/026550, May 21, 2013, 10 pages.

"International Search Report and Written Opinion of the International Searching Authority", International Application No. PCT/US2014/011099, Apr. 15, 2014, 12 pages.

"International Search Report and Written Opinion of the International Searching Authority", International Application No. PCT/US2011/050577, Sep. 19, 2012, 18 pages.

"International Search Report and Written Opinion of the International Searching Authority", International Application No. PCT/US2012/033560, Jul. 19, 2012, 14 pages.

"Invitation to Pay Additional Fees and Partial International Search", International Application No. PCT/US2011/050577, Jan. 19, 2012, 6 pages.

"Invitation to Pay Additional Fees and Partial International Search", International Application No. PCT/US2013/051029, Nov. 27, 2013, 7 pages.

"U.S. Appl. No. 12/684,227", filed Jan. 8, 2010.

"Written Opinion of the International Preliminary Examining Authority", International Application No. PCT/US2013/026550, Jun. 3, 2014, 10 pages.

Alcatel-Lucent, "Policy based terminal triggered, ANDSF decided access selection", 3GPP TSG SA WG2 Architecture—S2#63, S2-081658, Athens, Greece, Feb. 18, 2008, 6 pages.

ITU-T, "Opinion model for video-telephony applications", ITU-T Recommendation G.1070, Apr. 2007, 28 pages.

Swetina, Joerg, et al., "Use Cases for User Plane Congestion Management (UPCON)", 3GPP Tdoc S1-113149, Sep. 6, 2011, 11 pages.

Tansir, Ahmed, et al., "Multi Access Data Network Connectivity and IP Flow Mobility in Evolved Packet System (EPS)", Wireless Communications and Networking Conference (WCNC), 2010 IEEE, Piscataway, NJ; USA, Apr. 18, 2010, 6 pages.

"United States Office Action", United States Office Action U.S. Appl. No. 13/446,685, Jan. 2, 2015, 16 pages.

"3rd Generation Partnership Project; Technical Specification Group Core Network and Terminals; Policy and Charging Control over Gx/Sd reference point (Release 11)", 3GPP TS 29.212 V11.1.0, Jun. 2011, 152 pages.

"3rd Generation Partnership Project; Technical Specification Group Services and System Aspects; Policy and charging control architecture (Release 11)", 3GPP TS 23.203 V11.3.0, Sep. 2011, 167 pages.

"3rd Generation Partnership Project 2; cdma2000 Packet Data Services; Wireless Local Area Network (WLAN) Interworking Access to Operator Service and Mobility", 3GPP2 TS X.S0028-200-0 V1.0, Mar. 2007, 56 pages.

"3rd Generation Partnership Project; Technical Specification Group Core Network and Terminals; Access Network Discovery and Selection Function (ANDSF) Management Object (MO) (Release 10)", 3GPP TS 24.312 10.2.1, Apr. 2011, 153 pages.

"3rd Generation Partnership Project; Technical Specification Group Core Network and Terminals; Access Network Discovery and Selection Function (ANDSF) Management Object (MO) (Release 11)", 3GPP TS 24.312 V11.5.0, Dec. 2012, 173 pages.

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. 2011, 155 pages.

"3rd Generation Partnership Project; Technical Specification Group Core Network and Terminals; Access to the 3GPP Evolved Packet Core (EPC) via non-3GPP access networks; Stage 3 (Release 10)", 3GPP TS 24.302 V10.7.0, Mar. 2012, 58 pages.

"3rd Generation Partnership Project; Technical Specification Group Core Network and Terminals; Access to the 3GPP Evolved Packet Core (EPC) via non-3GPP access networks; Stage 3 (Release 11)", 3GPP TS 24.302 V11.3.0, Jun. 2012, 60 pages.

"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0, Sep. 2011, 50 pages.

"3rd Generation Partnership Project; Technical Specification Group Core Network and Terminals; Access to the 3GPP Evolved Packet Core (EPC) via non-3GPP access networks; Stage 3 (Release 9)", 3GPP TS 24.302 V9.7.0, Sep. 2011, 53 pages.

"3rd Generation Partnership Project; Technical Specification Group Core Network and Terminals; Access to the 3GPPEvolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.7.0, Jun. 2012, 322 pages.

"3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.10.0, Jun. 2011, 277 pages.

"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.10.0, Jun. 2012, 300 pages.

(56) References Cited

OTHER PUBLICATIONS

"3rd Generation Partnership Project; Technical Specification Group Core Network and Terminals; Non-Access-Stratum (NAS) protocol for Evolved Packet System (EPS); Stage 3 (Release 9)", 3GPP TS 24.301 V9.11.0, Mar. 2013, 300 pages.
"3rd Generation Partnership Project; Technical Specification Group Core Network and Terminals; Policy and Charging Control over Gx/Sd reference point (Release 11)", 3GPP TS 29.212 V11.1.0, Jun. 2011, 147 pages.
"3rd Generation Partnership Project; Technical Specification Group Core Network and Terminals; Proxy Mobile IPv6 (PMIPv6) based Mobility and Tunnelling protocols; Stage 3 (Release 10)", 3GPP TS 29.275 V10.2.0, Jun. 2011, 72 pages.
"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.5.0, Jun. 2011, 71 pages.
"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.2.0, Jun. 2010, 74 pages.
"3rd Generation Partnership Project; Technical Specification Group Core Network and Terminals; User Data Convergence (UDC); Technical realization and information flows; Stage 2 (Release 11)", 3GPP TS 23.335 V11.0.0, Sep. 2012, 39 pages.
"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.6.0, Jun. 2012, 255 pages.
"3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.0.0, Jun. 2012, 258 pages.
"3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0, Jun. 2010, 217 pages.
"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413 V9.8.0, Dec. 2011, 243 pages.
"3rd Generation Partnership Project; Technical Specification Group Radio Access Network; Physical layer; Measurements (FDD) (Release 10)", 3GPP TS 25.215 V10.0.0, Mar. 2011, 23 pages.
"3rd Generation Partnership Project; Technical Specification Group SA; Feasibility Study on User Plane Congestion Management (Release 12)", 3GPP TR 22.805 V1.0.0, Jun. 2012, 32 pages.
"3rd Generation Partnership Project; Technical Specification Group Services and System Aspects; 3GPP System Architecture Evolution (SAE); Security aspects of non-3GPP accesses (Release 10)", 3GPP TS 33.402 V10.3.0, Mar. 2012, 52 pages.
"3rd Generation Partnership Project; Technical Specification Group Services and System Aspects; 3GPP system to Wireless Local Area Network (WLAN) interworking; System description (Release 9)", 3GPP TS 23.234 V9.0.0, Dec. 2009, 84 pages.
"3rd Generation Partnership Project; Technical Specification Group Services and System Aspects; Architecture enhancements for non-3GPP accesses (Release 10)", 3GPP TS 23.402 V10.1.0, Sep. 2010, 227 pages.
"3rd Generation Partnership Project; Technical Specification Group Services and System Aspects; Architecture enhancements for non-3GPP accesses (Release 10)", 3GPP TS 23.402 V10.2.1, Jan. 2011, 228 pages.
"3rd Generation Partnership Project; Technical Specification Group Services and System Aspects; Architecture enhancements for non-3GPP accesses (Release 10)", 3GPP TS 23.402 V10.7.0, Mar. 2012, 232 pages.
"3rd Generation Partnership Project; Technical Specification Group Services and System Aspects; Architecture enhancements for non-3GPP accesses (Release 10)", 3GPP TS 23.402 V10.8.0, Sep. 2012, 232 pages.
"3rd Generation Partnership Project; Technical Specification Group Services and System Aspects; Architecture enhancements for non-3GPP accesses (Release 11)", 3GPP TS 23.402 V11.3.0, Jun. 2012, 252 pages.
"3rd Generation Partnership Project; Technical Specification Group Services and System Aspects; Architecture enhancements for non-3GPP accesses (Release 8)", 3GPP TS 23.402 V8.10.0, Mar. 2012, 199 pages.
"3rd Generation Partnership Project; Technical Specification Group Services and System Aspects; Architecture enhancements for non-3GPP accesses (Release 9)", 3GPP TS 23.402 V9.5.0, Jun. 2010, 200 pages.
"3rd Generation Partnership Project; Technical Specification Group Services and System Aspects; Architecture enhancements for non-3GPP accesses (Release 9)", 3GPP TS 23.402 V9.12.0, Mar. 2012, 200 pages.
"3rd Generation Partnership Project; Technical Specification Group Services and System Aspects; Data Identification in ANDSF (DIDA) (Release 11)", 3GPP TR 23.8xy V0.1.0, Apr. 2011, 8 pages.
"3rd Generation Partnership Project; Technical Specification Group Services and System Aspects; Feasibility study on 3GPP system to Wireless Local Area Network (WLAN) interworking (Release 9)", 3GPP TR 22.934 V9.0.0, Dec. 2009, 30 pages.
"3rd Generation Partnership Project; Technical Specification Group Services and System Aspects; Feasibility study on 3GPP system to Wireless Local Area Network (WLAN) interworking (Release 9)", 3GPP TR 22.934 V9.1.0, Sep. 2010, 30 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.4.0, Jun. 2011, 281 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pages.
"3rd Generation Partnership Project; Technical Specification Group Services and System Aspects; General Packet Radio Service (GPRS); Service description; Stage 2 (Release 9)", 3GPP TS 23.060 V9.5.0, Jun. 2010, 298 pages.
"3rd Generation Partnership Project; Technical Specification Group Services and System Aspects; Generic Authentication Architecture (GAA); Access to network application functions using Hypertext Transfer Protocol over Transport Layer Security (HTTPS)", 3GPP TS 33.222 V10.0.1, Dec. 2011, 22 pages.
"3rd Generation Partnership Project; Technical Specification Group Services and System Aspects; Generic Authentication Architecture (GAA); Generic Bootstrapping Architecture (GBA) (Release 10)", 3GPP TS 33.220 V10.1.0, Mar. 2012, 75 pages.
"3rd Generation Partnership Project; Technical Specification Group Services and System Aspects; Generic Authentication Architecture (GAA); Support for subscriber certificates (Release 10)", 3GPP TS 33.221 V10.0.0, Mar. 2011, 25 pages.
"3rd Generation Partnership Project; Technical Specification Group Services and System Aspects; IP flow mobility and seamless Wireless Local Area Network (WLAN) offload; Stage 2 (Release 10)", 3GPP TS 23.261 V10.2.0, Mar. 2012, 22 pages.
"3rd Generation Partnership Project; Technical Specification Group Services and System Aspects; IP flow mobility and seamless Wireless Local Area Network (WLAN) offload; Stage 2 (Release 11)", 3GPP TS 23.261 V11.0.0, Sep. 2012, 22 pages.

(56) References Cited

OTHER PUBLICATIONS

"3rd Generation Partnership Project; Technical Specification Group Services and System Aspects; IP Flow Mobility and seamless WLAN offload; Stage 2 (Release 10)", 3GPP TS 23.261 V0.3.0, Mar. 2010, 20 pages.
"3rd Generation Partnership Project; Technical Specification Group Services and System Aspects; Mobility between 3GPP-Wireless Local Area Network (WLAN) interworking and 3GPP systems (Release 10)", 3GPP TS 23.327 V10.0.0, Mar. 2011, 27 pages.
"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0, Dec. 2009, 27 pages.
"3rd Generation Partnership Project; Technical Specification Group Services and System Aspects; Network based IP flow mobility (Release 12)", 3GPP TR 23.861 V1.7.0, Nov. 2012, 79 pages.
"3rd Generation Partnership Project; Technical Specification Group Services and System Aspects; Policy and charging control architecture (Release 10)", 3GPP TS 23.203 V10.0.0, Jun. 2010, 126 pages.
"3rd Generation Partnership Project; Technical Specification Group Services and System Aspects; Policy and charging control architecture (Release 10)", 3GPP TS 23.203 V10.7.0, Jun. 2012, 131 pages.
"3rd Generation Partnership Project; Technical Specification Group Services and System Aspects; Policy and charging control architecture (Release 10)", 3GPP TS 23.203 V10.8.0, Sep. 2012, 131 pages.
"3rd Generation Partnership Project; Technical Specification Group Services and System Aspects; Policy and charging control architecture (Release 11)", 3GPP TS 23.203 V11.2.0, Jun. 2011, 142 pages.
"3rd Generation Partnership Project; Technical Specification Group Services and System Aspects; Policy and charging control architecture (Release 7)", 3GPP TS 23.203 V7.14.1, Jul. 2012, 76 pages.
"3rd Generation Partnership Project; Technical Specification Group Services and System Aspects; Policy and charging control architecture (Release 8)", 3GPP TS 23.203 V8.14.0, Jun. 2012, 116 pages.
"3rd Generation Partnership Project; Technical Specification Group Services and System Aspects; Policy and charging control architecture (Release 9)", 3GPP TS 23.203 V9.5.0, Jun. 2010, 123 pages.
"3rd Generation Partnership Project; Technical Specification Group Services and System Aspects; Policy and charging control architecture (Release 9)", 3GPP TS 23.203 V9.12.0, Jun. 2012, 124 pages.
"3rd Generation Partnership Project; Technical Specification Group Services and System Aspects; Study on Policy solutions and enhancements (Release 11)", 3GPP TR 23.813 V11.0.0, Jun. 2011, 41 pages.
"3rd Generation Partnership Project; Technical Specification Group Core Network and Terminals; User Data Convergence (UDC); Technical realization and information flows; Stage 2 (Release 9)", 3GPP TS 23.335 V9.3.0, Dec. 2010, 39 pages.
"3rd Generation Partnership Project; Technical Specification Group Services and System Aspects; Policy and charging control architecture (Release 11)", 3GPP TS 23.203 V11.6.0, Jun. 2012, 177 pages.
"Email Thread Re: [MEXT] Text for Binding Update Race condition issue", Mobile IPv6 Extensions, Apr. 6, 2009, 5 pages.
"International Preliminary Report on Patentability from the International Preliminary Examining Authority", International Application No. PCT/US2014/011099, Jan. 16, 2015, 16 pages.
"International Search Report and Written Opinion of the International Search Authority", International Application No. PCT/US2012/057068, Feb. 8, 2013, 14 pages.
"Invitation to Pay Additional Fees and Partial International Search", International Application No. PCT/US2013/046174, Oct. 10, 2013, 5 pages.

"New WID for Data identification in ANDSF", 3GPP Tdoc SP-110084, 3GPP TSG SA Meeting #51 Kansas City, USA, Mar. 21-23, 2011, 5 pages.
"WID for Study on User plane congestion management", 3GPP Tdoc S2-113383, 3GPP SA WG2 Meeting #85 Naantali, Finland, Jul. 11-15, 2011, 5 pages.
"WID for Study on User plane congestion management", 3GPP Tdoc S2-113752, 3GPP SA WG2 Meeting #85 Naantali, Finland, Jul. 11-15, 2011, 5 pages.
"Written Opinion of the International Preliminary Examining Authority", International Application No. PCT/US2012/057068, Oct. 17, 2013, 7 pages.
Bernardos, C.J., "Proxy Mobile IPv6 Extensions to Support Flow Mobility", draft-bernardos-netext-pmipv6-flowmob-03 (work in progress), Mar. 14, 2011, 20 pages.
China Mobile, "Interface/Network Selection based on UE detected Network Information", 3GPP Tdoc S2-113264; 3GPP SA WG2 Meeting #86, Naantali, Finland, Jul. 11-15, 2011, 2 pages.
China Mobile, et al., "Policy control based on network condition", 3GPP Tdoc S2-105228, 3GPP TSG WG2 Meeting #81, Prague, Czech Republic, Oct. 11-15, 2010, 4 pages.
Das, S., et al., "DHCPv4 and DHCPv6 Options for Access Network Discovery and Selection Function (ANDSF) Discovery", IETF RFC 6153, Feb. 2011, 7 pages.
Huawei, "Discussion on H(e)NB LIPA/SIPTO management requirements", 3GPP TSG-SA5 (Telecom Management) Meeting SA5#72; S5-101780, Jul. 12-16, 2010, 3 pages.
I2R, "eICIC for HeNB UL and MUE DL based on HeNB UL Measurement", 3GPP TSG RAN WG1 Meeting #62; R1-104732, Madrid, Spain, Aug. 23-27, 2010, 5 pages.
IEEE, "Part 11: Wireless LAN Medium Access Control (MAC) and Physical Layer (PHY) Specifications, Amendment 9: Interworking with External Networks", IEEE Std 802.11u-2011, Feb. 25, 2011, 208 pages.
Johnson, D., et al., "Mobility Support in IPv6", RFC 3775, Jun. 2004, 165 pages.
Kddi, et al., "P-CR to TR 22.805 on Section 6 Potential Requirements", 3GPP Tdoc S1-121074; 3GPP TSG-SA WG1 Meeting #58, Seville, Spain, May 7-11, 2012, 6 pages.
LG Electronics, "Traffic steering across multiple PDN connections over 3GPP access", 3GPP Tdoc S2-105026, 3GPP TSG SA WG2 Meeting # 81 Prague, Czech Republic, Oct. 11-15, 2010, 5 Pages.
Mark, Brian, et al., "A Multipath Flow Routing Approach for Increasing Throughput in the Internet", George Mason University, Dept. of Electrical and Computer Engineering, Aug. 2007, 4 pages.
Melia, T., "Logical Interface Support for multi-mode IP Hosts", draft-melia-netext-logical-interface-support-01, Jul. 5, 2010, 20 pages.
Nokia Siemens Networks, "On X2 Signaling for TDM eICIC in Macro+Pico Scenarios", 3GPP Tdoc R3-103555, 3GPP TSG RAN WG3 #70 Meeting, Jacksonville, United States, Nov. 15-19, 2010, 4 pages.
Open Mobile Alliance, "OMA Device Management Representation Protocol", OMA-TS-DM_RepPro-V2_0-20101011-D, Oct. 11, 2010, 76 pages.
Qualcomm Inc., et al., "Congestion in Multiple Access Communication Schemes", 3GPP Tdoc S1-121111; 3GPP TSG-SA WG1 Meeting #58, Seville, Spain, May 7-11, 2012, 5 pages.
Shehada, Mohammed, "Overview of 3GPP Study Item UPCON: User Plane Congestion Control (TR 22.805 V0.2.0 (Feb. 2012))", 38th Meeting of the VDE/ITG group 5.2.4 "Mobility in IP-based networks", Mar. 13, 2012, 19 pages.
Sklower, "The PPP Multilink Protocol (MP)", IETF Network Working Group, Aug. 1996, 23 pages.
Soliman, H., et al., "Flow Bindings in Mobile IPv6 and NEMO Basic Support", draft-ieff-mext-flow-binding-01 (work in progress), Feb. 13, 2009, 31 pages.
Soliman, H., et al., "Flow Bindings in Mobile IPv6 and NEMO Basic Support", draft-ieff-mext-flow-binding-04 (work in progress), Nov. 9, 2009, 37 pages.
Soliman, H., et al., "Flow Bindings in Mobile IPv6 and NEMO Basic Support", draft-ieff-mext-flow-binding-06 (work in progress), Mar. 1, 2010, 39 pages.

(56) References Cited

OTHER PUBLICATIONS

Soliman, H., "Mobile IPv6 Support for Dual Stack Hosts and Routers", RFC 5555, Jun. 2009, 41 pages.
Tsirtsis, G., et al., "Traffic Selectors for Flow Bindings", draft-ietf-mext-binary-ts-02 (work in progress), Dec. 16, 2009, 18 Pages.
Tsirtsis, G., et al., "Traffic Selectors for Flow Bindings", draft-ietf-mext-binary-ts-04 (work in progress), Feb. 26, 2010, 19 pages.
Wakikawa, Ryuji, et al., "Multiple Care-of Addresses Registration", RFC 5648, Oct. 2009, 36 pages.
U.S. Appl. No. 13/446,685, filed Apr. 13, 2012.
U.S. Appl. No. 13/820,724, filed Feb. 12, 2014.
U.S. Appl. No. 13/944,077, filed Jul. 17, 2013.
U.S. Appl. No. 14/408,133, filed Jun. 17, 2013.
U.S. Appl. No. 14/759,818, filed Jan. 10, 2014.
"JP 2006-101400", Abstract, Apr. 13, 2006, 1 page.
"Official Notice of Rejection", Japanese Patent Application No. 2015-523244, Feb. 2, 2016, 6 pages.
"Official Notice of Rejection (English Translation)", Japanese Patent Application No. 2015-523244, Feb. 2, 2016, 7 pages.
"Examination Notification", Taiwanese Patent Application No. 102125682, Oct. 14, 2016, 3 pages.
"Examination Notification", Taiwanese Patent Application No. 102105530, Oct. 16, 2016, 9 pages.
"Examination Notification (English Translation)", Taiwanese Patent Application No. 102125682, Oct. 14, 2016, 3 pages.
"Examination Notification (English Translation)", Taiwanese Patent Application No. 102105530, Oct. 16, 2016, 7 pages.
"English Language Abstract", Chinese Patent Application No. 102026303, Apr. 20, 2011, 1 page.
"CN Aspects of Service Identification for RRC Improvements in GERAN", 3GPP Tdoc C4-112729, 3GPP TSG CT WG4 Meeting #55, San Francisco, US, Nov. 14-18, 2011, 5 pages.
"Communication pursuant to Article 94(3) EPC", European Patent Application No. 13 708 293.9-1857, Dec 23, 2016, 4 pages.
"Official Notice of Rejection", Japanese Patent Application No. 2014-557858, Jan. 24, 2017, 9 pages.
"Official Notice of Rejection (English Translation)", Japanese Patent Application No. 2014-557858, Jan. 24, 2017, 11 pages.
"United States Office Action", U.S. Appl. No. 14/759,818, dated Jan. 11, 2017, 13 pages.
"United States Office Action", U.S. Appl. No. 15/056,512, dated Feb. 1, 2017, 24 pages.
NTT Docomo, "Considering Rat Congestion Scenario in UPCON SID", SA WG2, Tdoc S2-113253, Meeting #86, Naantali, Finland, Jul. 11-15, 2011, 2 pages.
"United States Office Action", U.S. Appl. No. 15/427,523, dated May 3, 2017, 16 pages.
"United States Office Action", U.S. Appl. No. 14/408,133, dated Jun. 22, 2017, 53 pages.
"English Language Abstract", Chinese Patent Application No. 102300264, Dec. 28, 2011, 1 page.
"First Notification of Office Action (English Translation)", Chinese Patent Application No. 201380038480.4, dated Jul. 24, 2017, 12 pages.
"First Notification of Office Action", Chinese Patent Application No. 201380038480.4, dated Jul. 24, 2017, 19 pages.

\* cited by examiner

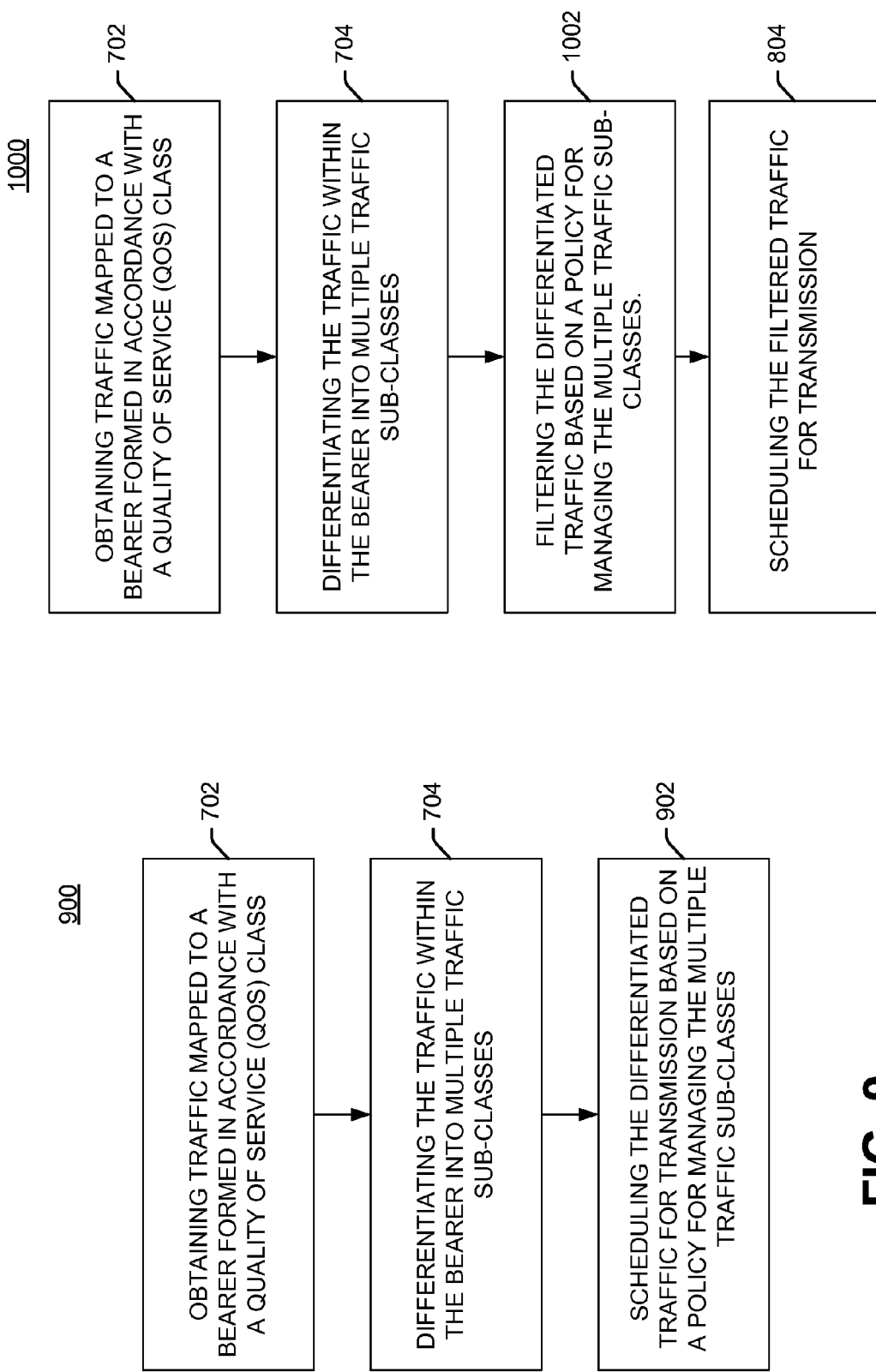

HIERARCHICAL TRAFFIC DIFFERENTIATION TO HANDLE CONGESTION AND/OR MANAGE USER QUALITY OF EXPERIENCE

BACKGROUND

In recent years demand for mobile wireless media, such as video and other data, has steadily increased, and its growth is predicted to increase with the new infrastructure of the Long Term Evolution (LTE) and/or LTE advanced network that offers significantly higher user data rates. Although present-day wireless networks have increased capacity, and smart phones are now capable of generating and/or displaying the media, actually transporting various types of the media across these advanced wireless communication networks has become challenging, and the scheduling of resources in the wireless network to accommodate transmission of the media is a difficult task.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIGS. 7-11 are flow diagrams illustrating examples of flows directed to hierarchical traffic differentiation;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1E, where various elements of the network may utilize, perform, be arranged in accordance with and/or be adapted and/or configured for the methods, apparatuses and systems provided herein.

Figure 1A:
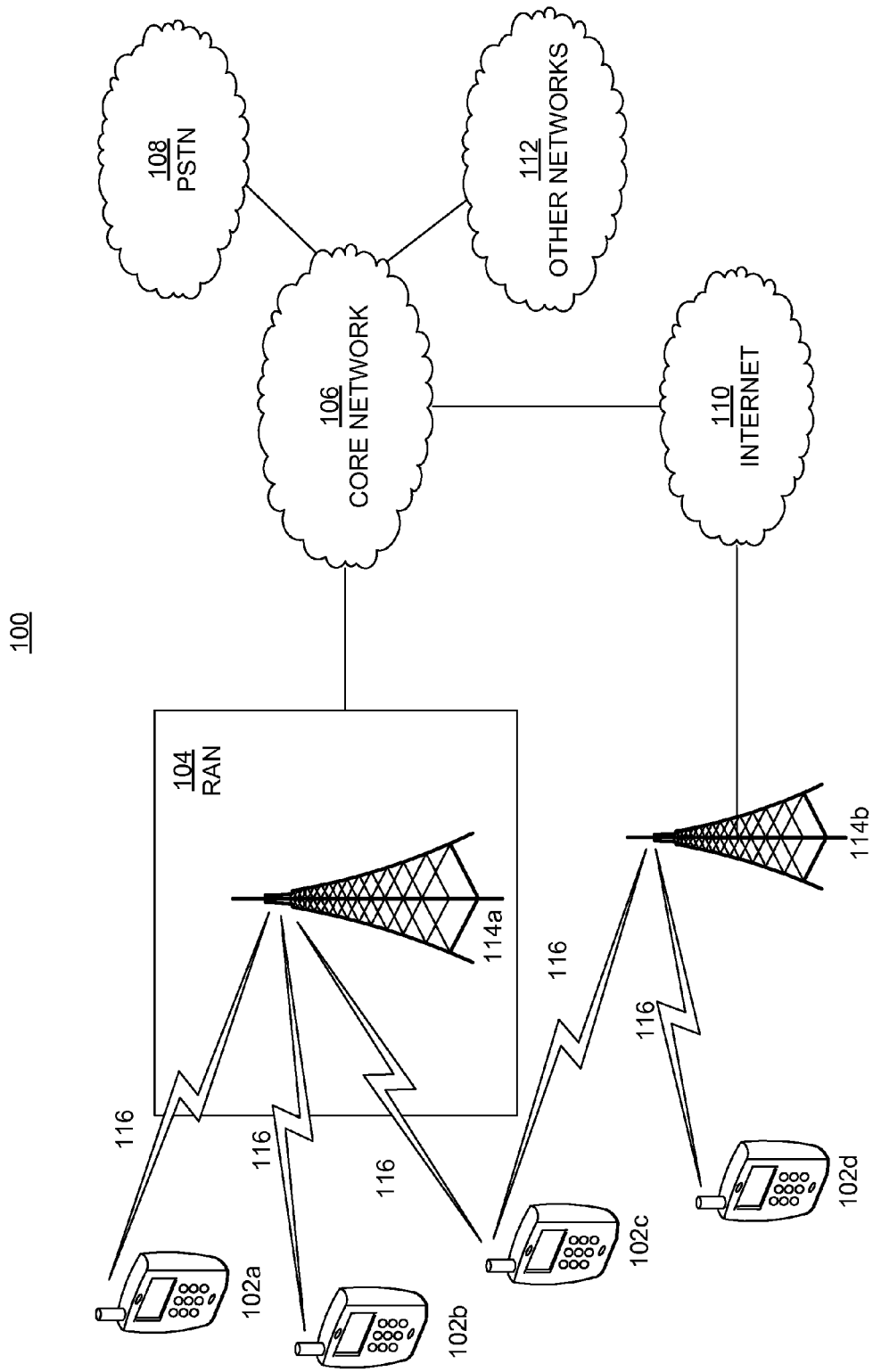
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals, and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a terminal or like-type device capable of receiving and processing compressed video communications, or like-type device.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, a media aware network element (MANE) and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
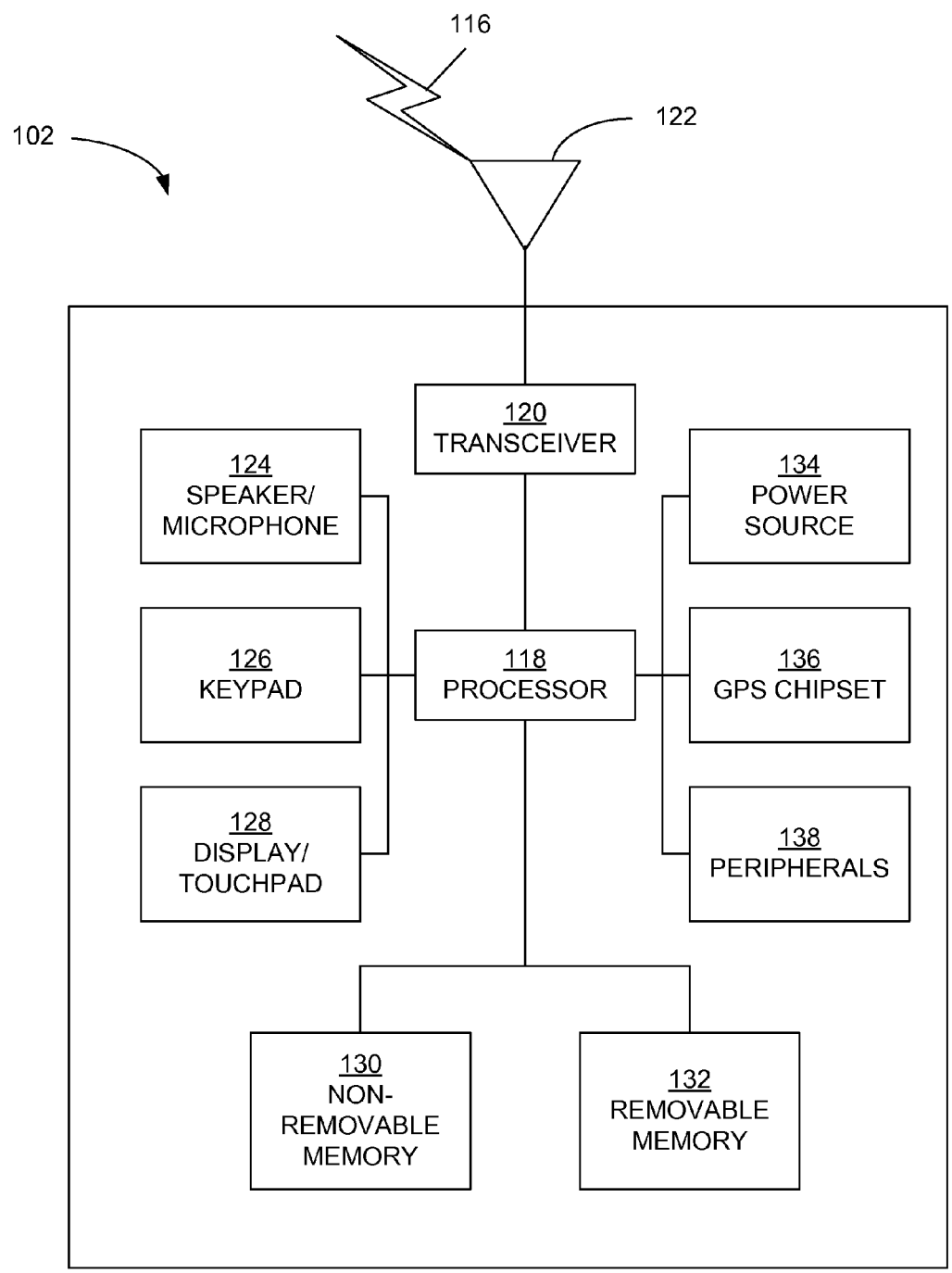
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
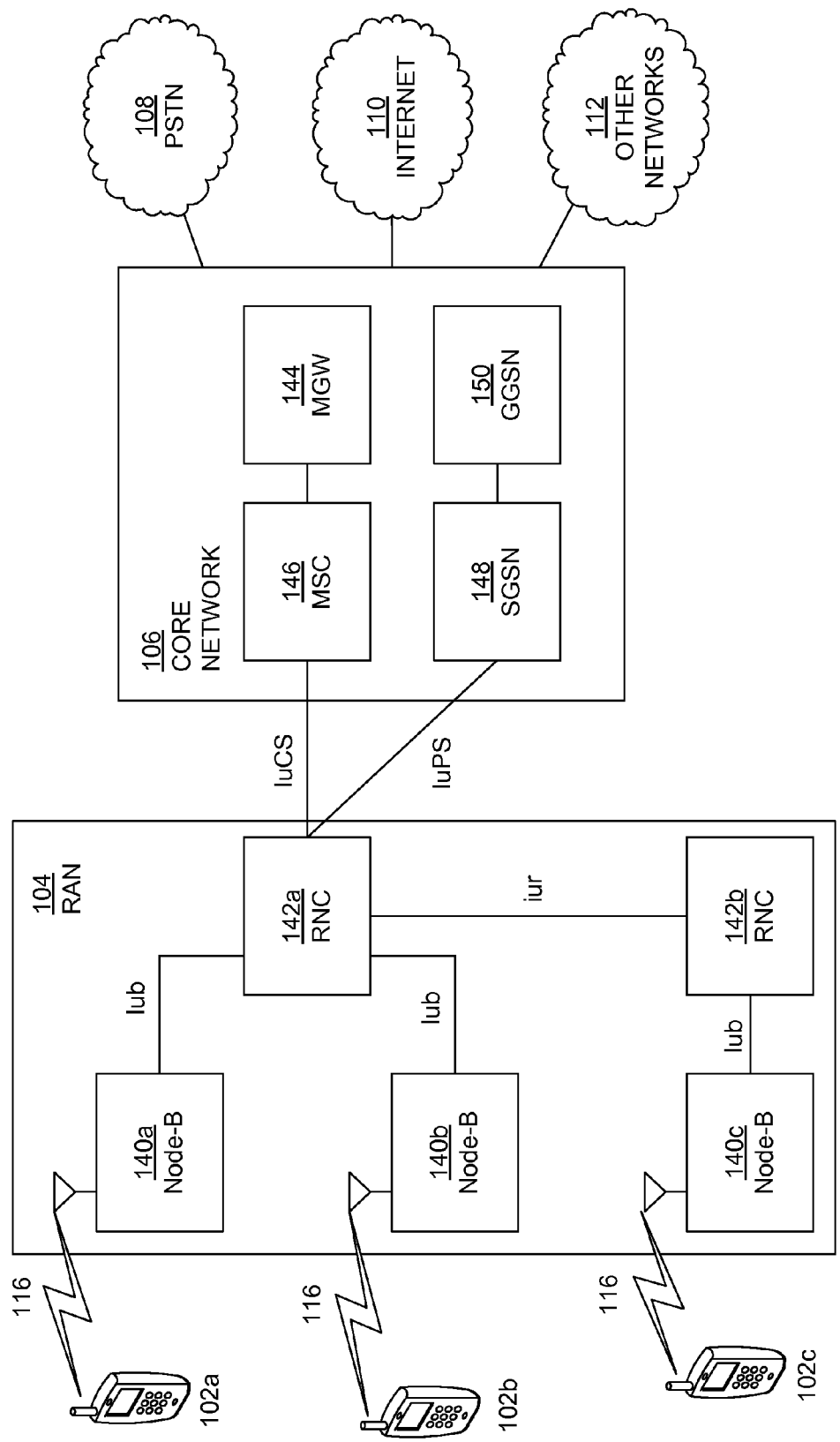
FIGS. 1C, 1D, and 1E are system diagrams of example radio access networks and example core networks that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
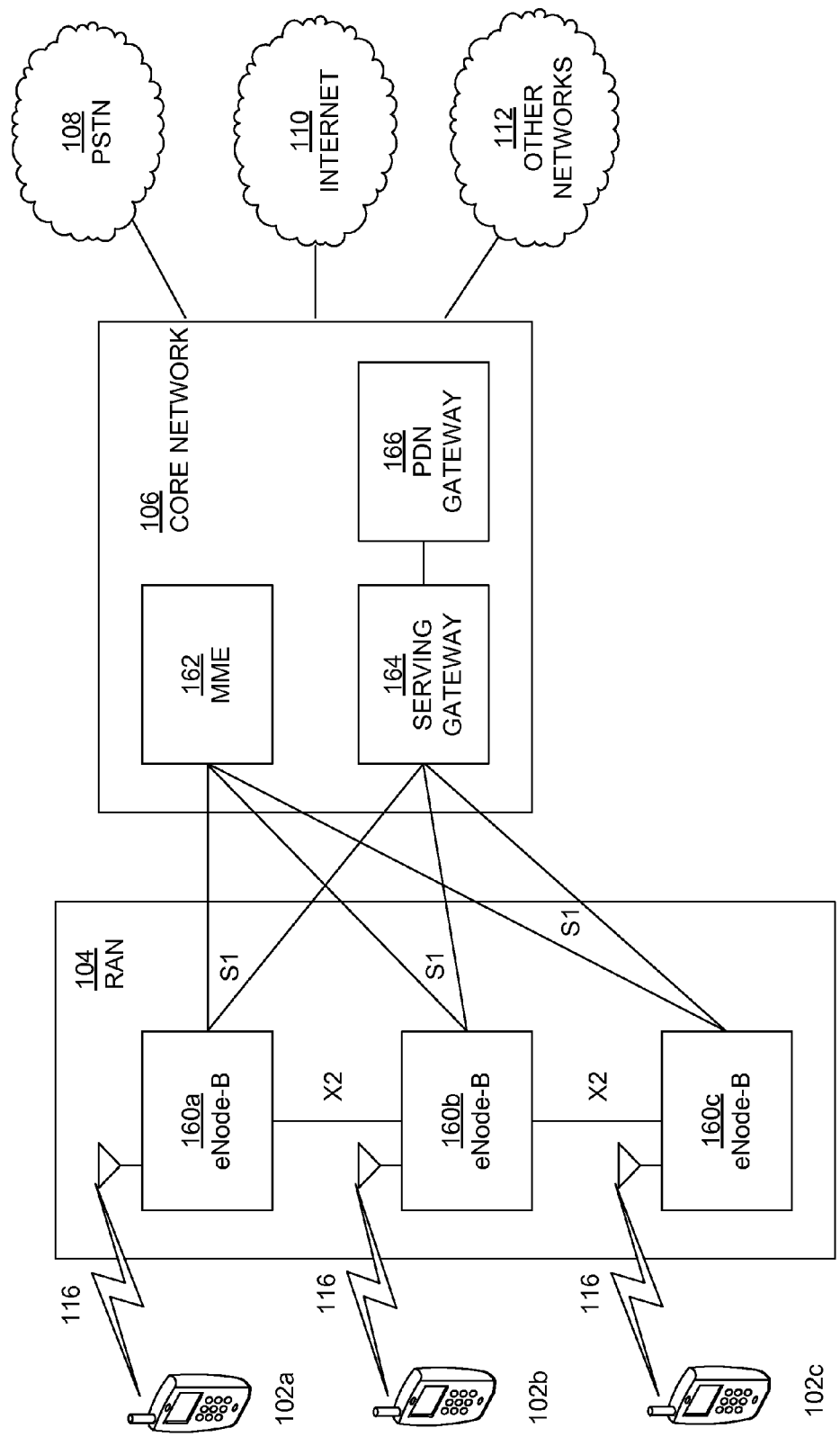

FIG. 1D is a system diagram of the RAN 104 and the core network 106 according to another embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode Bs 160a, 160b, 160c may communicate with one another over an X2 interface.

The core network 106 shown in FIG. 1D may include a mobility management gateway (MME) 162, a serving gateway (SGW) 164, and a packet data network (PDN) gateway (PGW) 166. While each of the foregoing elements are depicted as part of the core network 106, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular SGW during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The SGW 164 may also be connected to the PGW 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
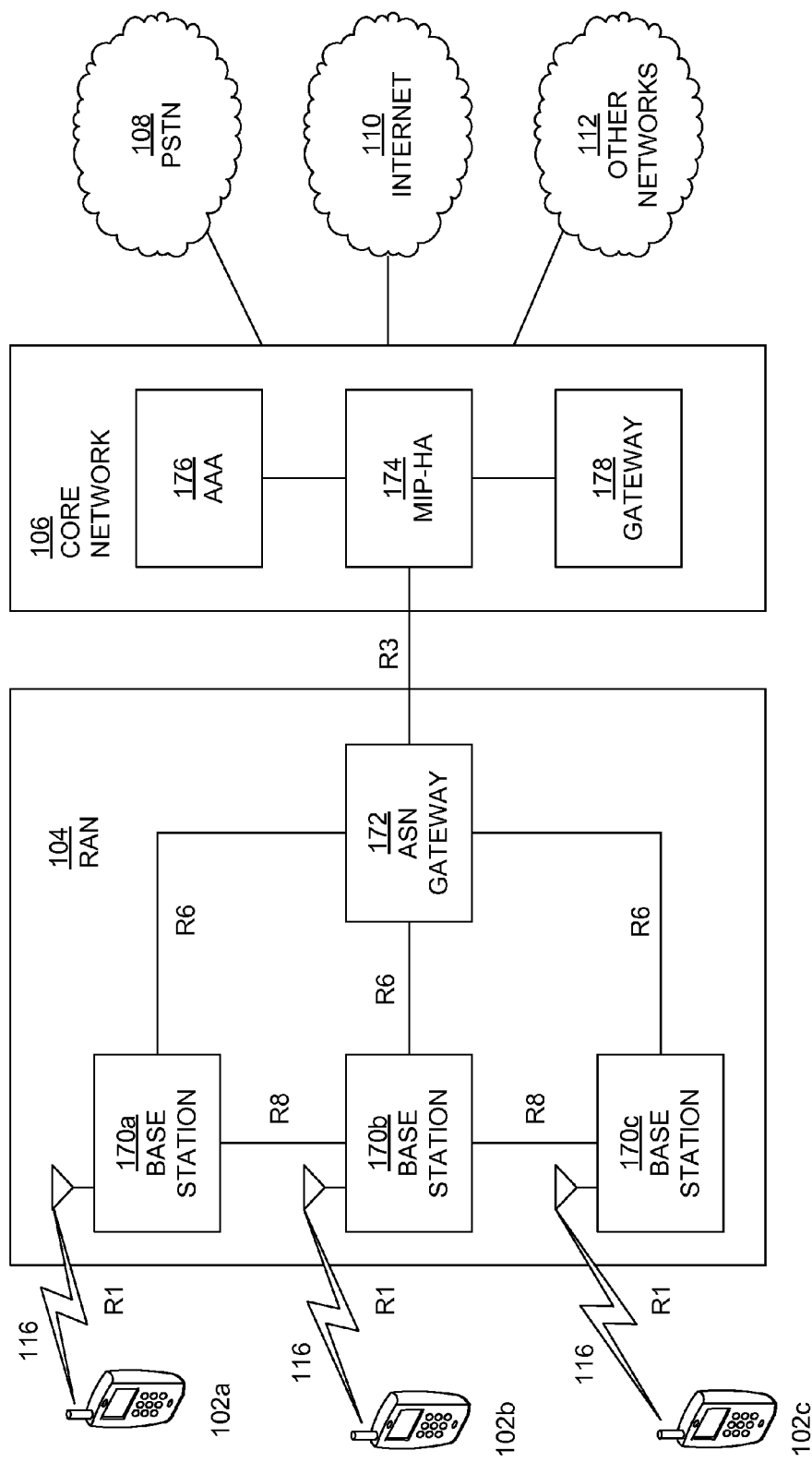

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 14 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, 102c to roam between different ASNs and/or different core networks. The MIP-HA 174 may provide the WTRUs 102a, 102b, 102c with access to packet-switched networks, such as the Internet 11, to facilitate communications between the WTRUs 102a, 102b, 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 2A:
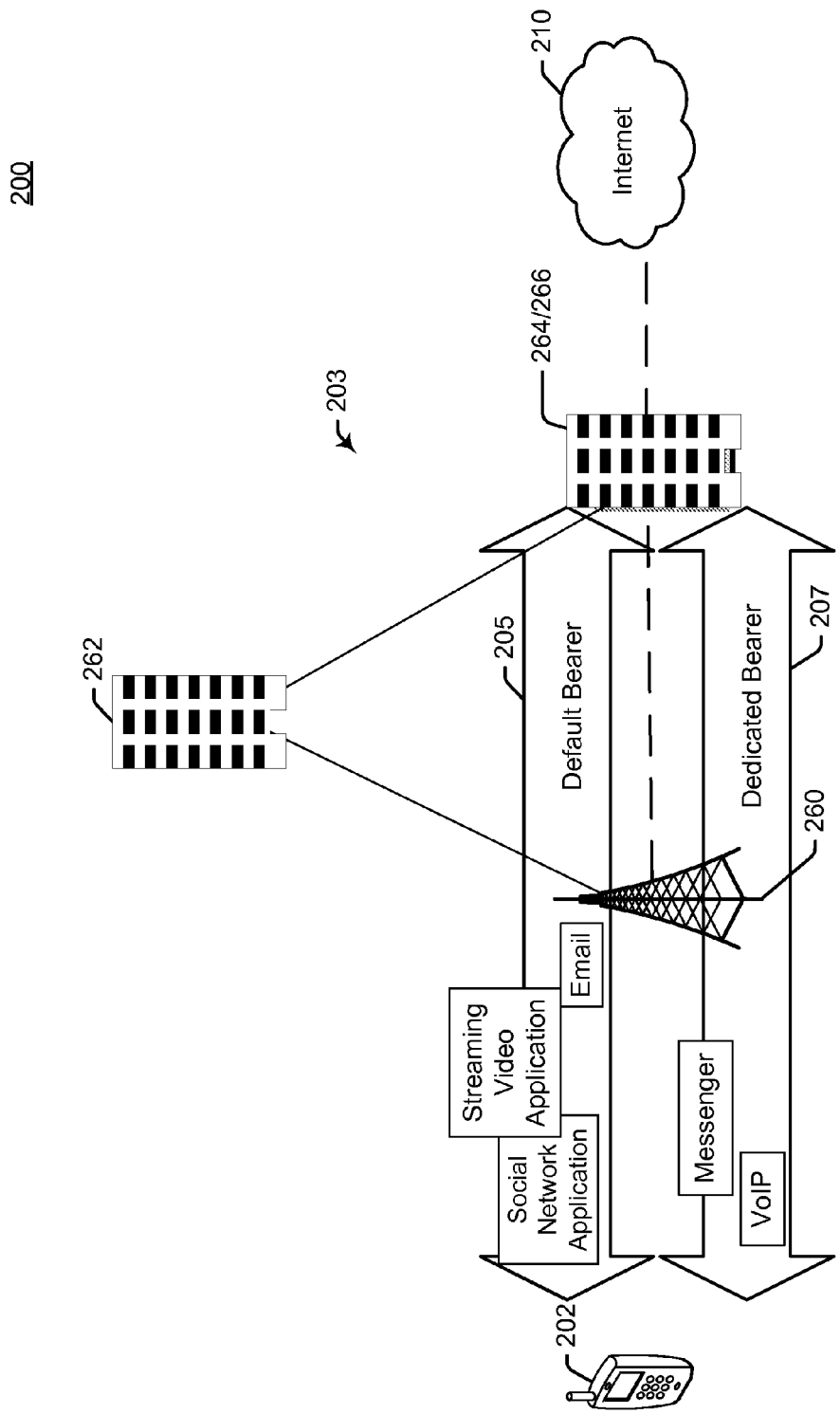
FIGS. 2A-2B are block diagrams illustrating an example of a communications system and examples of default and dedicated bearers established the communications system.
Figure 2B:
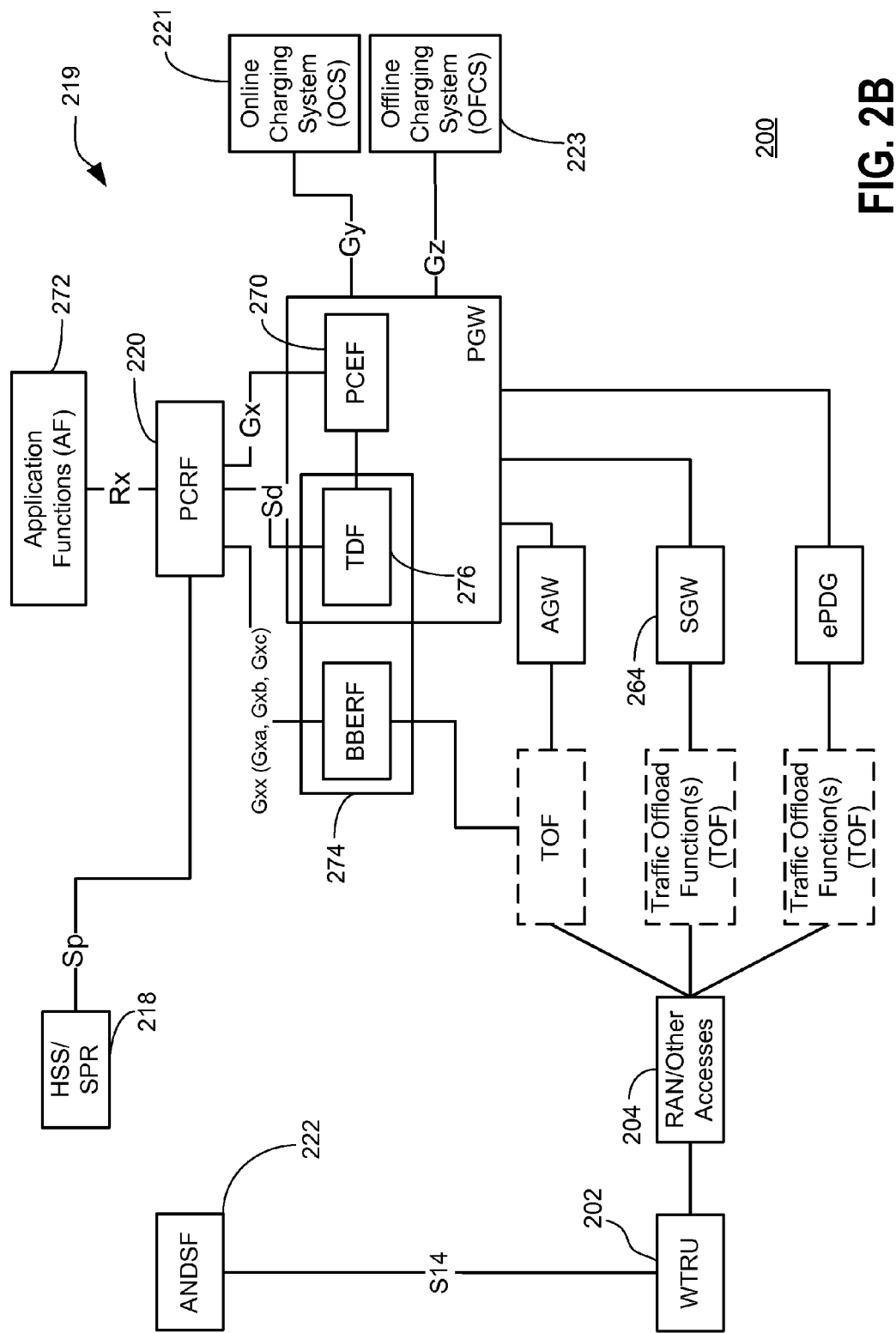

FIGS. 2A-2B are block diagrams illustrating an example of a communications system 200 and examples of default and dedicated bearers 205, 207 established in the communications system 200. The communications system 200 may be a multiple access system, and may be configured as provided above with respect to the communications system 100 of FIGS. 1A-1D. The communications system 200, for example, may include a WTRU 202 (e.g., a UE) and a network 203.

The network 203 may include a RAN 204 (FIG. 2B), a core network (not shown) and one or more PDNs, such as an internet 210. The RAN 204 may include a base station 260 (e.g., an eNode B). The WTRU 202 and the base station 260 may implement a radio technology such as E-UTRA, and may establish an air interface using LTE, LTE-A and/or other protocol(s) of like-type wireless communications standards. The core network may include an MME 262, a SGW 264, a PGW 266, a home subscriber server (HSS) and/or a subscriber profile repository (SPR) (collectively "HSS/SPR") 218, a Policy and Charging Control (PCC) architecture shown generally as 219, an access network discovery and selection function (ANDSF) 222, and other elements (not shown). The core network (and its constituent elements) may be formed in accordance with the system architecture evolution (SAE) as promulgated by the Third Generation Partnership Project (3GPP) for LTE, LTE-A and/or like-type communications standards. The core network may be, for example, an evolved packet core (EPC). Details of the core networks and/or communications systems, any of which may be representative of the communications system 200 and/or elements thereof, may be found in U.S. patent application Ser. No. 13/446,685, filed 13 Apr. 2012, which is incorporated herein by reference.

In general, the default bearer 205 is assigned to the WTRU 202 and established when the WTRU 202 first attaches to the network 203. The default bearer 205 remains assigned to the WTRU 202, and may persist while the WTRU 202 is attached to the network 203. Associated with the default bearer 205 is an IP address, which is implicitly assigned to the WTRU 202 (e.g., via a default evolved-packet-system (EPS) bearer activation). Although only one default bearer is shown, multiple default bearers may be assigned to the WTRU 202; each of which has carries its own (e.g., separate) IP address. Not all of the multiple default bearers need to be assigned when the WTRU 202 first attaches to the network. Typically, one default bearer is assigned when the WTRU first attaches to the network 203 and additional default bearers may be established at a later time. In some embodiments, a maximum of eleven (11) default bearers with the WTRU 202 may be established.

The dedicated bearer 207 acts as an additional bearer on top of the default bearer 205, and is linked to the default bearer 205. The dedicated bearer 207 does not require a IP address separate from the IP address of the default bearer 205; which IP address is implicitly assigned to the WTRU 202 via, for example, a dedicated EPS bearer activation. Although only one dedicated bearer is shown, multiple dedicated bearers linked to the default bearer 205 may be assigned to the WTRU 202. In embodiments where multiple default bearers are assigned to the WTRU 202, one or more dedicated bearers may be established and linked to such multiple default bearers.

In terms of QoS, the default bearer 205 and the dedicated bearer 207 may provide for traffic differentiation based on respective levels or classes of service (each a "QoS class"). The default bearer 205 is typically configured for best effort class(es) of service, and the dedicated bearer 207 is typically configured for better than best effort class(es) of service. To facilitate providing such classes of service, the dedicated bearer 207 may be configured as a guaranteed bit rate (GBR) bearer, and the default bearer 205 may be configured as a non-GBR bearer. In general, a non-GBR bearer may be best suited for handling best-effort classes of service traffic, such as for file downloads, email and internet browsing; and a GBR bearer may be best suited for better than best effort classes of service (e.g., real-time) traffic, such as for conversational voice and video. Although it may be configured as a non-GBR bearer, the default bearer 205 may handle better than best effort classes of service traffic. The dedicated bearer 207 may handle best effort classes of service traffic notwithstanding that is may be configured as a GBR bearer.

The network 203 may reserve a minimum amount of bandwidth ("bandwidth allocation") for the dedicated bearer 207, and the dedicated bearer 207 may consume resources of the base station 260 regardless of whether it is used or not. If implemented properly, the dedicated bearer 207 should not experience packet loss in the network 203, including in the RAN 204 and the core network, due to congestion. The dedicated bearer 207 may be defined with (e.g., low) latency and jitter tolerances that are typically needed for real-time services.

The network 203 does not make a specific bandwidth allocation reservation for the default bearer 205. The default bearer 205 may experience packet loss when the network 203 is congested or otherwise resource constrained. A maximum bit rate (MBR) is not specified on a per-bearer basis for the default bearer 205 and/or any other default bearers. An aggregate maximum bit rate (AMBR) may be specified on a per-subscriber basis for all of the default bearers assigned to such subscriber.

Each of the default and dedicated bearers 205, 207 is associated with a set of QoS parameters ("bearer-level QoS parameters") for conveying one or more properties of a transport channel associated therewith. These properties may include, for example, bit rates, packet delay, packet loss, bit error rate and a scheduling policy of the base station 260. The bearer-level QoS parameters of the default bearer 205 ("default-bearer QoS parameters") may be assigned by the network 203, and/or based on subscription information maintained in (and retrievable from) the HSS/SPR 218. The default-bearer QoS parameters may include a QoS class indicator (QCI), and an allocation and retention priority (ARP).

The bearer-level QoS parameters of the dedicated bearer 207 ("dedicated-bearer QoS parameters") may include a QCI, an ARP, a GBR and a MBR. A decision to establish or modify the dedicated bearer 207 (or any other dedicated bearer) may be taken up by the core network, and the dedicated-bearer QoS parameters may be assigned by the core network (e.g., the MME 262). The values of the dedicated-bearer QoS parameters are generally not modified by the MME 262, and may be forwarded transparently to the base station 260 and/or other element of the RAN. The MME 262 may reject establishment of the dedicated bearer 207 (or any other dedicated bearer).

The default-bearer and dedicated-bearer QCIs may be used to specify how IP packets received on the respective default and dedicated bearers 205, 207 are treated. For example, the default-bearer QCI and dedicated-bearer QCI may be set to different values; each of which may be indicative of, and/or operate as a reference to, a set of attributes associated with the corresponding QoS class. The respective sets of attributes may impact several node-specific parameters, such as link layer configuration, scheduling weights and queue management, in different ways, and in turn, impact packet forwarding of traffic traversing each of the default and dedicated bearers 205, 207 handled by edge and/or intermediate nodes (e.g., the PGW 266 and/or the base station 260, respectively) of the network 203. Traffic differentiation between the default bearer 205 and the dedicated bearer 207 may be implemented by assigning different QoS classes to them, using different values for the QCIs, for instance.

3GPP has defined nine (9) different QCIs; each of which is indicative of one of nine (9) different QoS classes. Table 1 (below) lists the 9 QCIs along with corresponding attributes associated with each of the QCI types.

TABLE 1

3GPP QCIs and Corresponding Attributes

| QCI | Resource Type | Priority | Packet Delay Budget (NOTE 1) | Packet Error Loss Rate (NOTE 2) | Example Services |
|---|---|---|---|---|---|
| 1 | GBR | 2 | 100 ms | $10^{-2}$ | Conversational Voice |
| 2 |  | 4 | 150 ms | $10^{-3}$ | Conversational Video (Live Streaming) |
| 3 |  | 3 | 50 ms | $10^{-3}$ | Real Time Gaming |
| 4 |  | 5 | 300 ms | $10^{-6}$ | Non-Conversational Video (Buffered Streaming) |
| 5 | Non-GBR | 1 | 100 ms | $10^{-6}$ | IMS Signalling |
| 6 |  | 6 | 300 ms | $10^{-6}$ | Video (Buffered Streaming) TCP-based (e.g., www, e-mail, chat, ftp, p2p file sharing, progressive video, etc.) |
| 7 |  | 7 | 100 ms | $10^{-3}$ | Voice, Video (Live Streaming) Interactive Gaming |
| 8 |  | 8 | 300 ms | $10^{-6}$ | Video (Buffered Streaming) TCP-based (e.g., www, e-mail, chat, ftp, p2p file sharing, progressive video, etc.) |
| 9 |  | 9 |  |  |  |

QCIs 5-9 (non-GBR) may be assigned to the default bearer 205, and QCIs 1-4 (GBR) may be assigned to the dedicated bearer 207. Not all of the QCIs and/or QoS classes need to be adopted and/or deployed. For example, an operator transitioning to or otherwise implementing QoS in the network 203 might initially deploy only basic service classes, such as voice, control signaling and best-effort data, and later introduce dedicated bearers offering premium services, such as high-quality conversational video.

All traffic mapped to the default and dedicated bearers 205, 207 may receive the same bearer level packet forwarding treatment. For example, traffic mapped to the default and dedicated bearers 205, 207 may receive the bearer level packet forwarding treatment in accordance with respective QoS classes as indicated by respective QCIs assigned to such default and dedicated bearers 205, 207.

As noted above, the core network may include the PCC system 219 (FIG. 2B). The PCC system 219 may be formed in accordance with the 3GPP PCC architecture. The PCC system may include elements in addition to and/or in lieu of the 3GPP PCC architecture. The PCC system 219 may handle policy and charging for the IMS over operator IP networks, for example, QoS policy control and flow-based charging. The PCC system 219 may also handle policy and charging for non-IMS services, including over-the-top (OTT) services (e.g., video streaming services on the Internet). In various embodiments, preconfigured PCC rules may be used on specific types of IP traffic identified via packet inspection (e.g., deep packet inspection (DPI)) and/or some other technique or method.

The PCC system 219 may perform QoS policy control. The QoS policy control may be used to ensure that delivery of one or more specified sets of IP user plane packets (each a "service data flow" (SDF)), is maintained at or above a GBR (if specified), and/or to ensure that such delivery does not exceed a specified MBR. In various embodiments, the GBR may be used to allocate network resources, while the MBR may be used to enforce the maximum bit rate that each of the SDFs may consume. Each of the SDFs may be identified by a 5-tuple. The 5-tuple may include, for example, a source IP address, a destination IP address, a source port number, a destination port number, and a transport protocol (e.g., transmission control protocol (TCP), user datagram protocol (UDP), etc.).

The PCC policy rules may be maintained in a policy and charging rules function (PCRF) 220 and enforced by a policy charging and enforcement function (PCEF) 270. The PCEF 270 may be a function of, or collocated in the PGW 266. The PCEF 270 may reside in the user plane, and may function to ensure that the PCC policy rules are followed. The PCEF 270 may apply, for example, (i) QoS policies related to gating (block/allow) and traffic shaping (reduce the bandwidth) (collectively "traffic shaping"), and (ii), online and offline charging policies. The QoS policies may be at the SDF level or other level of granularity. The online and offline charging policies may be obtained from an online charging system (OCS) 221 and an offline charging system (OFCS) 223.

The PCC system 219 may include several interfaces. These interfaces may include, for example, an Rx interface and a Gx interface. The Rx interface may allow an application function (AF) 272 in the PDNs to provide SDF information, including QoS requirements and/or parameters, to the PCRF 220. The PCRF 220 may use such information as input to PCC rule generation.

The PCRF 220 may receive, from the AF 272, a request containing media level information about a flow. The PCRF 220 may analyze offered characteristics (set forth in the request) against operator defined policy, and authorize a certain QoS reservation and/or reject the request from the AF 272. The PCRF 220 may download service-related and/or subscriber-related information from the HSS/SPR 218. The PCRF 220 may also provide rules (e.g., PCC rules, event report triggers, etc.) to the PCEF 270.

The PCRF 220 may have dynamic control over PCC behavior at the PCEF 270. Such dynamic control may be enabled by the Gx interface. Some PCC rules may be pre-configured, and the PCEF 270 may apply these rules to specific types of IP traffic. The specific types of IP traffic may be identified by way of packet inspection, for example.

In addition to using GPRS Tunneling Protocol (GTP) to provide access to the PGW 366 (or, a GGSN), the PCC architecture 219 may use Internet Engineering Task Force (IETF) based Mobile IP (MIP) protocols (e.g., any of MIPv4, PMIPv6 and DSMIPv6) to facilitate convergence of various types of accesses. To facilitate the use of MIP protocols that do not support the QoS-related signaling inherent in GTP, the PCC architecture 219 may include a Bearer Binding and Event Reporting Function (BBERF) 274. The BBERF 274 may include, for example, a Diameter-based Gxx interface for QoS information conveyed from the PCRF 220.

The PCC architecture 219 may also support access to home services or direct local services when roaming in a visited Private Land Mobile Network (PLMN) (not shown). This support may be enabled by PCC policy peering via a Diameter-based S9 interface between Home and Visited PCRFs, for example.

Although not shown, the core network may include a User Data Repository (UDR), instead of the HSS/SPR 218, to store PCC related subscription data, if, for example, a User Data Convergence (UDC) architecture is employed. The PCC architecture 219 may include a Traffic Detection Function (TDF) 276. The TDF 276 may perform application traffic detection, notification, and policy control. The PCC architecture 219 may support an SPR-based architecture for roaming with home-routed access, which may be facilitated by S9 roaming interfaces and the TDF 276.

The PCC architecture 219 may handle multiple simultaneous access connections, and support for DSMIPv6 based Internet Protocol (IP) flow mobility (IFOM), including both WTRU-initiated and/or network-initiated IFOM. The support for such IFOM may involve the PCEF 270 keeping the PCRF 220 up to date about a current routing address and IFOM routing rules for each IP flow. The IFOM routing rules may include information that the PCRF 220 may use to install, in the PCEF 270, the QoS rules for SDFs subject to flow mobility. The IFOM routing rules may be provided to the PCRF 220 from the PCEF 270 during session establishment or modification. The PCEF 270 may derive the IFOM routing rules based on flow binding information received from the WTRU 202.

The PCC architecture 219 may also include an Event Reporting Function (ERF). The ERF may perform event trigger detection. The ERF, for example, may report an event to the PCRF 220 responsive to the event matching the event trigger. The ERF may be integrated into, integral to, combined with co-located with any of the PCEF 270, BBERF 274 and TDF 276 for solicited application reporting (if applicable).

The PCRF 220 may accept input for PCC decision-making from any of the PCEF 270, BBERF 274, TDF 276, the HSS/SPR 218, AF 272, and itself. One or more PCC policy rules, QoS control rules, IP-CAN bearer/session policy information rules, usage monitoring control information rules, IFOM routing rules and application detection and control (ADC) rules may be handled by the PCC architecture 219. For example, the SDFs may be mapped to PCC policy rules sent to the PCEF 270. These PCC policy rules may include a rule name, a service identifier, one or more SDF filters, precedence, gate status (open/closed), QoS parameters, charging key (rating group), other charging parameters, and the like.

The QoS control rules sent to BBERF 274 may include a subset of the PCC policy rules. As an example, the QoS control rules may include the rule name, one or more of the SDF filters, the precedence and the QoS parameters. Alternatively, the QoS control rules may be the same as the PCC policies rules. The QoS parameters provided in both of the PCC policy rules and the QoS control rules may include one or more QCIs, one or more subordinate QCIs ("sub-QCIs"), reserved bit rates for guaranteed bearers, maximum bit rates for best effort bearers, allocation/retention priority (ARP), APN-Aggregated Maximum Bit Rate (AMBR), and the like. The QoS parameters may include other parameters, as well.

Bearer binding may involve association of PCC policy rules to an access bearer. For GTP-based access, both charging and QoS rule enforcement may be carried out by the PCEF 270. For PMIPv6 access, the QoS information might not be conveyed using GTP-based protocols. A Diameter-based control protocol may be used over the Gxx interface instead to convey the QoS rules to the BBERF 274. In various embodiments, the bearer binding may occur in the BBERF 274, but charging and/or gating may be carried out in the PCEF 270.

The ANDSF 222 may provide interworking (e.g., 3GPP/non-3GPP interworking) information for the WTRU 202 over an IP-based S14 interface, for example. In general, the ANDSF 222 may enable a carrier to balance subscribers among the available accesses using best access selection criteria based on current requirements of the WTRU 202. The ANDSF 222 may provide support for IFOM, as currently standardized using DSMIPv6 or otherwise.

The ANDSF 222 may assist the WTRU 202 in discovery of non-3GPP accesses, if any. The ANDSF 222 may provide the WTRU 202 with rules for policing the connection to these networks, such as, inter-system mobility policies ("ISMP") and inter-system routing policies ("ISRP") using, for example, a management object ("MO") ("ANDSF MO"). The relation between the ISMP, the ISRP and discovery information may be that (i) the ISMP prioritize different accesses when the WTRU 102 is not capable of connecting to the core network through multiple accesses, (ii) the ISRP indicate how to distribute traffic among available accesses when the WTRU 202 is capable of connecting to the core network through the multiple accesses (e.g., the WTRU 202 is configured for IFOM, MAPCON, non-seamless WLAN offload or any combination of these capabilities); and (iii) and the discovery information provides further information for the WTRU 202 to access the different accesses defined in the ISMP and/or the ISRP.

The ISMP may enable IP flow level control. The ISMP may be provided by a MNO, and may be defined per access point name (APN), per IP flow class under any APN or per IP flow class under a specific APN. The ISMP may be defined in other ways, as well. The IP flow class may be identified via any of a media type (e.g. audio), IMS Communication Service Identifier (e.g., MMTEL) for IMS applications and respective 5-tuple (IP source address, IP destination address, source port, destination port, protocol type) for any type of application. The 5-tuple may include wildcard values in any of the possible fields. For example, the ANDSF 222 may indicate that a given (e.g., a 3GPP) access has a highest priority access for a given IP flow class, and another (e.g., an untrusted-non-3GPP) access has a highest priority access for another IP flow class.

The ISRP may provide the capability to identify traffic based on types of information, including extrinsic information available to the WTRU 202, such as the APN, and IP packet header information. The IP packet header information may include, for example, transport protocol, destination port and destination IP address.

The ANDSF 222 may also be adapted to perform traffic identification and/or record traffic-identification information. Identification of the traffic may be based on (i) throughput (e.g., identifying traffic based on the total amount of data sent/received); (ii) an application (e.g., identifying traffic based on an application ID/name/etc.); (iii) content type (e.g., identifying traffic based on the type of content (e.g. video, audio, data, control, etc.); and (iv) destination domain (e.g., identifying traffic based on the destination domain, such as the fully qualified destination name (FQDN) in the web request). The traffic-detection information may be stored in the ANDSF MO along with other ANDSF information described herein and/or set forth in 3GPP TS 24.312.

The ANDSF 222 may receive from the WTRU 202 an indication of its capability to support ISMP and/or ISRP when, for example, the WTRU 202 is in the process of establishing a connection. The ANDSF 222 may provide the policies (e.g., the ISMP and/or ISRP) to the WTRU 302, and, based on the provided policies, the WTRU 202 may request the PGW 266 (e.g., a home agent (HA) per DSMIPv6-based IFOM) to route IP flows to various accesses; as appropriate.

Although not labeled in FIG. 2B, an AGW may include the BBERF 274 to facilitate using PMIPv6 between the PGW 266 and given (e.g., non-3GPP) accesses. As another alternative, the BBERF 274 may be disposed in the SGW 264 to facilitate using PMIPv6 between the PGW 266 and a given (e.g., 3GPP) access.

Each of the SDFs may represent IP packets related to a user service. The SDFs are bound to specific bearers based on policies defined by the network operator. This binding may occur at the WTRU 202 and the base station 260. The binding for each of the SDFs may be carried out using a traffic flow template (TFT). Each TFT may include packet filtering information for identifying and mapping packets to specific bearers. The packet filtering information may be configurable by the network operator, and may include the 5-tuple identifying the corresponding SDF. The dedicated bearer 207 is associated with a TFT. The default bearer 205 may (but need not) be associated with a TFT.

Figure 3:
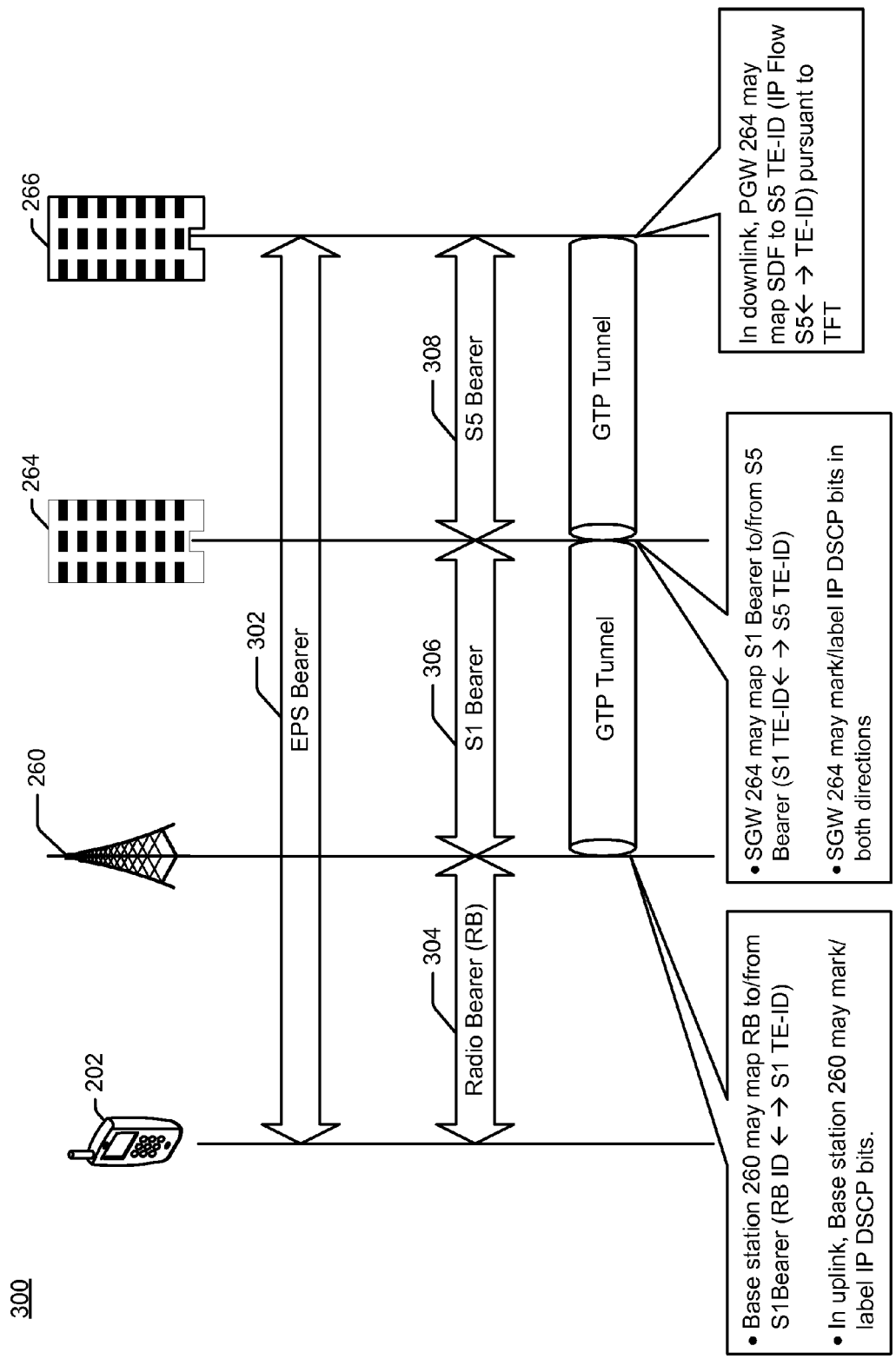
FIG. 3 is a block diagram illustrating an example of an end-to-end mapping of an EPS bearer to a radio bearer (RB), S1 bearer and a S5 bearer.

FIG. 3 is a block diagram illustrating an example of an end-to-end mapping 300 of an EPS bearer 302 to a radio bearer (RB) 304, S1 bearer 306 and a S5 bearer 308. For convenience, the end-to-end mapping is described with reference to the communication system 200 of FIG. 2. A downlink TFT function and an uplink TFT function are shown in FIG. 3. In the downlink, the PGW 266 may map downlink traffic to a TFT mapped to the S5 bearer 308. In the uplink; the base station 260 may map the RB 302 to the S1 bearer 306.

The PGW 266 may map the bearers to the underlying transport network. The transport network may be Ethernet based, and may use multiprotocol label switching (MPLS), for example. The transport network may not be aware of the bearers (including the bearer structures and/or constructs), and may use other (e.g., standard) IP QoS techniques, such as differentiated services (DiffServ).

The base station 260 may play a significant role in end-to-end QoS and policy enforcement. The base station 260 may perform uplink and downlink rate policing, along with RF radio resource scheduling. The base station 260 may use ARP when allocating resources to bearers (e.g., the default and dedicated bearers 205, 207). The base station 260, like the PGW 266, may map bearer traffic to the underlying IP transport network. The WTRU 202 may also play a role in the end-to-end QoS and policy enforcement. For example, the WTRU 202 may perform an initial mapping of SDFs to the bearers in the uplink direction.

As noted, the transport network (e.g., switches, routers and the like) may be unaware of the bearers, and may use diffServ for QoS. To facilitate bearer-level QoS, the base station 260 and the PGW 266 may map the bearer level QoS parameters (e.g., QCIs) to respective DiffServ code point (DSCP) values. The mapping of bearer level QoS parameters (e.g., QCI) to IP network QoS framework (e.g., DSCP) may be implemented in various ways. The following DSCP per-hop behavior is defined to provide guidelines for such mapping function:

Assured Forwarding (AF)—Video Conferencing, streaming, client-server transactions
    Expedited Forwarding (EF)—VoIP
    Default Forwarding (DF)—Undifferentiated applications
    Effort Class Stream—Any flow with no bandwidth assurance (e.g., Low-Best priority Data).
    Hierarchical Traffic Differentiation Provided herein are methods, apparatuses and systems for performing hierarchical traffic differentiation and/or employing hierarchical traffic differentiation to, for example, handle congestion and/or to manage user quality of experience (QoE). Performing the hierarchical traffic differentiation may include differentiating or otherwise classifying (collectively "differentiating") traffic (e.g., flows) mapped to, or within, a bearer formed in accordance with a QoS class into multiple traffic sub-classes.

Each traffic sub-class may be configured with one or more attributes for differentiating its class of traffic from another traffic sub-class and/or one or more policies with rules for how to handle policing and scheduling for its sub-class of traffic. These attributes may include one or more characteristics attributed to the class of traffic, such as, for example, a relative priority with respect to the other traffic sub-classes, a share of the QoS parameters, etc. The attributes may include one or more characteristics of, or one or more criteria for identifying and/or indicating, the traffic that qualifies for classification under the corresponding traffic sub-class. For example, each traffic sub-class may have a criterion that the traffic has a particular traffic profile to qualify for its classification. Alternatively and/or additionally, each traffic sub-class may have a criterion that the traffic include an indication indicating that the traffic is classified as, or qualifies for classification under such traffic sub-class. Alternatively and/or additionally, each traffic sub-class may have a criterion that the traffic includes an indication indicating one or more of the characteristics attributed to the class of traffic, such as, for example, the relative priority of the traffic sub-class.

The methods, apparatuses and systems provided herein for performing hierarchical traffic differentiation and/or employing hierarchical traffic differentiation may be applicable to and/or useful for various scenarios or use cases, including those provided below. In the description that follows, the terms "QoS class(es)" and "QCI level(s)" are used interchangeably without loss of generality and/or differences there between. Similarly, the terms "traffic sub-class(es)" and "intra-QCI level(s)" are used interchangeably without loss of generality and/or differences there between. In addition, the terms "traffic" and "flow" are used interchangeably without loss of generality and/or differences there between.

Traffic of (e.g., OTT) applications having the same QCI may be treated the same in terms of QoS, packet forwarding, etc. In some instances, unacceptable and/or undesired delays for real-time and/or other better than best effort traffic may be experienced during periods of congestion in the network 203. As described in more detail below, performing hierarchical traffic differentiation and/or employing hierarchical traffic differentiation to police (e.g., filter) and/or adjust scheduling of differentiated traffic based on a prioritization of, and/or policies for managing, the traffic sub-classes (intra-QCI level) may mitigate congestion and/or enhance the QoE of the real-time and/or other better than best effort traffic. Policing and scheduling strategies that employ the hierarchical traffic differentiation may be employed as available bandwidth for users in the mobile network changes due to interference, fading and competition from other user traffic.

An application may source different types of traffic; all of which have the same application id. In legacy methods, apparatus and systems, the TFT defined for the bearer may map all of the different types of traffic of the application to a single bearer at the PGW 266 (downlink) and/or the WTRU 202 (uplink). As an example, an application (e.g., a Skype application) may source voice and other audio, video, text and/or keep-alive messaging. Intermediate network nodes (e.g., the base station 260) might not be able to distinguish the different types of traffic in the same bearer (from one another) and/or make corresponding traffic prioritization decisions in view of the all of the different types of traffic of the application being mapped to a single bearer. Differentiating traffic based on granularity below (e.g., finer than) the QCI level may allow, for example, the voice traffic of the application to be prioritized over video and/or other type of traffic in the same bearer. These and other appropriate decisions may be made in response to temporary bandwidth drop; for example dropping the video and/or other type of traffic so as to provide good audio quality and/or prevent call drop.

When the WTRU 202 is in connected mode, certain applications may only source intermittent traffic (e.g., Skype keep-alive messaging). The network operator may prefer to use the default bearer 205 to carry such traffic. The operator may also prefer to use the default bearer 205 for short duration videos (e.g., a small YouTube video) or other short-duration session traffic in view of the cost/benefit of establishing and tearing down the dedicated bearer 207 for such sessions. To facilitate the preference of using the default bearer 205 over the dedicated bearer 207 for better than best effort services and/or using the default bearer 205 exclusively, differentiation of the traffic within the default bearer 205, e.g., for load balancing and scheduling at the RAN and the core network, may be carried out by differentiating the traffic based on granularity below (e.g., finer than) the QCI level. For example, in case of congestion, the base station 260 may perform active queue management and make a decision to drop traffic that exceeds the queue buffer size, based on the traffic profile. Before making the decision on which traffic to drop, the base station 260 may determine if any of the traffic is classified in accordance with one or more intra-QCI levels, and if so, may make appropriate drop decisions based on such determination.

As noted above, in recent years demand for mobile wireless video has steadily increased, and its growth is predicted to increase with the infrastructure of the LTE/LTE-A network that offers significantly higher user data rates. As compared with other applications, video consumes more network resources. Within the same video traffic flow, the packets might not be equally important. For example, with hierarchical P video encoding, there are multiple temporal layers. A packet in layer 0 may be more important than a packet in layer 1, which in turn may be more important than a packet in layer 2.

QoE for Video Flows

Figure 4:
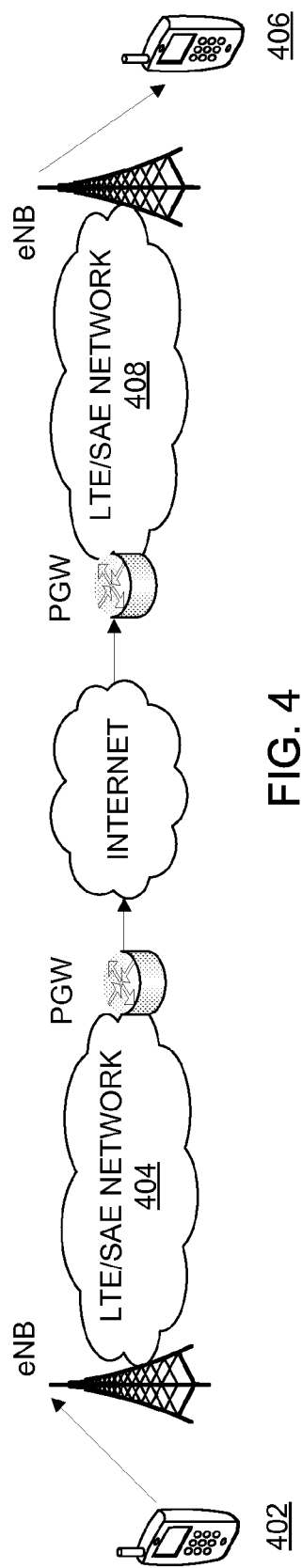
FIG. 4 is a block diagram illustrating an example of a system architecture for a video conferencing system.
Figure 5:
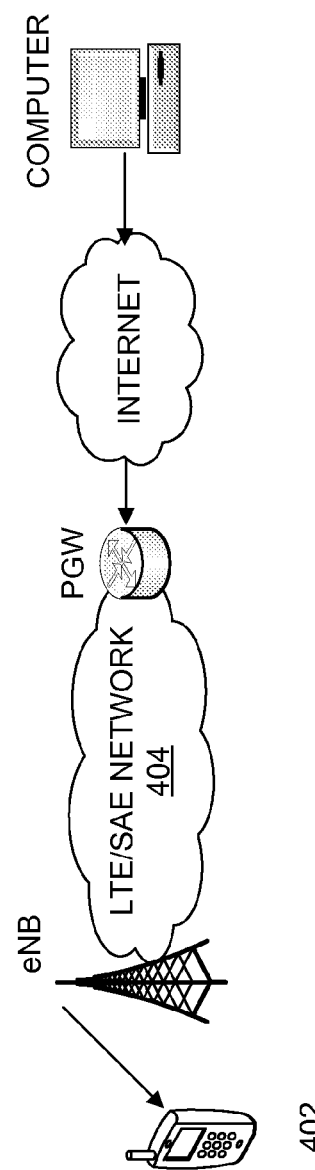
FIG. 5 is a block diagram illustrating an example of a system architecture for a video conferencing system.

Provided herein are methods, apparatuses and systems for wireless system resource scheduling based on QoE parameters. A given video application between users may span more than one cellular network. One example is shown in FIG. 4 where a UE (also referred to herein a WTRU) 402 is located in network 404, and a UE 406 is located in network 408. In other scenarios, both end devices are not a UE. For example, one of them may be a computer connected to the Internet, or may be a video streaming server accessible over a network. An example is shown in FIG. 5, where the computer may be a PC with a web camera or a video streaming server.

Figure 6:
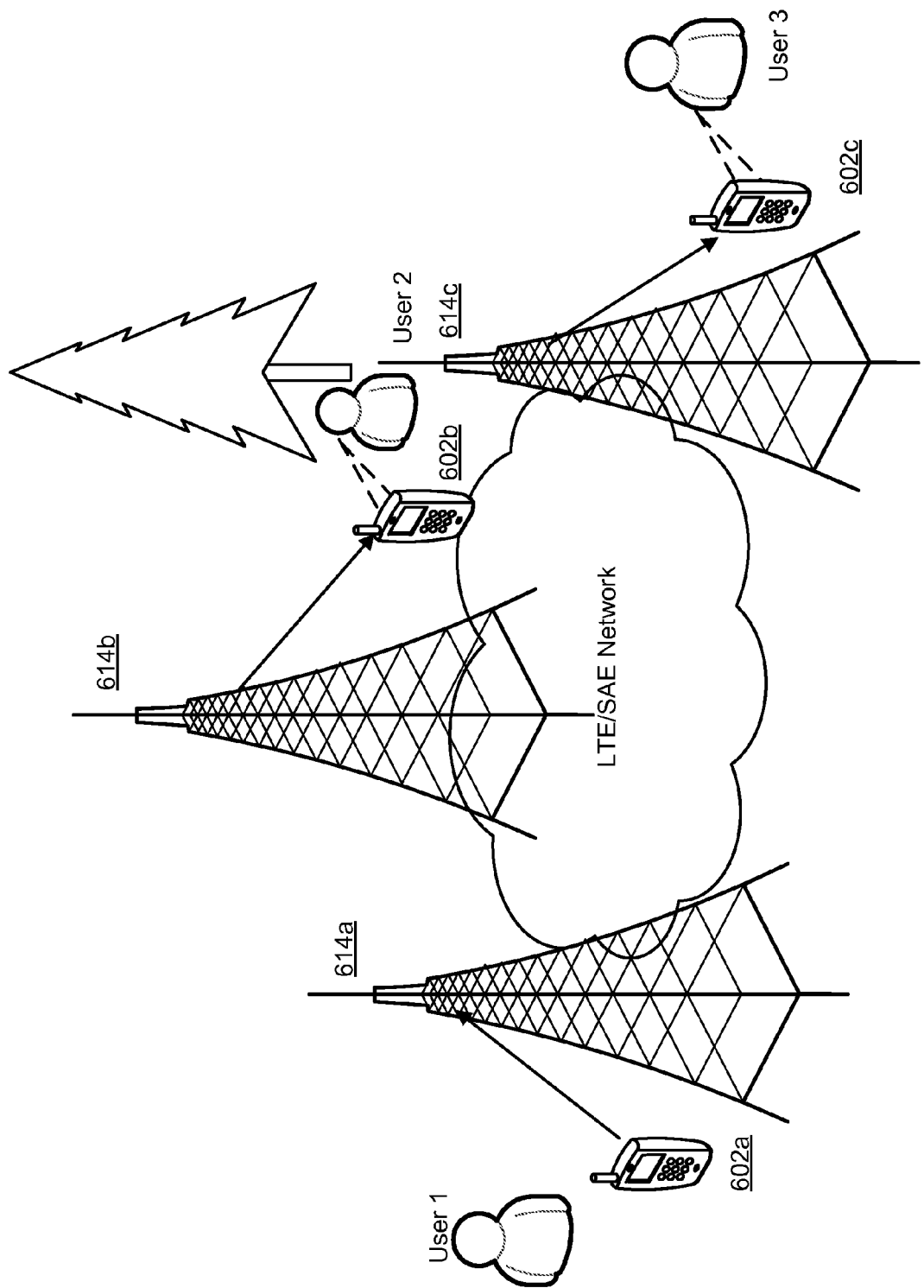
FIG. 6 is a block diagram illustrating an example of a system architecture for a video conferencing system.

Taking into account QoE in resource allocation may lead to new ways to optimize network resource allocation. Consider, for example, a video teleconferencing scenario, where each of the three participants joins the teleconference via respective UEs. An example of a system architecture for a video conferencing system configured to handle such video teleconferencing scenario is shown in FIG. 6. Psychological studies show that, the video QoE may depend on a number of environmental factors, including, for example, lighting conditions. If the lighting is bright, a user may become more astute and may perceive the same QoE with a lower quality video. In the example shown in FIG. 6, User 2 is in a dark lighting condition, and User 3 is in a bright lighting condition. Note that, since User 2 and User 3 attempt to obtain the same video content from User 1 (e.g., without transcoding and/or by ignoring packet losses in the core network), the video traffic arriving at the two eNodeBs, eNode B 614*b* and eNode B 614*c*) is the same. Because User 2 is in a darker lighting condition, UE 602*b* may need a video of higher objective quality to get the same QoE as User 3. This may mean that, assuming the channel conditions are the same for User 2 and User 3, the eNode B 614*c* may use fewer resources than eNode B 614*b*, while providing the same QoE. The saved resources may be allocated to other users being served by eNode B 614*c*. Such saved resource may be particularly beneficial when eNode B 614*c* is congested and/or resource constrained.

Another situation to consider is where User 2 moves from the dark light condition to a bright lighting condition over time. Such information may be passed to the eNode B 614*b*, whereupon the eNode B 614*b* may adjust its resource allocation accordingly.

Various other factors may affect QoE. These factors may include, for example: type of video packet (e.g., temporal layers in hierarchical P video coding); delay jitter; motion (between the UE and the end user); illumination/lighting; device information: display type, display size; viewing angle and viewing distance; and the like.

Another factor to consider for network resource allocation is that different users may have different QoE for the same video and/or the same environmental factors. To allocate network resources based on QoE, the network may need to take into account diverse user differences. One way to provision QoE may be by translating a desired QoE to a corresponding QoS level with consideration of user characteristics and preferences. Diversity in user differences may necessitate a larger number of desired QoS levels to support efficient QoE based resource allocation.

Figure 7:
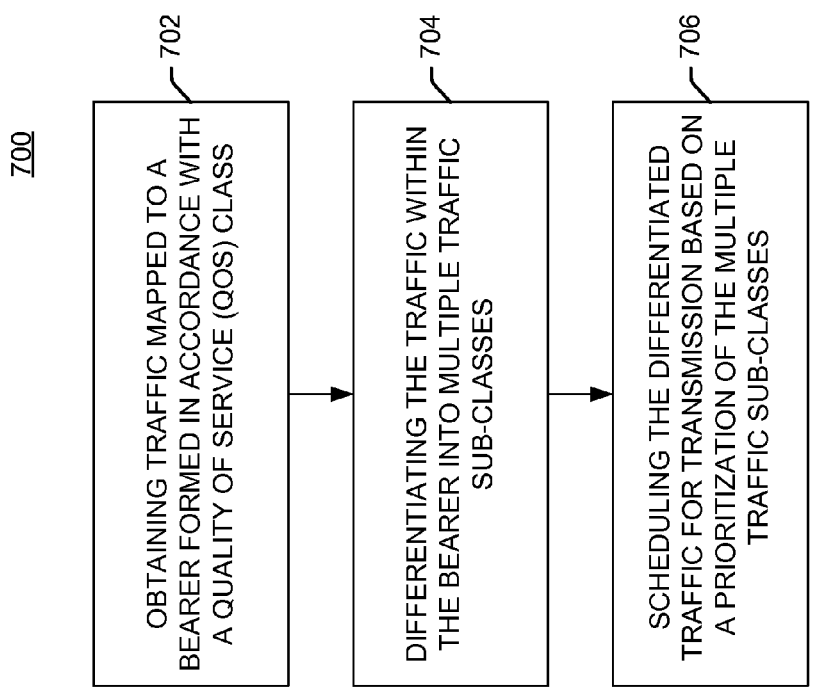

Referring now to FIG. 7, a flow diagram illustrating an example of a flow 700 directed to hierarchical traffic differentiation is shown. The flow 700 may be carried out to, for example, handle congestion and/or to manage user QoE.

At process block 702, traffic mapped to a bearer formed in accordance with a QoS class (QCI level) is obtained. At process block 704, the traffic within the bearer is differentiated into multiple traffic sub-classes (intra-QCI levels). Differentiating the traffic within the bearer into multiple traffic sub-classes may include obtaining an indication of which traffic sub-class of the multiple traffic sub-classes to assign a packet of the traffic to.

In an embodiment, the packet may include the indication, and obtaining the indication may include performing packet inspection of the packet to reveal the indication. The indication may be disposed in various locations within the packet. For example, the packet may include a header, and the header may include the indicator. The header may be, or be in accordance with, the GTP, for instance.

In an embodiment, obtaining the indication may include performing packet inspection of the packet to obtain information about the packet, and deriving the indication based on the obtained information. The obtained information may include, for example, an application-specific signature for distinguishing different types of traffic.

In an embodiment, obtaining the indication may include receiving the indication via signaling (e.g., signaling separate from the packet).

In an embodiment, the indication may be indicative of a priority of the traffic sub-class to assign the packet to. In an embodiment, the packet may include a QCI corresponding to the QoS class. In an embodiment, the indicator may be a sub-QCI.

In an embodiment, the indication may be indicative of a policy rule to be applied to the traffic sub-class to handle the packet to. In an embodiment, the policy rule may include parameters to use for policing and/or scheduling packets of the traffic sub-class.

At process block 706, the differentiated traffic is scheduled for transmission based on a prioritization of the multiple traffic sub-classes. Scheduling the differentiated traffic may include adjusting a scheduled time of transmission of a packet the differentiated traffic based on the prioritization of the multiple traffic sub-classes. The scheduling of the differentiated may be carried out in view of a lack of resources and/or congestion. The congestion may include user plane RAN congestion (UPCON), for instance.

Although not shown, the differentiated traffic may be filtered based on the prioritization of the multiple traffic sub-classes, in lieu of, in addition to or in combination with the scheduling of the differentiated traffic. In an embodiment, filtering the differentiated traffic may include filtering a packet from the differentiated traffic based on the packet being assigned to a traffic sub-class of the multiple traffic sub-classes having a priority less than a priority of at least one other traffic sub-class of the multiple traffic classes. In an embodiment, the packet may be filtered from the differentiated traffic based on the packet being assigned to a traffic sub-class of the multiple traffic sub-classes having a priority less than a priority of each of the multiple traffic classes. In an embodiment, the packet may be filtered from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic.

The flow 700 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flow 700 may be carried out in other communications systems, as well.

Figure 8:
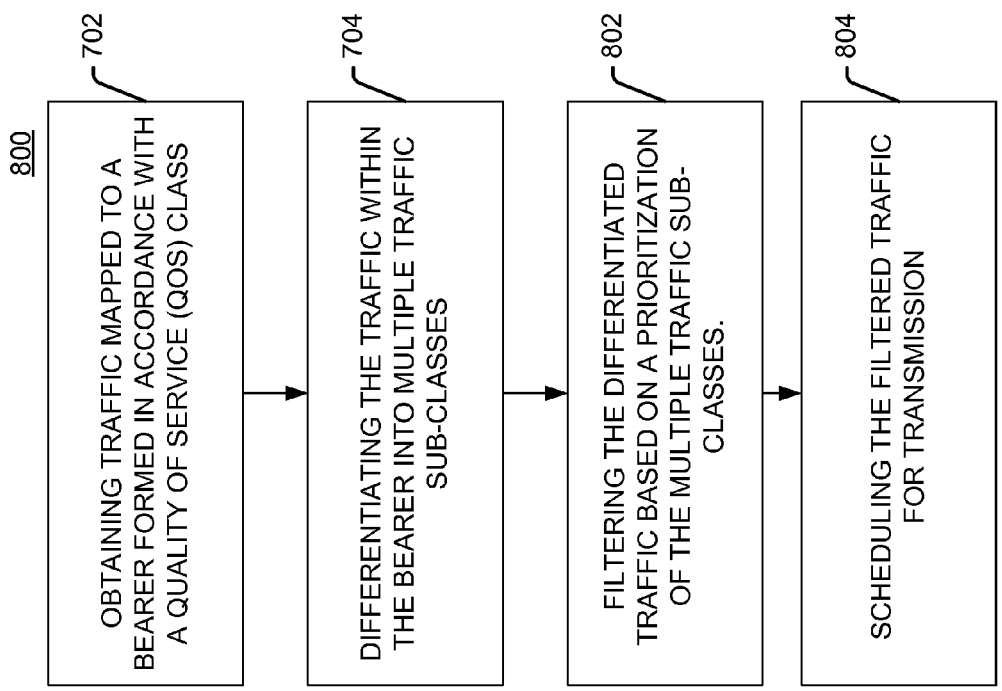

FIG. 8 is a flow diagram illustrating an example of a flow 800 directed to hierarchical traffic differentiation. The flow 800 may be carried out to, for example, handle congestion and/or to manage user QoE. The flow 800 of FIG. 8 is similar to the flow 700 of FIG. 7, except as described herein.

At process block 802, the differentiated traffic is filtered based on the prioritization of the multiple traffic sub-classes. In an embodiment, filtering the differentiated traffic may include filtering a packet from the differentiated traffic based on the packet being assigned to a traffic sub-class of the multiple traffic sub-classes having a priority less than a priority of at least one other traffic sub-class of the multiple traffic classes. In an embodiment, the packet may be filtered from the differentiated traffic based on the packet being assigned to a traffic sub-class of the multiple traffic sub-classes having a priority less than a priority of each of the multiple traffic classes. In an embodiment, the packet may be filtered from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic.

The filtering of the differentiated traffic may be carried out in view of lack of resources and/or congestion. The congestion may include UPCON.

At process block 804, the filtered traffic is scheduled for transmission. In an embodiment, scheduling the filtered traffic for transmission may be based on the prioritization of the multiple traffic sub-classes. This may include adjusting a scheduled time of transmission of a packet the filtered traffic based on the prioritization of the multiple traffic sub-classes.

The flow 800 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flow 800 may be carried out in other communications systems, as well.

FIGS. 9 and 10 are flow diagrams illustrating examples of flows 900 and 1000 directed to hierarchical traffic differentiation. Each of the flows 900 and 100 may be carried out to, for example, handle congestion and/or to manage user QoE. The flows 900 and 1000 of FIGS. 9 and 10 are similar to the flows 700 and 800 of FIGS. 7 and 8, respectively, except that the scheduling and/or filtering of the differentiated traffic is based on respective polices for managing the multiple traffic sub-classes, such as, for example, applicable policies provided infra and/or supra.

The flows 900 and 1000 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flows 900 and 1000 may be carried out in other communications systems, as well.

Figure 11:
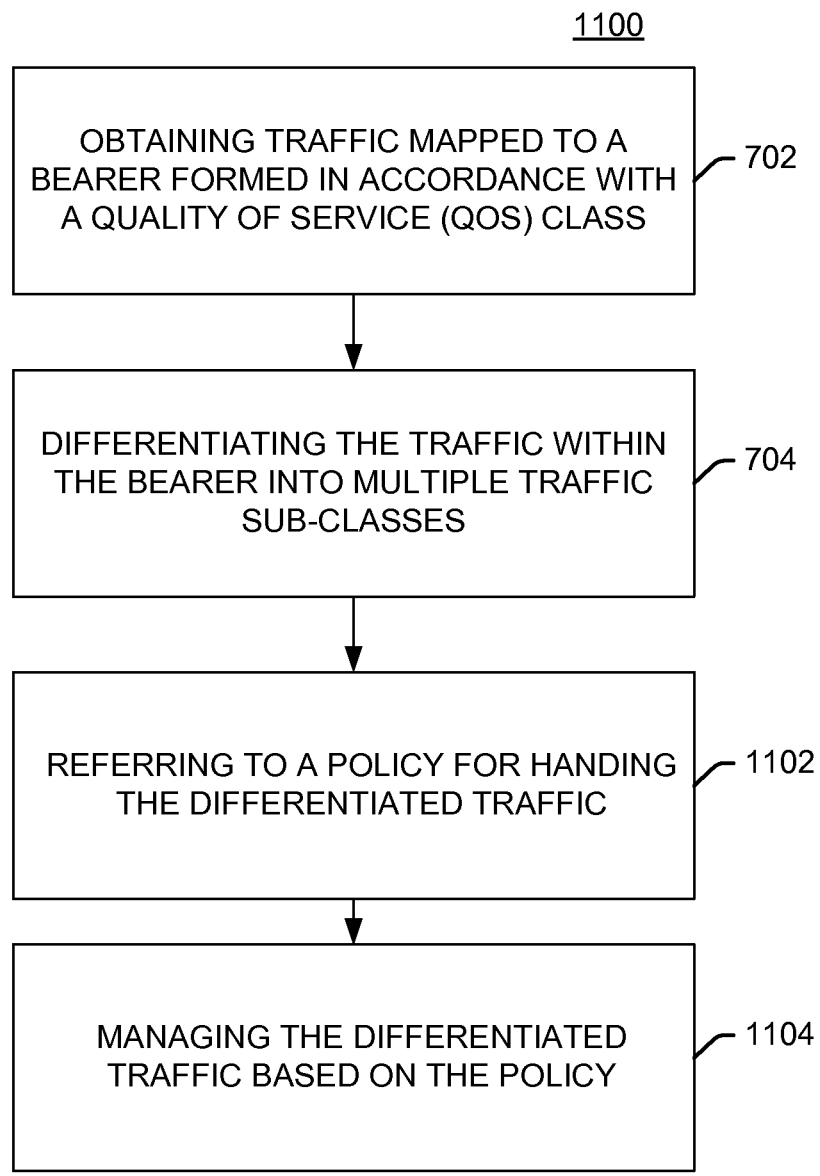

FIG. 11 is a flow diagram illustrating an example of a flow 1100 directed to hierarchical traffic differentiation. The flow 1100 may be carried out to, for example, handle congestion and/or to manage user QoE. The flow 1100 of FIG. 11 is similar to the flows 700, 800, 900 and 1000 of FIGS. 7-10, except as described herein.

At process block 1102, a policy for handing the differentiated traffic is referred to. At process block 1104, the differentiated traffic is managed based on the policy. The policy may be any of the policies for handling differentiated traffic provided infra and/or supra (e.g., in the policy table described below). In an embodiment, the policy may include one or more conditions derived from user subscription information and/or one or more conditions derived from operator policies. The policy may include other conditions, as well.

The flow 1100 may be carried out by various entities of the communications system 200 of FIGS. 2A-2B, such as the WTRU 202 and/or various nodes of the network 203, including, for example, the base station 260, SGW 264, PGW 266 and other data plane network elements and/or nodes. The flow 1100 may be carried out in other communications systems, as well.

Among the methods, apparatuses and systems for performing hierarchical traffic differentiation and/or employing hierarchical traffic differentiation are methods, apparatuses and systems for carrying out the hierarchical traffic differentiation using a tree-based structure and/or methodology. The tree-based structure and/or methodology may include, for each or any QCI level, one or more subordinate or intra-QCI level identifiers ("sub-QCIs"). These sub-QCIs may be associated with respective priorities of sub-flows of a flow and/or traffic sub-classes to assign the sub-flows to.

Also among the methods, apparatuses and systems are methods, apparatuses and systems in which the TFT may be extended to include the application-specific signature for distinguishing the different types of traffic. The application-specific signature may be available in the user profile or UE context (for, e.g., HSS), and installed in the core network nodes (e.g., a PCEF) and the RAN nodes (e.g., the UE). These nodes may be provisioned with, and maintain, respective policy tables. Each of these with policy tables may include rules for handling specific sub-flows within a bearer, their relative priority with respect to each other, their share of the QoS parameters, etc.

Intermediate nodes (e.g., the eNode B) may be configured to detect which of the sub-flows each packet belongs to. The intermediate nodes, which have the capability to perform DPI, may be configured with the application signatures. Alternatively, the application signatures might only installed in edge nodes; which nodes may perform DPI to determine the sub-QCI of each packet and forward the information along with the user-plane packet node. The intermediate nodes may recover the sub-QCI value associated with each user-plane packet, and may use the policy table to determine the handling for the packet.

To facilitate the using the tree-based structure and/or methodology, the network and/or the RAN layers may be configured to handle interactions between application and the core network so as to provide the traffic at a granularity attendant to the sub-QCI level, and handle creation and/or removal of dedicated EPS and radio bearers in accordance with such QoS differentiation.

QoE Assessment

QoE may be assessed either subjectively or objectively. An objective approach is provided herein. In particular, certain QoE models provided herein may be used to infer the QoE to be perceived by an end user based on values of video quality parameters. These video quality parameters may the QoS parameters and/or characteristics of the video application.

In "Opinion model for video-telephony applications", ITU-T Recommendation G. 1070, 2009, some video quality parameters include: End-to-end delay, Packet-loss rate, Bit rate, Frame rate, and Video codec parameters, including Codec type, Video format, Key frame interval and Video display size.

While these parameters are valuable measures of video transmission quality, additional parameters may be used as described herein to obtain a more accurate measure of the subjective video quality. These parameters include type of video packet (e.g., temporal layers in hierarchical P), delay jitter, motion (between the UE and the end user), illumination/lighting in the source and/or destination environment, end user feedback, and device information: display type, display size, viewing angle and viewing distance. These and other parameters are further described in U.S. Provisional Application Ser. No. 61/588,588, filed Jan. 19, 2012, entitled "Viewing Conditions Adaptive Coding and Delivery of Visual Information", which are incorporated herein by reference.

In some embodiments, an extensible mechanism may be used to represent QoE parameters. For example, a service description protocol (SDP) may be used to describe QoE parameters. Alternatively, some embodiments may use knowledge representation languages, such as XML. Environmental information, such as illumination/lighting, viewing angle, viewing distance, may be measured by sensors on a UE. Device information, such as display type, display size, etc., may be passed to and stored in the network during the registration of the UE, or along with the QoE request.

In one example embodiment, the QoE estimation can be obtained by calculating:

$$QoE\_estimate = -a*\log(\text{packet\_loss\_rate}) - b*U(\text{packet\_delay} - \text{delay\_threshold}) + c*\text{bit\_rate} + d*\text{frame\_rate} + e*\text{viewing\_distance} + f*\text{motion} + g*\text{ambient\_lighting} - h*\text{display\_size},$$

where a, b, c, d, e, f, g are all positive coefficients, U( ) is the unit step function which takes value 0 if the argument evaluates negative and takes value 1 otherwise, delay_threshold is the acceptable packet delay.

The values of the coefficients may depend on the content of the video, display type, or other QoE parameters, and may also be determined empirically. Alternatively, in some embodiments, additional terms are added to account for the content of the video, display type or other QoE parameters. In various embodiments, the QoE parameters are sent from the UEs to the eNode B or to the core network.

To account for individual difference between different users, the end user may provide feedback on the QoE of the video being watched so that the network can allocate resources to suit the user's particular needs. Such feedback may be used to improve a percentage of users whose user experience is unsatisfied. As an example, consider FIG. 6, where User 2 and User 3 have the same viewing condition. User 3 may be more sensitive and need a higher video resolution in order to be satisfied. User 3 may pass the feedback of dissatisfaction to the network. The network, in response to such feedback, may allocate resources, as appropriate, in an attempt to satisfy the QoE for User 3.

Flow Labeling for Fine Traffic Differentiation
Tree-Shaped Priority Mapping

The PCC system 219 may provide mapping of flows (as identified by TFTs) to QCIs. Table 1 shows QCI characteristics that may be used for mapping flows to the specified QCIs. A sub-QCI (or intra-QCI level) label may be assigned and/or applied to the flows based on sub-priorities of the sub-flows within each flow and/or on the traffic sub-classes to assign the sub-flows to. Such sub-QCI labeling may be implemented using a tree-based priority mapping structure. The sub-QCI labels may exist on the tree-based priority mapping structure as leaves subordinate to the QCIs. In the downlink, the PGW 266 may be provisioned with mapping rules to support the sub-QCI labels and/or the tree-based priority mapping structure. In the uplink, the base station 260 (e.g., eNodeB) may be provisioned with mapping rules to support the sub-QCI labels and/or the tree-based priority mapping structure. Table 2 (below) lists the 9 QCIs, corresponding attributes of each of the QCI types, and example sub-QCI labels for the 9 QCIs.

TABLE 2

QCIs, Corresponding Attributes and Example sub-QCI labels

| QCI | Resource Type | Priority | Packet Delay Budget (NOTE 1) | Packet Error Loss Rate (NOTE 2) | Sub-QCI | Example Services |
|---|---|---|---|---|---|---|
| 1 | GBR | 2 | 100 ms | $10^{-2}$ | Sub-QCI = 1<br>Sub-QCI = 2 | Conversational Voice |
| 2 | | 4 | 150 ms | $10^{-3}$ | Sub-QCI = 1<br>Sub-QCI = 2 | Conversational Video (Live Streaming) |
| 3 | | 3 | 50 ms | $10^{-3}$ | Sub-QCI = 1<br>Sub-QCI = 2 | Real Time Gaming |
| 4 | | 5 | 300 ms | $10^{-6}$ | Sub-QCI = 1<br>Sub-QCI = 2 | Non-Conversational Video (Buffered Streaming) |
| 5 | Non-GBR | 1 | 100 ms | $10^{-6}$ | Sub-QCI = 1<br>Sub-QCI = 2 | IMS Signalling |
| 6 | | 6 | 300 ms | $10^{-6}$ | Sub-QCI = 1<br>Sub-QCI = 2 | Video (Buffered Streaming) TCP-based (e.g., www, e-mail, chat, ftp, p2p file sharing, progressive video, etc.) |
| 7 | | 7 | 100 ms | $10^{-3}$ | Sub-QCI = 1<br>Sub-QCI = 2 | Voice, Video (Live Streaming) Interactive Gaming |
| 8<br>9 | | 8<br>9 | 300 ms | $10^{-6}$ | Sub-QCI = 1<br>Sub-QCI = 2<br>Sub-QCI = 3<br>Sub-QCI = 4 | Video (Buffered Streaming) TCP-based (e.g., www, e-mail, chat, ftp, p2p file sharing, progressive video, etc.) |

The base station 260 and/or any intermediate node may extract the sub-QCI information from the user-plane packet. Alternatively, the base station 260 and/or any intermediate node may derive the sub-QCI information using an application signature along with performing deep packet inspection. The base station 260 and/or any intermediate node may use the sub-QCI information for scheduling or RRM decisions. The base station 260 and/or any intermediate node may use the sub-QCI information to decide which frames may be dropped due to congestion, pursuant to active queue management (for e.g. Random Early Detection (RED)) or the like.

The sub-QCI information may provide and/or convey relative priority, and/or drop precedence, of packets within the same bearer/QCI class. In various embodiments, a certain sub-QCI may be associated with individual MBR, or a wildcard to indicate the associated traffic/sub-flow may use any left-over resources not consumed by other higher-precedence sub-flows.

In various embodiments, the sub-QCI (intra-QCI level) prioritization along with associated application signature may be provided by the HSS for each UE context, and may be installed in the network nodes (e.g., the PGW 266, PCEF 270, base station 260, MME 262, etc) during WTRU 202 configuration/attach procedures. This may make configuration information available when a default bearer is created, to allow demarcation of traffic within a default bearer.

The application signature may include new or additional parameters added to the TFT rules to differentiate sub-flows within a flow, and may use existing or new packet inspection (DPI) rules. As an example, sub-categorization of Skype application may be defined to map voice with sub-QCI 1, video with sub-QCI 2 and text data with sub-QCI 3.

Mapping Function for Sub-Flow Traffic Differentiation

The sub-QCI information may be used at the edge and/or intermediate network nodes (e.g., the PGW 266 and/or base station 260, respectively) to map packets to particular sub-flows by performing packet inspection (DPI). The rules provided at the edge and/or intermediate network nodes to map certain sub-flows of traffic belonging to a certain flow (QCI) may be configured during WTRU configuration (e.g., configured by the MME 262 to the base station 260 in the UE (WTRU) context), or specifically configured when an EPS bearer is configured.

The rules may be installed by default in the edge nodes (e.g., the PGW 260, PCEF 270, etc.) or any intermediate nodes per application. As an example, rules for handling 2 sub-priorities may be installed for application traffic of a video application. Table 3 (below) illustrates such rules applied to a particular instance of a QCI and corresponding sub-QCIs.

TABLE 3

| QCI = 2 (Conversational Video) | I-frame/IDR-frame | Priority = 0 | TFT Rule (UDP Port = x) |
|---|---|---|---|
| | P-frame | Priority = 1 | TFT Rule (UDP Port = y) |

As another example, the sub-priorities may be applied to the different temporal layers in Hierarchical-P coded video. Table 4 (below) illustrates such sub-priorities applied to the different temporal layers in Hierarchical-P coded video for a particular instance of a QCI and corresponding sub-QCIs.

TABLE 4

| QCI = 2 (Conversional Video) | Temporal Layer 0 | Sub-Priority = 0 | TFT Rule (UDP Port = x) |
|---|---|---|---|
| | Temporal Layer 1 | Sub-Priority = 1 | TFT Rule (UDP Port = y) |
| | Temporal Layer 2 | Sub-Priority = 2 | TFT Rule (UDP Port = z) |

For conversational video flows with all P-Frames with a single layer video CODEC, prioritization may be performed based on the variation of importance of the video content. Such importance may be based on that some frames (even for all P-Frame single layer coding), if lost, can have a larger impact on the end user QoE than others.

The traffic mapping information (e.g., TFT filters for GPRS and EPS) that the PCRF 220 provides to the PGW 266 may include the TFT rules, e.g. the UDP port number for a real-time protocol (RTP) session indicates the sub-stream, and the corresponding rules may be installed in the PCEF 270.

The individual sub-QCI information may be added to an IP-CAN session during a create packet data protocol (PDP) Context Request/EPC Bearer Create Request, which may include specific QoS requirements and traffic mapping information (e.g., a TFT). A Create PDP Context Response message, indicating that a new PDP context is created, is sent to the SGW 264 (or a SGSN (not shown)). The response may include any changes in QoS according to bearer binding and policy enforcement.

The WTRU 202 may use the uplink TFT and downlink TFT to associate EPS bearer activation or modification procedures to an application and to traffic flow aggregates of the application. The PGW 266 may, in the Create Dedicated Bearer Request and the Update Bearer Request messages, provide (e.g., all) available traffic flow description information (e.g., source and destination IP address and port numbers and the protocol information).

The sub-QCI and application signatures may be added to TFT rules as follows:

The sub-QCI policy provisioning may be at the dynamic PCC or static PCC rules. If dynamic PCC is deployed, then the PCRF 220 may send a PCC decision provision with sub-QCI mapping information to the PGW 266. If dynamic PCC is not deployed, the PGW 266 may apply local QoS policy.

The PGW 266 may use the QoS policy to assign the EPS Bearer QoS (e.g., it may assign values to the bearer-level QoS parameters, such as the QCI, sub-QCI, ARP, GBR and MBR).

The base station 260 may map the EPS Bearer QoS to the RB QoS. The base station 260 may signal a RRC Connection Reconfiguration (Radio Bearer QoS, Session Management Request, EPS RB Identity) message to the WTRU 202. The WTRU may store the QoS Negotiated, Radio Priority, Packet Flow Id and TI, which it received in the Session Management Request, for use when accessing via GERAN or UTRAN. The WTRU non-access stratum (NAS) may store the EPS Bearer Identity and links the dedicated bearer to the default bearer indicated by the Linked EPS Bearer Identity (LBI). The WTRU 202 may use the uplink packet filter (UL TFT) including the sub-QCI to determine the mapping of traffic flows to the RB. The WTRU 202 may provide the EPS Bearer QoS parameters to the application handling the traffic flow.

Alternatively, the sub-QCI and application signatures mapping function rules may be added to the UE context in the UE subscription profile and installed and/or removed in network nodes during UE (WTRU) configuration and/or reconfiguration procedures (for e.g. UE attach procedure). The WTRU 202 may add sub-QCIs, as appropriate, to the TFTs and/or the IP flows in the uplink based on policies provided by the ANDSF 222 via, for example, the S14 reference point. Alternatively and/or additionally, the WTRU 202 may add sub-QCIs, as appropriate, to the TFTs and/or the IP flows in the uplink or based on UE (WTRU) pre-configuration, such as, for example, policies installed in memory (e.g., at a universal integrated circuit card (UICC)) of the WTRU 202.

Network Procedures to Handle Legacy Flows and New Flows Concurrently

The network may handle legacy flows and new flows concurrently. During the EPS bearer setup process, the PCRF 220 may derive the QoS rules for a particular SDF. The SDF that receives QoS rules having a QCI without a sub-QCI is referred to herein as a legacy flow. The SDF that receives QoS rules having a QCI and a sub-QCI is referred to herein as a new flow. The PCRF 220 may pass the QoS rules and information extracted by the AF 272 to the PCEF 270, which may handle both types of flows according to the QoS rules.

Any of the core network node and/or edge network nodes (e.g., the PGW 266) may first perform service differentiation at the QCI level for all flows. If active queue management is to be carried out for any flow, the network node to perform active queue management may determine whether the flow has a sub-flow policy defined and signature available. If such flow is a new flow, the network node may use the sub-QCI information (e.g., the sub-QCI information set forth in Table 2) for finer service differentiation. Otherwise, the network node (e.g., the PGW 266) may use the QCI level granularity.

SIP/Application Procedures to Request Flows with Sub-QCI, Extension of Rx

The Proxy-Call Service Control Function (P-CSCF) may extract information from the IMS signaling (for example, a SIP INVITE packet), which may carry a request for setting up multi sub-streams for an application, such as video teleconferencing. The P-CSCF may pass the extracted information to the PCRF 220. The PCRF 270 may derive the QCI or QCI and sub-QCI for the SDF.

As an example, a SIP INVITE may contain a Session Description Protocol (SDP) packet, which in turn, may include parameters to be used by the multimedia session. These parameters may include, for example, sub-stream identity: stream ID, port number; packet loss rate; delay; delay jitter; bit rate, etc. Certain attributes for the SDP packet may also be defined to describe a desire of having multi sub-streams for a single application session. As an example, using the SDP syntax, three sub-streams are defined:

a=streams:S1 S2 S3 /* define three streams called S1, S2 and S3 */

As another example, the desired QoS requirements for the three streams may be specify as follows:

a=streams:S1 S2 S3 /* define three streams called S1, S2 and S3 */
m=video 20000 RTP/AVP 96 /* packet type 96, mapped from NAL Unit type */
a=rtpmap:96 H264/90000
a=fmtp:96 profile-level-id=42A01E; packetization-mode=0; mst-mode=NI-T;
a=lossRate:96 5e-3 /* define desired packet loss rate, intended for the network */
a=maxDelay:96 200 /* define max delay in ms */
a=mid:S1
m=video 20002 RTP/AVP 97 /* packet type 97, mapped from NAL Unit type */
a=rtpmap:97 H264/90000
a=fmtp:97 profile-level-id=42A01E; packetization-mode=1; mst-mode=NI-T;
a=lossRate:97 2e-2 /* define desired packet loss rate */
a=maxDelay:97 300 /* define max delay in ms */
a=mid:S2
m=video 20004 RTP/AVP 98 /* packet type 98, mapped from NAL Unit type */
a=rtpmap:98 H264/90000
a=fmtp:98 profile-level-id=42A01E; packetization-mode=1; mst-mode=NI-T;
a=lossRate:98 5e-2 /* define desired packet loss rate */
a=maxDelay:98 400 /* define max delay in ms */
a=mid:S3

In the above example, two SDP attributes a=lossRate, a=maxDelay are used. When the P-CSCF reads the SDP payload, it may pass the information of requesting three sub-streams and the associated QoS requests to the PCRF 220, which may then derives the QCI and sub-QCI for each sub-stream.

The Rx interface may be extended or otherwise adapted to pass the information from the AF 272 to the PCRF 220 for the latter to derive the sub-QCI. The information may include any of the parameters described above. The Gx interface may be extended or otherwise adapted to handle exchange of the sub-QCIs between the PCRF 220 and the PCEF 270.

Sub-QCI Identification in User Plane Packets

The edge nodes, such as the PGW 266 for downlink (DL) and the base station 260 for the uplink (UL), may associate each user-plane frame with the associated sub-QCI, so that intermediate nodes can apply applicable policy rules to handle each packet appropriately. The association may be presented using any of the field values in a header (e.g., GTP header),e.g., spare values in the GTP header, or using a hash function to compute a unique TEID defined by combining and/or multiplexing the QCI and sub-QCI. Alternatively, the value may be embedded in the payload of the GTP packet, e.g., the ToS field in the IP header, may carry information regarding the sub-QCI of the flow.

The use of sub-QCI allows the network 203 to select only a subset of the packets to serve in the event of network congestion. Other mechanisms may be used together with the use of the sub-QCI. For example, the network 203 may perform admission control, i.e., which EPS bearer setup request should be granted based on the network resource availability and the user subscription service. Another example is access control. Before the WTRU 202 requests to establish an EPS bearer, it may need to connect to the base station 260. The request may be made via a RRC Connection Request message sent from the WTRU 202 to the base station 260. When the base station makes a decision whether or not to accept the request, the base station 260 can take into account network resource availability; e.g., if the wireless channel is heavily loaded, the base station 260 may reject the request; otherwise, the base station may accept the request.

End-To-End QoE Coordination

An application (e.g., video) session may span multiple networks. Described herein are methods to provide for, and negotiate, systems resource provisioning that takes into account the end-to-end video perception. Due to the difference in end users' preferences, in the device capabilities, in the environmental conditions, and in other factors, different networks may provide different QoE performance.

The impact of QoE coordination can be seen in the following example. Suppose that one network uses a lot of resources to provide high QoE for a video stream, and another network offers only low QoE due to lack of resources. If coordination is not used, the end-to-end QoE will be still low, even if the first network uses a lot of resources.

Figure 12:
FIG. 12 is a call flow diagram illustrating an example end-to-end quality of experience (QoE) coordination.

In one embodiment, shown in FIG. 12, an end-to-end QoE coordination scheme is provided. The coordination is performed for the video data that flows from UE (B) to UE (A). For two-way video communications, the procedure for the opposite direction is similar. UE (A) is the calling UE, or the originating UE, and it will receive video data after the video communication begins. UE (B) is the callee, and will send video data. Note that, in FIG. 12, logical communication sessions are depicted. For example, the actual communication from UE (A) to CSCF (A) will go through a PGW of Network A.

As shown in FIG. 12, the originating UE, UE (A), sends a QoE request to the CSCF (A). The request may include one of more parameters, subsets of the parameters, in addition to other parameters:

- The video application, for example, video streaming, video conferencing, or video gaming
- The available codecs
- The device information such as the display type and size
- The environmental conditions, such as ambient lighting
- The desired QoE level Note that the desired QoE level may be trivial at this stage; UE (A) may prefer the highest QoE level allowed by its service subscription. However, this message may be reused later during the video communication when UE (A) receives an alert from the other UE and it may be beneficial for UE (A) to use a lower QoE level from the perspective of efficient use of network resources; e.g. message 10 in FIG. 12.

In this embodiment, the network of the originating UE, which is in Network A in the example, decides whether to approve the QoE request or not. The decision may depend on the amount of network resource to be consumed in order to support the requested QoE level and, e.g., the service subscription level of the originating UE.

In the example:
a. UE (A) sends the QoE request message to CSCF (A). The CSCF (A) contacts the PCRF (A), (not shown in FIG. 12). The PCRF (A)
b. considers the network resource situation and may also contact the HSS of network A in making a decision on the request.
   PCRF (A) sends the decision to UE (A). The decision shown in the example is an
c. Accept message.

The originating UE, UE (A), then sends the end-to-end QoE request and QoE related parameters (e.g., QoE assessment method, target values of the input variables to the QoE assessment method) to the terminating UE, UE (B). The QoE assessment method can be in accordance with ITU G.1070 or other methods, and the input variables may determined by the assessment method, and the target values depend on the resource available to the originating UE, UE (A). The input variables and corresponding target values may be:

a. delay in the originating network: 150 ms
b. packet loss rate: 0.2%
c. bit rate: 500 kbps
d. video codec: H.264/AVC and the configuration
e. delay jitter: 20 ms
f. screen size: 3 inch
g. illumination: bright
h. motion: slow
i. type of video content: low motion in the scene
j. display size: 3.5 inches
k. viewing distance: 12 inches After receiving the QoE request and the QoE related parameters, the terminating UE, UE (B), may evaluate its local conditions, such as viewing angle, lighting conditions, device capabilities, etc., to determine the available QoE. In some embodiments, the UE, UE (B), may provide a graphical user interface (GUI) to provide prompts to a user to provide input, and to then responsively provide further subjective viewing parameters for a QoE determination. That is, the terminating UE, UE (B), may interact with the end user on its side to obtain additional QoE related parameters between the terminating UE, UE (B), and the end user. For example, the terminating UE, UE (B), via a GUI, may ask what level of QoE the end user on its side wishes to provide, because the end user may be charged differently at different QoE levels. The terminating UE, UE (B), then determines the target QoE level that its own network needs to provide in order to satisfy the QoE request, and sends a QoE request to its own network.

The terminating UE, UE (B), may combine the values of the input variables from the originating network and the values of the input variables from its own network to estimate the end-to-end QoE.

The network of the terminating UE, namely, network B, then decides whether the QoE request will be accepted or not. Again, the decision may depend on the amount of resource to be consumed and the service subscription level of the terminating UE, UE (B). The procedure is similar to the determination made by network A.

The terminating UE, UE (B), then may send the acceptable QoE level(s) to the originating UE, UE (A). If the originating UE, UE (A), agrees, other procedures, such as, EPS bearer set up, for supporting the application session may begin, and now originating UE, UE (B), may proceed to send the video data to the now terminating UE, UE (A). Otherwise, more negotiation may be performed. For example, it may lower its requested QoE level, goes back to initiating and end-to-end QoE request.

During a video communication session, a UE may estimate the achievable end-to-end QoE periodically or based on the triggering of certain events. The events could be a change in the ambient lighting condition. A brighter ambient lighting condition allows for higher QoE with the same amount of network resource consumption. If the estimate is significantly different from the previously agreed target end-to-end QoE, the UE may alert the other UE so that a new round of coordination can be initiated. If the estimate is much higher, then better end-to-end QoE may be achieved. If the estimate is much lower, then a lower end-to-end QoE target can be set for better use of network resources.

When UE (A) receives the alert message from UE (B), it may make a decision on whether it wants to try a different end-to-end QoE level or not. If it determines that a renegotiation is desirable, it can send a QoE Request message to its own network. The QoE Request message may be similar to that in the initial step. In some embodiments, the QoE renegotiation request message includes preferred QoE level has relatively more important information, and it may be lower than the maximum QoE level that network A can provide due to consideration of optimally using network resources. Note that if SIP is used to implement the above procedure, the UEs may act as the user agents in SIP.

QoE-Based Adaptive Scheduling
User-In-The-Loop Adaptation

QoE-based Adaptive Scheduling may include user-in-the-loop adaptation. QoE is ultimately determined by the quality perceived by the end users. Because different end users may have different QoE preferences which may change dynamically as their environments change, it may be desirable in some embodiments to incorporate end users inputs in the adaptation loop of the QoE-based network resource allocation (packet scheduling) methods.

The user's preferences can be provided to the system at the set up of the service, as described above. The QoE proposed by the originating UE can take into account the end user's preference and environmental factors. For example, an interactive dialog (e.g., in the form of a GUI) between the originating UE and the end user may be used to obtain the end user's preferences. The terminating UE may provide user preference regarding the level of QoE that the end user on the terminating UE side wishes to pay for.

During the session of an application, an end user can provide his/her feedback to the system for improved QoE. For example, when the end user is not satisfied with the current QoE, he/she can provide input, such as by a press of a designated button on the UE. Alternatively, a pop up window, dialog box, or one or more slider selectors may be provided, showing the QoE features that the system can improve upon. The features may include:

better video and audio synchronization
  lower delay
  higher resolution
  smoother QoE experience Various user interfaces may be provided. The QoE features may be customized for the network to better represent and/or diagnosis the cause of QoE degradation. Each feature may also be represented by an icon. If the end user touches or clicks one of these features, the system will try to improve that feature. Multiple touches or clicks may mean that more significant improvement is needed. A color code can be used to indicate the level of a QoE feature. For example, red means a low level, and as the color changes closer to green, the level increases.

The system determines how to allocate network resources to meet the QoE improvement request. The system may also decrease the level of a QoE features based on the objectively estimated QoE and the current network resource availability because certain QoE features may have become more than what the end user needs. For example, the environment may have changed to allow for a lower QoE level. Without such a decrement mechanism, the target QoE level will increase indefinitely until reaching the maximum level.

In some embodiments, the decrement mechanism may be done automatically by the system. For example, the system can estimate the QoE level based on the current network condition and user environment, and reduce the target levels of certain QoE features if that is allowed. The decrement mechanism may also take place by an interactive process between the UE and the end user. Again, a color code can be used to indicate potentially unnecessarily high levels of QoE features, and to prompt the end user for permission for adjustment. The above automatic decrement and end-user feedback based decrement can be used separately or jointly.

Figure 13:
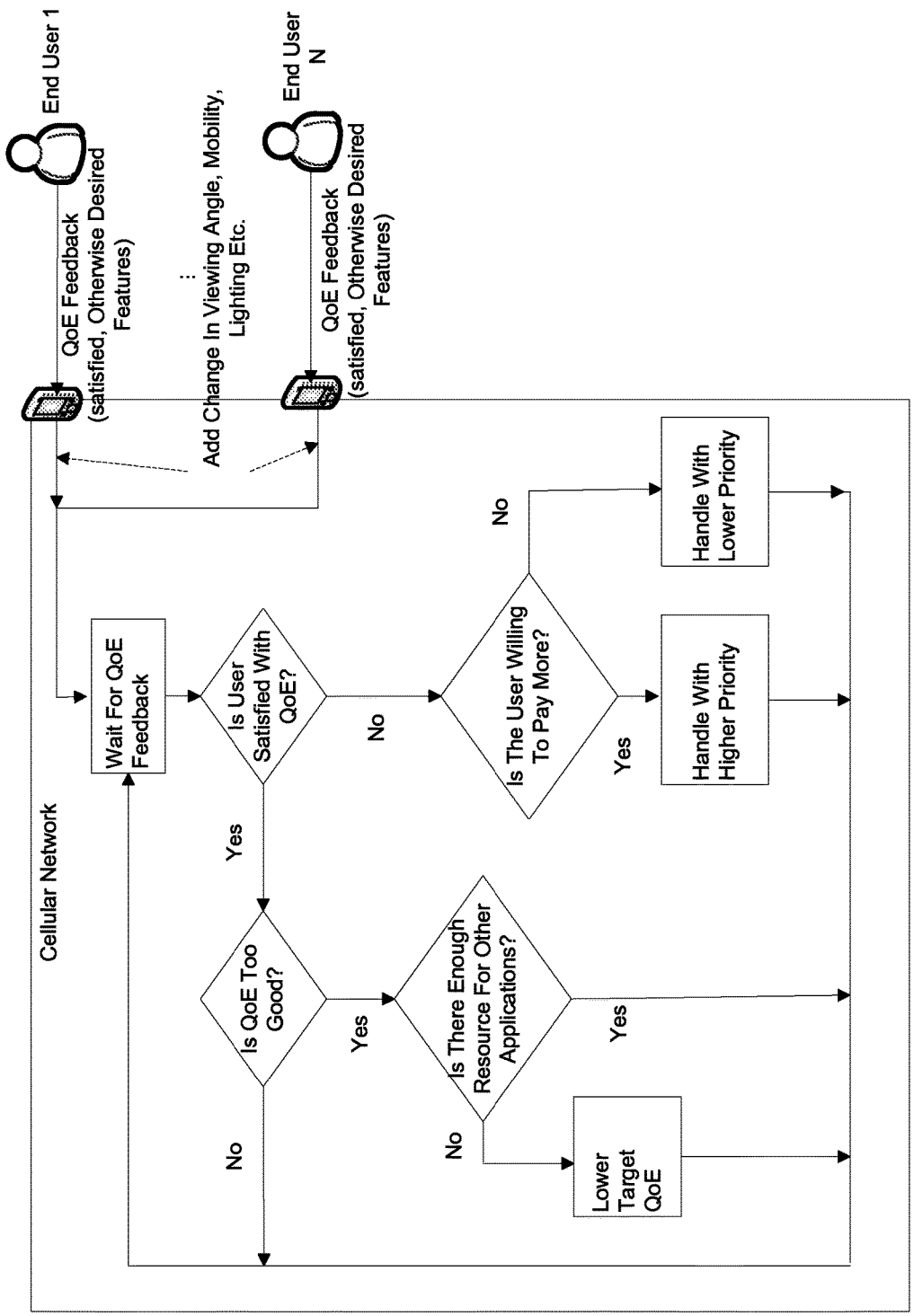
FIG. 13 is an flow diagram illustrating an example of a user-in-the-loop QoE-based adaptive scheduling.

An example implementation of the user-in-the-loop QoE adaptation is shown in FIG. 13. The method may be implemented in the eNode B, or in the core network. The QoE feedback from the end user may be used in the resource allocation by the cellular network. The feedback can indicate whether the user is satisfied with its current QoE, and if not, what the desired QoE features are. Other QoE parameters, such as delay, throughput, frame rate, display type, etc. and changes in the viewing angle, motion, lighting conditions can be also used in resource allocation.

Based on the QoE feedback and the values of other QoE parameters, the network may change resource allocation strategy for a particular end user. For example, if the end user is not satisfied with the current QoE, and his/her desired QoE feature is an increase in resolution, then the network may change its current resource allocation strategy to increase the throughput of the application the end user is running.

The change in resource allocation strategy may be passed to the resource allocation algorithm. As an example, this change may be translated to allocating more resources (e.g., PRBs in LTE) to the logical channels corresponding to the logical channels.

Figure 14:
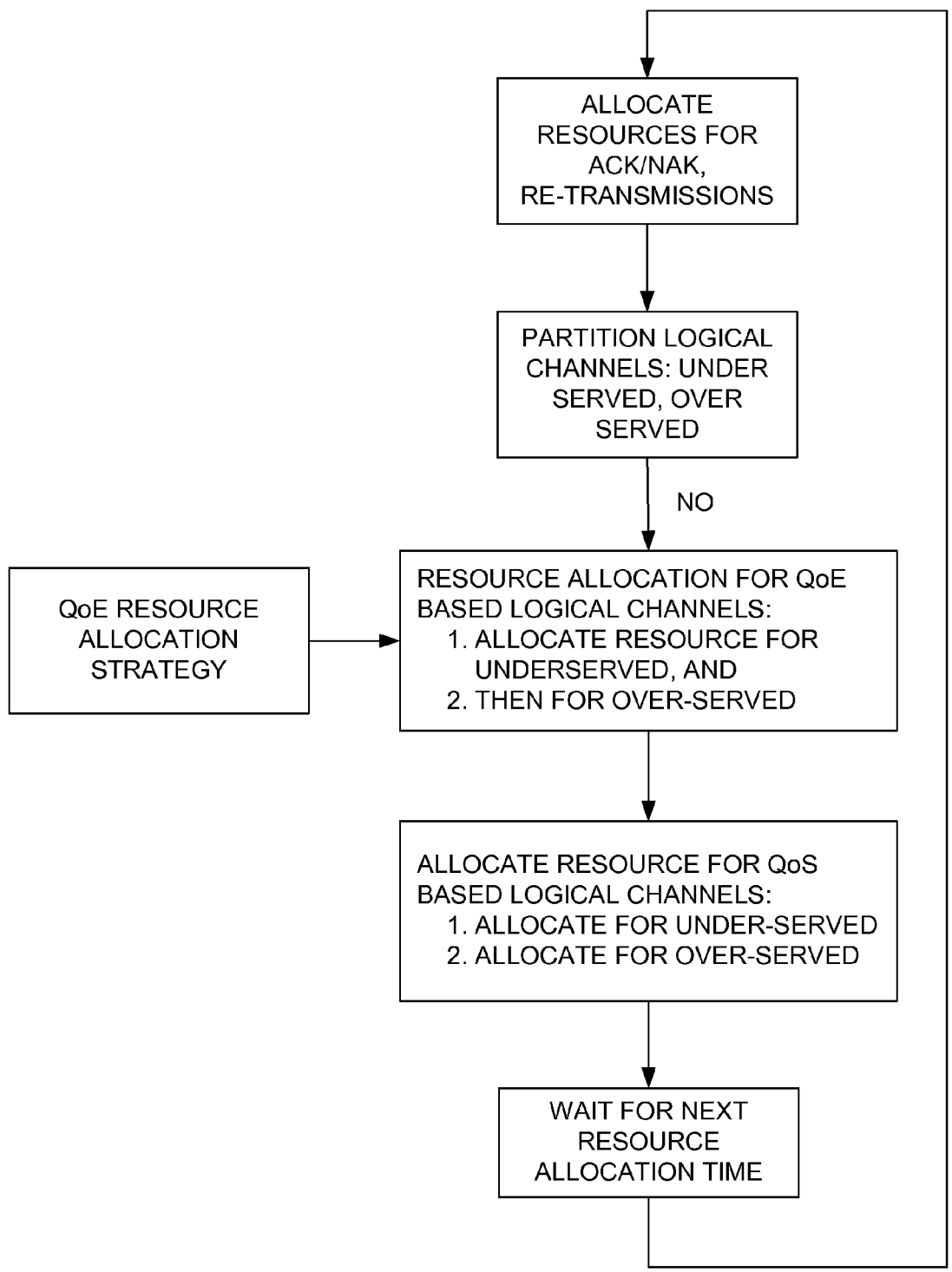
FIG. 14 is a flow diagram illustrating an example of a resource allocation method.

An example of the resource allocation method is shown in FIG. 14. The resource allocation algorithm first allocates resources for ACK/NACK and retransmissions. The resource allocation algorithm then partitions the logical channels into two sets: the set of logical channels that have been under-served, and the set of logical channels that have been over-served. By under-served (over-served), the actual QoE/QoS level is lower (higher) than the target value.

The resource allocation algorithm then allocates resources such as PRBs in LTE for logical channels associated with QoE. It first allocates resources to those in the under-served set, and then to those in the over-served set. Note that, the QoE resource allocation strategy, which may change dynamically, can influence the resource allocation result.

The resource allocation algorithm then allocates resources for logical channels associated with QoS. Again, it gives priority to the set of under-served over the set of over-served. The resource allocation algorithm finishes the current round of resource allocation, and waits for the next resource allocation time.

Various embodiments described herein may be implemented using either QoE awareness on the edge, or QoE awareness in the core, or a combination thereof, where the described functionality is split in some other fashion between network core and edge elements.

QoE Awareness on the Edge

Figure 15:
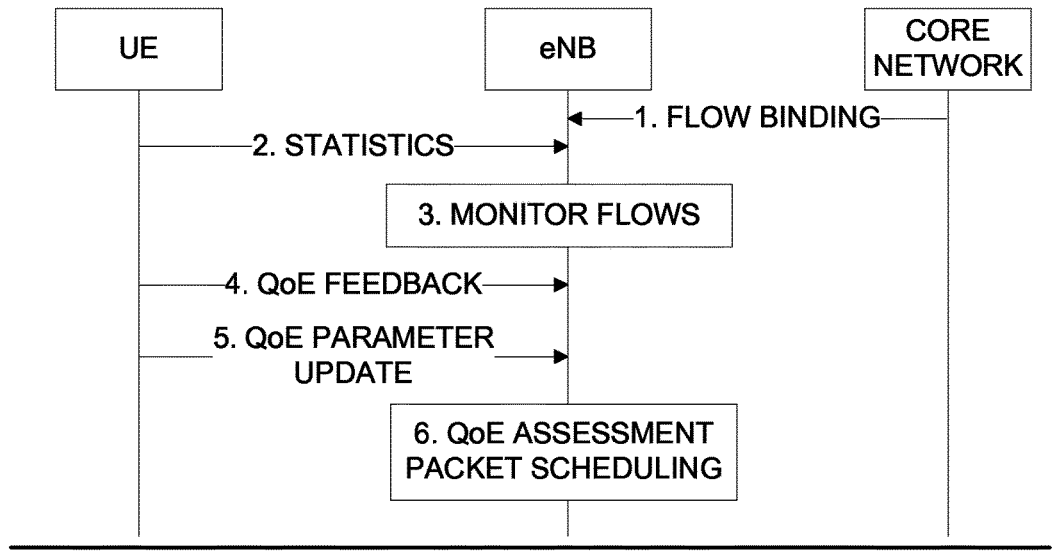
FIG. 15 is a flow diagram illustrating example embodiments with QoE awareness on the network edge.

In an architecture based on a QoE Awareness on the Edge, a base station (e.g., an eNode B) is QoE-aware, and it directly takes into account QoE in resource allocation or packet scheduling. This method may comprise one or more of the steps illustrated in FIG. 15. The Figure depicts logical communication.

The core network may inform the base station of the flow (e.g., EPS bearer) binding information. The information may indicate which flows belong to an application session. For example, a video session may have three video traffic flows, each of which carries a particular temporal layer of the hierarchical P video format. The flow binding information may also contain the target QoE for that application. As an example, the flow binding message can include the following information:

a. The address of the WTRU (e.g., a UE) involved in the application session, and the address of the base station that serves this WTRU.
  b. The address of the other end device involved in the application session, and this end device can be another a WTRU, a UE, a computer and/or server on the Internet, or some other device.
  c. The ID of the application session, which may be, for example, a 8 bit number The flow IDs of the flows that belong to this application session. The flow
  d. IDs can be in the IP 5-tuple format: source address, destination address, source port number, destination port number, and the protocol type.
  e. The target QoE level of the application session The base station may collect statistics from the WTRU that it serves. The statistics may include, for each flow:

a. end-to-end delay
  b. delay jitter
  c. packet error rate

The base station may also monitor the passing traffic flows to gather certain statistics. The WTRU may send QoE feedback from the end user to the base station, and the WTRU may send an update on the values of the QoE parameters. For example, changes in the ambient lighting condition. This update can be used to update the QoE estimate. Based on the statistics, the base station may extract the values for the QoE parameters that the packet scheduling algorithm can influence, and estimates the QoE. If the QoE estimate satisfies the requirement, the base station does not change its scheduling strategy. Otherwise, it changes its scheduling strategy and estimates the QoE again.

In the absence of QoE updates from the end user or the WTRU, the base station may still periodically assess the estimated QoE to make sure that the estimated QoE does not fall below an acceptable level, and that no over-provisioning happens in cases where there are other applications that are under-served. The elements of the core network that may be involved in this method may include a PCRF, a CSCF, and/or a PGW. The method provides relatively fast adaptation because the WTRU directly communicates with the base station without going through the core network.

QoE Awareness in the Core

Figure 16:
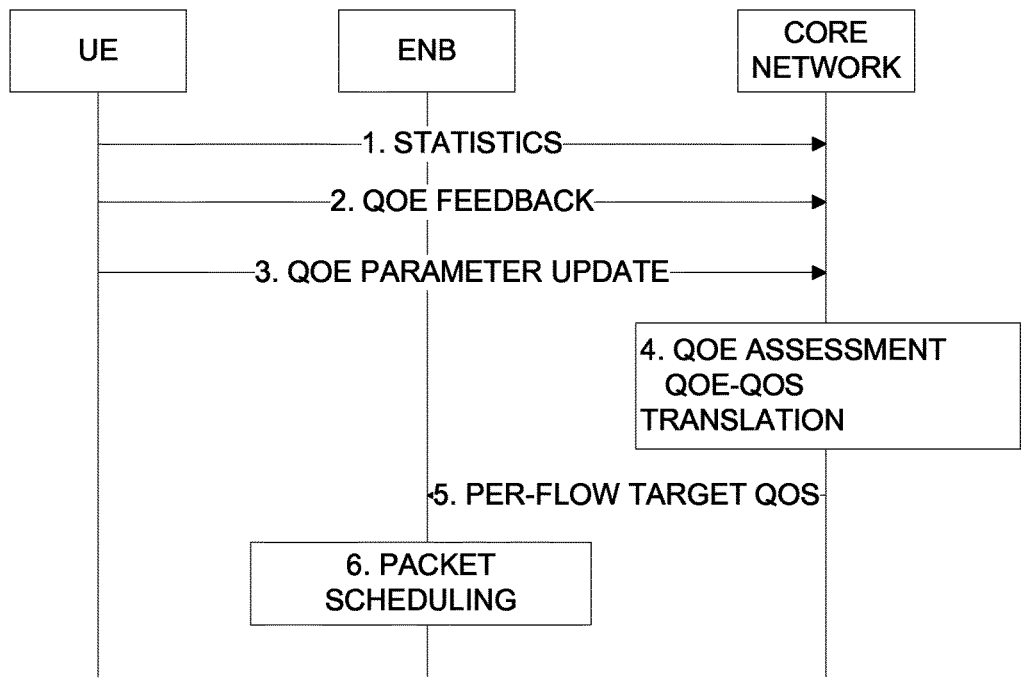
FIG. 16 is a flow diagram illustrating example embodiments with QoE awareness at the network core.

QoE Awareness in the Core, on the other hand, involves a base station (e.g., an eNode B) that might not be QoE-aware. Instead, the core network may decide what QoS level the base station should provide in order to achieve the target QoE. That is, the core network serves as a QoE-to-QoS translator. Methods according to these embodiments may include one or more of the steps illustrated in FIG. 16.

The WTRU (e.g., a UE) may send statistics about the application session to the core network. The statistics may be sent infrequently in order to reduce the traffic load on the core network since the core network may serve many other application sessions at the same time. The WTRU may also send QoE feedback from the end user to the core network. The WTRU may then send updates on the values of the QoE parameters to the core network.

The core network performs QoE assessment, and decides what QoS level will achieve the target QoE level, i.e., the QoE-to-QoS translation. The core network informs of the QoS level on a per flow basis to the base station that serves the WTRU.

The base station performs packet scheduling. Note that this may be implemented, in some embodiments, without any change in the base station, and QoS based packet scheduling algorithms may be utilized.

User Plane RAN Congestion (UPCON)

UPCON Work Item in 3GPP SA1/SA2

3GPP Standards have defined stage 1 requirements for user plane RAN congestion (UPCON) management. For example, use cases and potential requirements for the stage 1 aspects of UPCON have been defined in clause 27 of 3GPP TS 22.101 v12.3.0. The main objective of the work done was to identify requirements for handling user plane traffic when RAN congestion occurs, with the aim being to make efficient use of available resources to increase the potential number of active users while maintaining user experience. Examples of user plane traffic in this context may include keep-alive messages for smartphone applications, TCP synchronization messages, streaming data, HTTP data and/or the like.

Mitigation of UPCON Based on Intra-QCI Level Traffic Differentiation

Provided herein are methods, apparatuses and systems for carrying out hierarchical QoS differentiation of traffic within the same QCI (i.e., intra-QCI) level in view of UPCON. Among such methods, apparatuses and systems may be a method for (and/or an apparatus and/or a system adapted) for mitigating and/or otherwise affecting UPCON based on intra-QCI level traffic differentiation. Such other affectation may have, for example, (i) a positive effect on the UPCON, such as, e.g., a reduction in an amount of the UPCON; (ii) a negative effect on the UPCON, such as, e.g., an increase in an amount of the UPCON; or (iii) no net effect on the UPCON, such as e.g., a reduction in one amount of the UPCON and an corresponding increase in another amount of the UPCON. In various embodiments, the mitigation and/or other affection of the UPCON may have a positive effect in that such may cause a reduction in an amount of the UPCON with respect to a single user or multiple users. In various embodiments, the mitigation and/or other affection of the UPCON may have a negative effect in that such may cause an increase in an amount of the UPCON with respect to a single user or multiple users. In various embodiments, the mitigation and/or other affection of the UPCON may have a not net effect in that such may cause (i) a reduction in an amount of the UPCON with respect to a single user or multiple users, and (ii) an increase in an amount of the UPCON with respect to a single user or multiple users.

Utilizing PCC for Mitigation and/or Other Affectation of UPCON Based on Intra-QCI Level Traffic Differentiation Sub-QCI Attributes In various embodiments, mitigating and/or otherwise affecting UPCON based on intra-QCI level traffic differentiation may be carried out using a PCC system along with PCC policies and/or rules for reducing, and in turn, enforcing, QoS for IP flows/sub-flow by deriving and including (e.g., low priority) sub-QCIs. For simplicity of exposition, in the description that follows such PCC system, PCC rules and/rules are described with reference to the PCC system 219 of FIGS. 2A-B.

In an embodiment, the PCRF 220 may receive a UPCON report from the WTRU 202 or the base station 260. The UE 220 is assumed to have an active PDN connection with best effort traffic (e.g., using QCI=5).

Based on the congestion report, the PCRF 220 may decide to throttle or otherwise traffic shape traffic by providing updated PCC rules including sub-QCI rules within IP flows/traffic that may require or otherwise be subject to traffic shaping and/or throttling. The updated PCC rules may be generated by the PCRF 220 or other entity, and may be provided to the PCEF 270 (or other PCEF that enforces the PCC rules) and/or to the BBERF 274 (or other BBERF that enforces QoS rules (for e.g., PMIP S5)).

The updated PCC rules may include (e.g., low priority) sub-QCIs. Other factors for the PCRF 200 to derive the PCC rules based on low priority sub-QCI may include, for example, user subscription profile(s) obtained from the HSS/SPR 218, volume usage (such as, in accordance with the usage monitoring clause 4.4 of 3GPP TS 23.203 v), and/or spending limits of one or more users. In embodiments in which the spending limits are utilized, the PCRF 220 may subscribe to the OCS 221 to be notified via Sy reference points if the users exceed respective spending thresholds.

The updated PCC rules may include QoS rules configured to reduce the MBRs of IP flows having the low priority sub-QCIs. The PCEF 270 and/or the BBERF 274 may enforce the rules by, for example, ensuring the bit rates of such traffic do not exceed the new, reduced MBRs. By enforcing such QoS rules, the PCC system 219 may effectively and/or intelligently throttle or otherwise traffic shape traffic of applications creating or contributing to UPCON.

FIGS. 17-20 are block diagrams illustrating example call flows 1700-2000, respectively, for carrying out hierarchical QoS differentiation of traffic within the same QCI level, e.g., using one or more sub-QCIs, in view of UPCON. Each of the call flows 1700-2000 is described with reference to the communications system 200 of FIGS. 2A-2B, for simplicity of exposition. The call flows 1700-2000 may be carried out in other communications systems, as well.

In each of the call flows 1700-2000, UPCON information may be used by the PCC system 219 in enforcement of QoS for IP flows/sub-flow having low priority sub-QCIs. Enforcement of the QoS for IP flows/sub-flow having low priority sub-QCIs may positively, negatively, or otherwise affect the UPCON, and in turn, QoE(s) of the WTRU 202 and/or other user(s).

Figure 17:
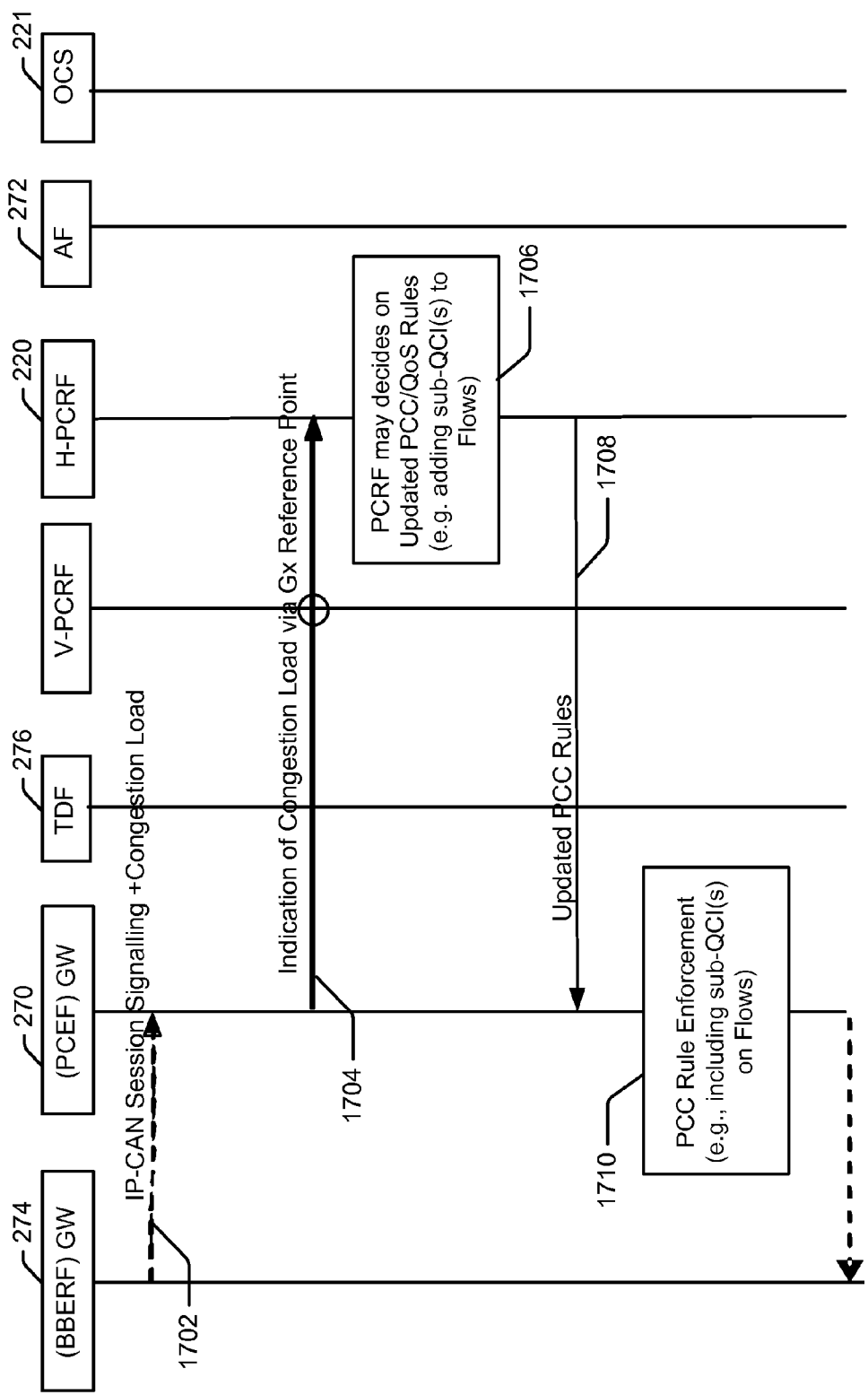
FIGS. 17-20 are block diagrams illustrating example call flows for carrying out hierarchical traffic differentiation.

The example call flow 1700 of FIG. 17 is directed to establishing PCC rules during a period of congestion, e.g., during and/or responsive to an indication of congestion load from the PCEF 270, such as during and/or responsive to an indication of IP-CAN session establishment or IP-CAN session modification. The PCC rules may be aimed at mitigating or otherwise affecting UPCON, and may include PCC rules for reducing, and in turn, enforcing, QoS for IP flows of low priority traffic as well as include sub-QCI information to differentiate the priority of IP flows sent over the same bearer (e.g., all traffic sent over the default bearer of QCI=9).

At call-flow part 1702, the PCEF 270 may receive IP-CAN session signaling, e.g., a request for IP CAN Bearer establishment. The PCEF 270 may also receive the congestion load information. Details of an example of a technique for providing congestion load information may be found in U.S. Provisional Patent Application Ser. No. 61/751,550, filed 11 Jan. 2013, which application (herein after "the '550 application") is incorporated herein by reference.

At call-flow part 1704, the PCEF 270 may send to the PCRF 220 a message requesting authorization of allowed service(s) and/or for PCC Rules information may. The PCEF 270 may do so, for example, after determining that a PCC authorization may be required. The PCEF 270 may also include the congestion load information. Details of an example of a technique for providing and/or receiving congestion load information along with a request for authorization of allowed service(s) and PCC Rules information may be found in the '550 application.

At call-flow part 1706, the PCRF 220 may decide on PCC and/or QoS rules taking into account the subscription profile of the user. The PCRF 220 may make the authorization and policy decision. If congestion load reports are present for the user, the PCRF 220 may take the information into account.

For the solicited application reporting, if the PCRF 220 determines that policy decisions depends on the application used, the PCRF 220 may request the TDF 276 to establish the relevant session towards PCRF 220 and provides ADC Rules to the TDF 276, as per user profile configuration. The TDF 276 may transmit an Ack (accept or reject of the ADC rule operation(s)) to inform the PCRF 220 about the outcome of the actions related to the decision(s) received. The Ack may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF.

The PCRF 220 may transmit the decision(s) which may include PCC rules to mitigate congestion. The PCRF 220 may provide the default charging method and may include the following information: the PCC Rules to activate and the Event Triggers to report. If PCEF 270 is enhanced with ADC, the applicable ADC rules may be provided, according to the user profile configuration. The Policy and Charging Rules may allow the enforcement of policy associated with the IP CAN session. The Event Triggers may indicate to the PCEF 270 what events must be reported to the PCRF 220. If the TDF 276 provided a list of Event Triggers to the PCRF 220 in the previous step, the PCRF 220 may also provide those Event Triggers to the PCEF. The PCRF 220 may also subscribe to the PCEF 270 to be informed of volume usage levels.

At call-flow part 1708, the PCRF 220 may send to the PCEF 270 an acknowledgement (ACK) message acknowledging IP CAN session establishment. The ACK message may include the decision(s). The decision(s) may include PCC rules aimed at mitigating congestion, including, for example, PCC rules for reducing QoS of IP flows and/or sub-flows by including low priority sub-QCIs to low priority traffic At call-flow part 1708, the PCEF 270 may enforce the PCC rules provided by the PCRF 220. If the PCC rules include sub-QCI information, the PCEF 220 may add sub-QCI information (e.g., sub-QCI label) within the IP flow(s) packets.

Figure 18:
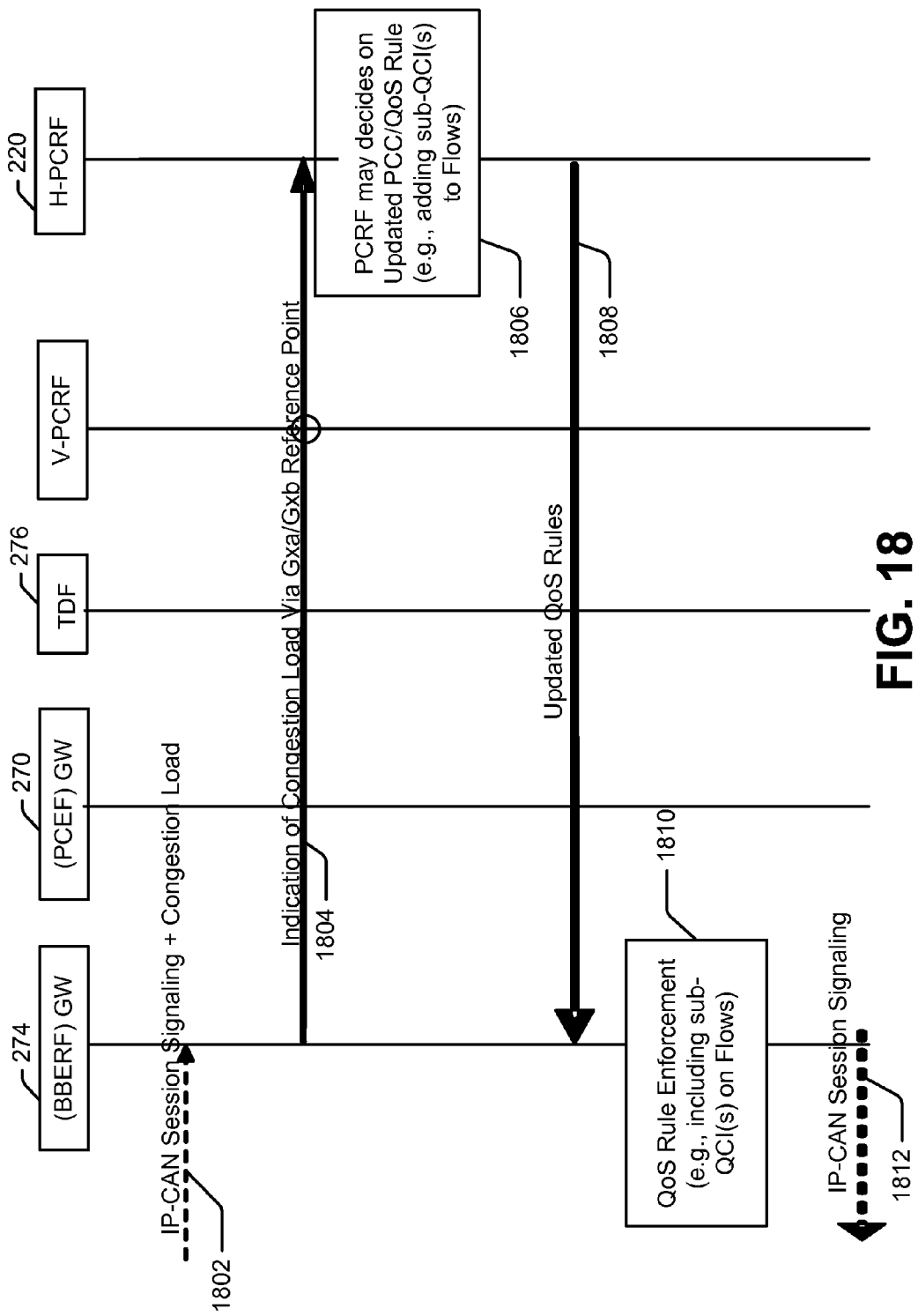

The example call flow 1800 of FIG. 18 is directed to establishing PCC and/or QoS rules during a period of congestion, e.g., during and/or responsive to an indication of congestion load from the BBERF. Details of an example of a technique for providing and/or receiving congestion load information can be found in the '550 application. The PCC and/or QoS rules may be aimed at mitigating UPCON, and may include PCC and/or QoS rules for reducing, and in turn, enforcing, QoS for IP flows of low priority traffic as well as include sub-QCI information to differentiate the priority of IP flows sent over the same bearer (e.g. all traffic sent over the default bearer of QCI=9).

At call-flow part 1804, the BBERF 274 may send, and the PCRF 220 may receive UPCON congestion load information. Details of an example of a technique is shown in the '550 application.

At call-flow part 1806, the PCRF 220 may make a PCC rule decision taking into account UPCON (if available). The PCRF 220 may make the authorization and policy decision. If congestion load reports are present for the user, the PCRF 220 may take the information into account.

For the solicited application reporting, if the PCRF 220 determines that policy decisions depends on the application used, the PCRF 220 may request the TDF 276 to establish the relevant session towards PCRF 220 and provides ADC Rules to the TDF 276, as per user profile configuration. The TDF 276 may transmit an Ack (accept or reject of the ADC rule operation(s)) to inform the PCRF 220 about the outcome of the actions related to the decision(s) received. The Ack may also include the list of Event Triggers to report. The Event Triggers may indicate to the PCRF 220 what events to be forwarded from the PCRF 220 to the TDF 276, once PCRF 220 gets the corresponding Event Report from the PCEF/BBERF.

The PCRF 220 may transmit the decision(s) which may include PCC rules to mitigate congestion. The PCRF 220 may provide the default charging method and may include the following information: the PCC Rules to activate and the Event Triggers to report. If PCEF 270 is enhanced with ADC, the applicable ADC rules may be provided, according to the user profile configuration. The Policy and Charging Rules may allow the enforcement of policy associated with the IP CAN session. The Event Triggers may indicate to the PCEF 270 what events must be reported to the PCRF 220. If the TDF 276 provided a list of Event Triggers to the PCRF 220 in the previous step, the PCRF 220 may also provide those Event Triggers to the PCEF. The PCRF 220 may also subscribe to the PCEF 270 to be informed of volume usage levels. The PCRF 220 may additionally include sub-QCIs within the PCC and/or QoS rules for low priority traffic.

At call-flow part 1808, the PCRF 220 may provision QoS rules (that include sub-QCI) information towards the BBERF 274. If the BBERF 274 asked for new QoS rules or IP CAN-specific parameters need to be delivered back to the BBERF or both, the PCRF 220 may transmit a Gateway Control and QoS Rules Reply to the BBERF 274. This interaction may include QoS Rules and Event Triggers. The BBERF 274 may initiate the IP CAN Bearer signaling if required for the QoS Rules and Event Triggers deployed. The BBERF 274 may receive the response for the IP CAN Bearer signaling.

If new and/or modified QoS Rules are provided, the result of the QoS rule activation may be returned to the PCRF 220, indicating whether the resources requested have been successfully allocated.

At call flow part 1810, the BBERF 274 may enforce the QoS rules, and if the QoS rules include sub-QCI information, the BBERF 274 may add sub-QCI information within the IP flows packets.

PCRF-Initiated Sub-QCI Provisioning

Figure 19:
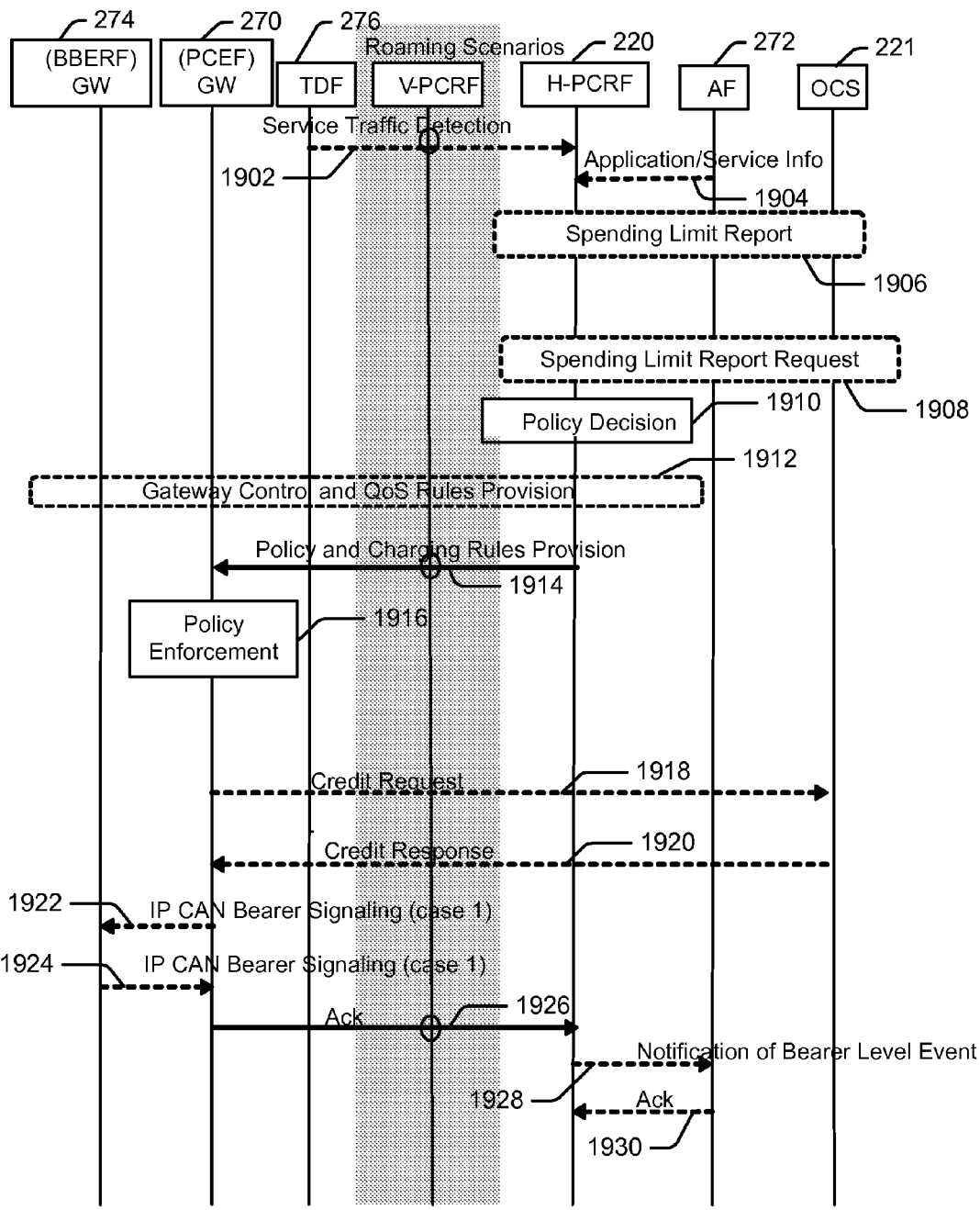

The example call flow 1900 of FIG. 19 is directed to establishing PCC rules that may include sub-QCI information. An example of such procedure can be carried out during a PCRF-initiated IP-CAN Session Modification. The PCC rules may be aimed at mitigating UPCON, and may include PCC rules for reducing, and in turn, enforcing, QoS for IP flows of low priority traffic as well as include sub-QCI information to differentiate the priority of IP flows sent over the same bearer (e.g. all traffic sent over the default bearer of QCI=9).

At call-flow part 1902, the AF 272 may provide/revoke service information to the PCRF 220 responsive to AF session signaling. The AF 272 may subscribe to notification of bearer level events related to the service information. To facilitate generating the applicable events, the PCRF 220 may instruct the PCEF 270 to report events related to the corresponding PCC rules.

At call-flow part 1904, an alternative to call-flow part 1902, is shown for the TDF 276, e.g. for when the TDF 276 may detect a start and/or stop of an application traffic that matches one or more active ADC Rules, such as, for example, in accordance with step 1b of clause 7.4.2 of 3GPP TS 23.203. The TDF 276 may provide application information responsive to solicited application reported (e.g., based on PCRF ADC rules; for example the PCRF 220 instructing the TDF 276 to report specific applications due to UPCON load) or unsolicited application reported (e.g., based on TDF pre-configuration).

At call-flow part 1906, as another alternative, the OCS 221 may provide a Spending Limit Report to the PCRF 220, such as, e.g., described in clause 7.9.4 of 3GPP TS 23.203. The PCRF 220 have subscribed to be notified if the user spending limit(s) has been met based on UPCON load policies provided by the HSS/SPR 218. Details of example techniques for (i) UPCON load policies provided by a HSS/SPR and/or (ii) a PCRF subscribing to and/or being notified of user spending limit(s) having been met based on UPCON load policies provided by an HSS/SPR may be found in the '550 application.

The PCRF 220 may store the service information, if available, and may respond to the AF 272 with an ACK message. This ACK message may be applicable to call-flow part 1902. Without AF interaction, a trigger event in the PCRF 220 may cause the PCRF 220 to determine that the PCC rules require updating at the PCEF 270, e.g. change to configured policy. This procedure may also be triggered by a GW Control and QoS Rules Request procedure in accordance with clause 7.7.3 of 3GPP TS 23.203, or otherwise.

At call-flow part 1908, the PCRF 220 may alter the subscribed list of policy counters using an Initial, Intermediate or Final Spending Limit Report Request procedure. The PCRF 220 may do so, for example, if the PCRF 220 determined a change to policy counter status reporting is required, such as e.g., responsive to congestion load reports. The PCRF 220 may carry out an Initial, Intermediate or Final Spending Limit Report Request procedures in accordance with clauses 7.9.1, 7.9.2 and 7.9.3 of 3GPP TS 23.203 or otherwise.

At call-flow part 1910, the PCRF 220 may make an authorization and policy decision. The PCRF 220 may take into account the congestion load reported, the spending limit, the volume usage level, IP flows/sub-flows reported (from the AF 272) and application information reported (from the TDF 276), and/or HSS/SPR policies for UPCON load (that may include policies based on sub-QCI parameters of the IP flows/sub-flows), if available.

The PCRF 220 may store the application information (if provided), and may respond with an ACK message to the TDF 276 (for unsolicited application reporting) or a TDF session modification (for solicited application reporting). For the TDF solicited application reporting, the PCRF 220 may provide a new ADC decision to the TDF 276. If the last occurring ADC rule is deactivated, the PCRF 220 may request the TDF 276 to terminate the TDF session towards the PCRF 220. If there is no active TDF session yet between the TDF 276 and the PCRF 220, the PCRF 220 may request the TDF 276 to establish the TDF session towards PCRF 220 and provide an ADC decision to the TDF 276. In case of a local breakout, the V-PCRF may provide ADC rules as instructed by the H PCRF 220 over an S9 interface or reference point.

For the TDF solicited application reporting, in the case of an existing on-going session, if requested by PCRF 220, the TDF 276 may send a Provision ACK (accept or reject of the ADC Rule operation(s)). For a new session, the TDF 276 may send an Ack. This may inform the PCRF 220 about the outcome of the actions related to the received ADC decision(s). The Provision Ack/Ack may also include the list of Event Triggers to report. The Event Triggers indicate to the PCRF 220 which events are to be forwarded from the PCRF 220 to the TDF 276, once the PCRF 220 obtains the corresponding Event Report from the PCEF 270/BBERF 274.

At call-flow part 1912, the PCRF 220 may initiate a GW Control and QoS Rules Provision Procedure. The PCRF 220 may do so, for example, if there is no GW Control and QoS Rules Reply pending and there is a need to provision QoS rules. The PCRF 220 may initiate the GW Control and QoS Rules Provision Procedure in accordance with 7.7.4 of 3GPP TS 23.203 (applicable for PMIP S5 or S2c, as defined in clause 7.1 of 3GPP TS 23.203) or otherwise.

If there are multiple BBERFs associated with the IP CAN session, call flow part 1912, may be performed with the BBERFs that support UE/NW bearer establishment mode. If there is a GW Control and QoS Rules Reply pending, e.g. this procedure was invoked from a Gateway Control and QoS Rules Request procedure (e.g., as defined in clause 7.7.3 of 3GPP TS 23.203), the PCRF 220 may use that opportunity for provisioning the applicable QoS rules. If there are multiple BBERFs associated with the IP CAN session, and the procedure was previously invoked by a GW Control and QoS Rules Request procedure from a primary BBERF, then the PCRF 220 may receive a GW Control and QoS Rules Request from the non-primary BBERFs.

At call-flow part 1914, the PCRF 220 may sends the Policy and Charging Rules Provision (PCC Rules, Event Trigger, Event Report) to the PCEF 270. The PCRF 220 may also provide all new ADC decisions to the PCEF 270, if enhanced with ADC. If the TDF 276 provided a list of Event Triggers to the PCRF 220, the PCRF 220 may also provide those Event Triggers to the PCEF 270.

At call-flow part 1916, the PCEF 270 may enforce the decision.

Call-flow parts 1918 to 1930 may be carried out in accordance with clause 7.4.2 of 3GPP TS 23.203. Call-flow parts 1918 to 1930 may be carried out in other ways, as well.

Congestion Mitigation in the Uplink

The WTRU 202 (e.g., a UE) may be able to mitigate congestion in the uplink direction based on operator policies provided by the ANDSF 222 via, e.g., the S14 reference point. The ANDSF policies may include information to drop low sub-QCI packets of specific applications based on the UPCON status in the uplink. The WTRU 202 may be able to differentiate between application based on the work carried out in 3GPP on DIDA (see 3GPP TS 23.402). Alternatively, based on the sub-QCI information added by the WTRU 202 on the uplink direction the base station 260 (e.g., an eNode B) may drop low sub-QCI packets based on the UPCON status in the backhaul (e.g., between the RAN and SGW nodes).

Proactive Congestion Mitigation in the Uplink

In the uplink, a media access control (MAC) layer scheduler of the WTRU 202 may dynamically inspect a MAC SDU to identify the QCI sub layer priority for each packet, and perform prioritized scheduling to transmit the high priority packets first, and low priority packets next. If low priority packets become delayed in the queue past discard-Timer timeout (in a packet data convergence protocol (PDCP) layer), such packets may be discarded before transmission. Such discard may reduce or otherwise affect congestion.

The WTRU 202 may be configured with the rules to mark the packets of the same RB with a sub-priority by ANDSF or RB configuration or RRC configuration applicable to all RBs. The identification of the SDU packet priority may be obtained by packet inspection (e.g., DPI), such as packet inspection of a DSCP field in IP packet that has been configured in higher layers based on the ANDSF policies. The PDCP layer may obtain the packets with an additional parameter that indicates the sub-priority that should be assigned to the packet, which may be further relayed to the radio link control (RLC) and MAC layers. The MAC layer logical channel prioritization may use logical channel priority to decide on which logical channel to select next, and within each logical channel, may use the sub-priority information to prioritize the selection of the packet or transport block within the same logical channel.

Utilizing RAN for Mitigation and/or Other Affectation of UPCON Based on Intra-QCI Level Traffic Differentiation Sub-QCI Attributes In various embodiments, mitigating and/or otherwise affecting UPCON based on intra-QCI level traffic differentiation may be carried out at a base station or other RAN element. For simplicity of exposition, in the description that follows, the base station or other RAN element is described with reference to the communications system 200 of FIGS. 2A-B.

In various embodiments, the base station 260 may be able to detect UPCON. The base station 260 may be assumed to support a Deep Packet Inspection capability where inspection of the QoS parameters (i.e. sub-QCI parameters) of IP flows/sub-flows is possible.

The base station 260 may mitigate congestion (at least in part) by, for example, updating a UE context stored in the MME 262 with parameters to indicate base station behavior during UPCON for a particular user. The UE context may include, for example, information indicating that a particular user is a high priority user, and such user should receive high QoE even at cases of high UPCON.

During UPCON, the base station 260 may take into account a subscription profile stored in the UE context so as to identify how to mitigate congestion. For example, the base station 260 may discard packets of low priority sub-QCIs along with taking into account the subscription profile of the user stored in the UE context.

Figure 20:
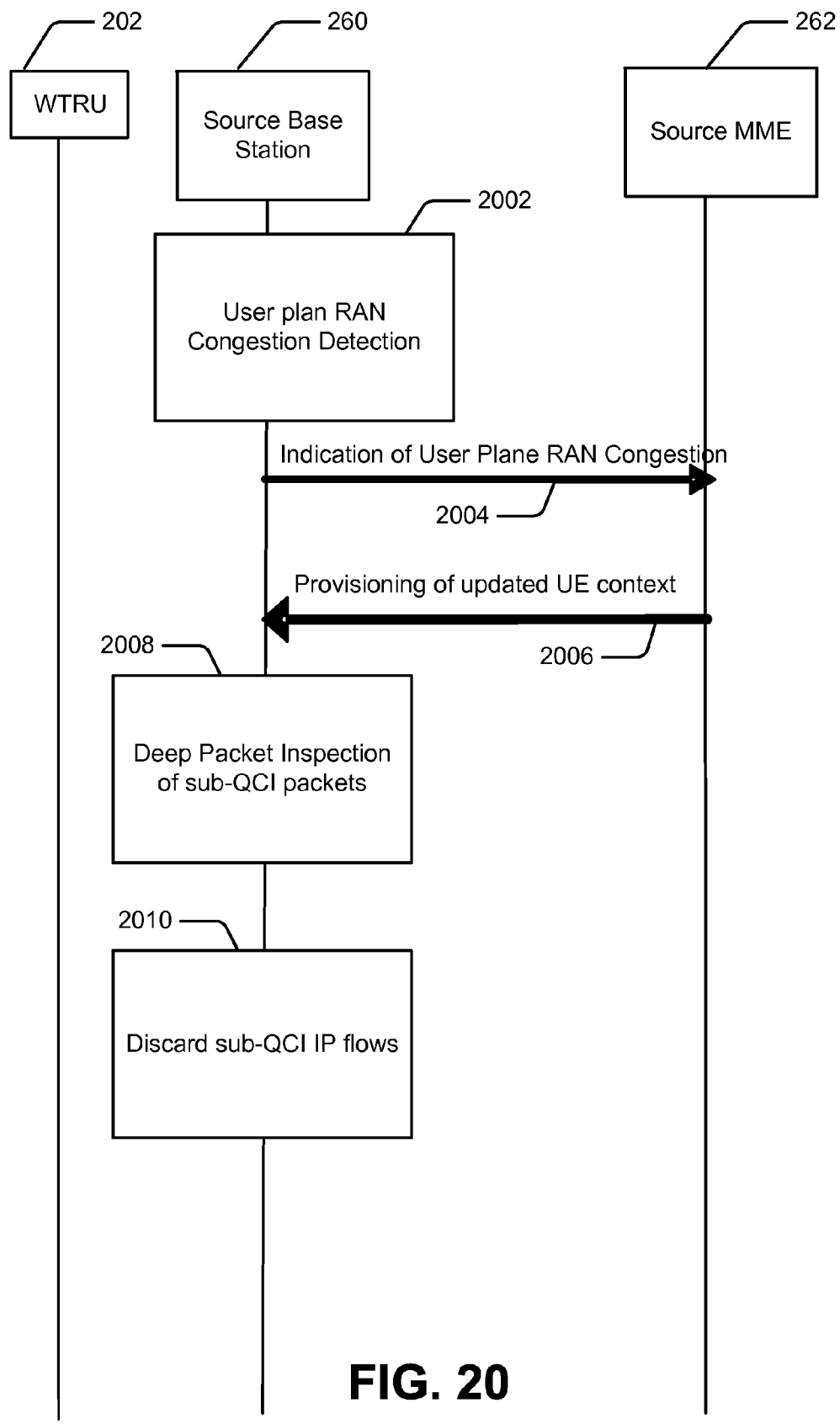

The example call flow 2000 of FIG. 20 is directed to mitigating and/or otherwise affecting UPCON based on intra-QCI level traffic differentiation carried out at a base station 260 or other RAN element. The base station 260 may take into account a subscription profile stored in the UE (WTRU) context so as to identify how to mitigate congestion, by for example, discarding packets of low priority sub-QCIs based on the subscription profile of the user stored in the UE context.

At call-flow part 2002, the base station 260 may detect that there are not enough resources to deliver all user plane traffic.

At call-flow part 2004, the base station 260 may notify the MME 262 with UPCON information, The base station 260 may do so if, for example, the base station 260 does not possess UE context stored for a particular user. The base station 260 may report the UPCON information via NAS signaling, for instance.

At call-flow part 2006, the MME 262 may provide updated UE context information.

At call-flow part 2008, the base station 260 may perform DPI on (e.g., all or some of) UE (WTRU) traffic.

At call-flow part 10, the base station 260 may drop IP packets of the IP flows/sub-flows having low priority sub-QCIs. The IP packets of the IP flows/sub-flows having low priority sub-QCI5 dropped by the base station 260 may be based on the UE context information provided by the MME 262 and the DPI performed.

Embodiments

Various embodiments of methods, apparatuses and systems for performing hierarchical traffic differentiation and/or employing hierarchical traffic differentiation are provided. These methods, methods, apparatuses and systems may be implemented to handle congestion and/or to manage user QoE.

In at least one representative embodiment, a method may include obtaining traffic mapped to a bearer formed in accordance with a QoS class.

In at least one representative embodiment, the method may include differentiating the traffic within the bearer into multiple traffic sub-classes.

In at least one representative embodiment, the method may include scheduling the differentiated traffic for transmission based on a prioritization of the multiple traffic sub-classes.

In at least one representative embodiment, differentiating the traffic may include obtaining an indication of which traffic sub-class of the multiple traffic sub-classes to assign a packet of the traffic to.

In at least one representative embodiment, the packet may include the indication.

In at least one representative embodiment, the packet may include a header, and wherein the header may include the indicator.

In at least one representative embodiment, the header is in accordance with a GTP.

In at least one representative embodiment, obtaining an indication may include performing packet inspection of the packet for the indication.

In at least one representative embodiment, obtaining an indication may include performing packet inspection of the packet to obtain information about the packet, and/or deriving the indication based on the obtained information.

In at least one representative embodiment, the obtained information may include an application-specific signature.

In at least one representative embodiment, obtaining an indication may include receiving the indication via signaling.

In at least one representative embodiment, the indication may be indicative of a priority of the traffic class to assign the packet to.

In at least one representative embodiment, the packet may include a QCI corresponding to the QoS class.

In at least one representative embodiment, the indicator may be a sub-QCI.

In at least one representative embodiment, scheduling the differentiated traffic may include: adjusting a scheduled time of transmission of a packet the differentiated traffic based on the prioritization of the multiple traffic sub-classes.

In at least one representative embodiment, adjusting a scheduled time of transmission of a packet the differentiated traffic may include delaying the scheduled time of transmission of the packet.

In at least one representative embodiment, scheduling the differentiated traffic may include scheduling the differentiated traffic for transmission based on a prioritization of the multiple traffic sub-classes in view of congestion.

In at least one representative embodiment, scheduling the differentiated traffic may include scheduling the differentiated traffic for transmission based on a prioritization of the multiple traffic sub-classes in view of a lack of resources.

In at least one representative embodiment, the method may include scheduling the differentiated traffic for transmission based on a policy for managing the multiple traffic sub-classes.

In at least one representative embodiment, scheduling the differentiated traffic may include: adjusting a scheduled time of transmission of a packet the differentiated traffic based on the policy for managing the multiple traffic sub-classes.

In at least one representative embodiment, adjusting a scheduled time of transmission of a packet the differentiated traffic may include delaying the scheduled time of transmission of the packet.

In at least one representative embodiment, scheduling the differentiated traffic may include scheduling the differentiated traffic for transmission based on a policy for managing the multiple traffic sub-classes in view of congestion.

In at least one representative embodiment, scheduling the differentiated traffic may include scheduling the differentiated traffic for transmission based on a policy for managing the multiple traffic sub-classes in view of a lack of resources.

In at least one representative embodiment, the method may include filtering the differentiated traffic based on the prioritization of the multiple traffic sub-classes.

In at least one representative embodiment, the filtering the differentiated traffic may include filtering a packet from the differentiated traffic based on the packet being assigned to a traffic sub-class of the multiple traffic sub-classes having a priority less than a priority of at least one other traffic sub-class of the multiple traffic classes.

In at least one representative embodiment, filtering the differentiated traffic may include filtering a packet from the differentiated traffic based on the packet being assigned to a traffic sub-class of the multiple traffic sub-classes having a priority less than a priority of each of the multiple traffic classes.

In at least one representative embodiment, filtering the differentiated traffic may include filtering a packet from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic.

In at least one representative embodiment, the method may include filtering the differentiated traffic based on a policy for managing the multiple traffic sub-classes.

In at least one representative embodiment, filtering the differentiated traffic may be carried out in view of congestion.

In at least one representative embodiment, filtering the differentiated traffic may be carried out in view of lack of resources.

In at least one representative embodiment, the method may include scheduling the filtered traffic.

In at least one representative embodiment, the method may include scheduling the filtered traffic for transmission based on the prioritization of the multiple traffic sub-classes.

In at least one representative embodiment, scheduling the filtered traffic may include adjusting a scheduled time of transmission of a packet the filtered traffic based on the prioritization of the multiple traffic sub-classes.

In at least one representative embodiment, the method may include scheduling the filtered traffic for transmission based on a policy for managing the multiple traffic sub-classes.

In at least one representative embodiment, scheduling the filtered traffic may include adjusting a scheduled time of transmission of a packet the filtered traffic based on the policy for managing the multiple traffic sub-classes.

In at least one representative embodiment, adjusting a scheduled time of transmission of a packet the differentiated traffic may include delaying the scheduled time of transmission of the packet.

In at least one representative embodiment, the method may include referring to a policy for handing the differentiated traffic.

In at least one representative embodiment, the method may include managing the differentiated traffic based on the policy.

In at least one representative embodiment, the policy for handling the differentiated traffic may include conditions derived from user subscription information.

In at least one representative embodiment, the policy for handling the differentiated traffic may include conditions derived from one or more operator policies.

In at least one representative embodiment, the method may include detecting the congestion.

In at least one representative embodiment, the congestion may include user plane congestion in a RAN.

In at least one representative embodiment, the bearer may be associated with the RAN.

In at least one representative embodiment, the method may include detecting the lack of resources.

In at least one representative embodiment, an apparatus may include a processor.

In at least one representative embodiment, the processor may be configured to obtain traffic mapped to a bearer formed in accordance with a QoS class.

In at least one representative embodiment, the processor may be configured to differentiate the traffic within the bearer into multiple traffic sub-classes.

In at least one representative embodiment, the processor being configured to differentiate the traffic may include the processor being configured to obtain an indication of which traffic sub-class of the multiple traffic sub-classes to assign a packet of the traffic to.

In at least one representative embodiment, the packet comprises the indication.

In at least one representative embodiment, the packet may include a header, and the header may include the indicator.

In at least one representative embodiment, the header may be in accordance with a GTP.

In at least one representative embodiment, the processor being configured to obtain an indication may include the processor being configured to perform packet inspection of the packet for the indication.

In at least one representative embodiment, the processor being configured to obtain an indication may include the processor being configured to perform packet inspection of the packet to obtain information about the packet; and/or the processor being configured to derive the indication based on the obtained information.

In at least one representative embodiment, the obtained information comprises an application-specific signature.

In at least one representative embodiment, the apparatus may include a receiver.

In at least one representative embodiment, the receiver may be configured to receive the indication via signaling (i.e., separate from the packet).

In at least one representative embodiment, the processor being configured to obtain an indication may include the processor being configured to receive the indication from the signaling received by the receiver.

In at least one representative embodiment, the indication may be indicative of a priority of the traffic class to assign the packet to.

In at least one representative embodiment, the packet may include a QCI corresponding to the QoS class.

In at least one representative embodiment, the indicator may be a sub-QCI.

In at least one representative embodiment, the processor may be configured to schedule the differentiated traffic for transmission based on a prioritization of the multiple traffic sub-classes.

In at least one representative embodiment, the processor being configured to schedule the differentiated traffic may include the processor being configured to adjust a scheduled time of transmission of a packet the differentiated traffic based on the prioritization of the multiple traffic sub-classes.

In at least one representative embodiment, the processor being configured to adjust a scheduled time of transmission of a packet the differentiated traffic may include the processor being configured to delay the scheduled time of transmission of the packet.

In at least one representative embodiment, the processor being configured to schedule the differentiated traffic may include the processor being configured to schedule the differentiated traffic for transmission based on the prioritization of the multiple traffic sub-classes in view of congestion.

In at least one representative embodiment, the being configured to schedule the differentiated traffic may include the processor being configured to schedule the differentiated traffic for transmission based on the prioritization of the multiple traffic sub-classes in view of a lack of resources.

In at least one representative embodiment, the processor may be configured to filter the differentiated traffic based on a prioritization of the multiple traffic sub-classes.

In at least one representative embodiment, the processor being configured to filter the differentiated traffic may include the processor being configured to filter a packet from the differentiated traffic based on the packet being assigned to a traffic sub-class of the multiple traffic sub-classes having a priority less than a priority of at least one other traffic sub-class of the multiple traffic classes.

In at least one representative embodiment, the processor being configured to filter the differentiated traffic may include the processor being configured to filter a packet from the differentiated traffic based on the packet being assigned to a traffic sub-class of the multiple traffic sub-classes having a priority less than a priority of each of the multiple traffic classes.

In at least one representative embodiment, the processor being configured to filter the differentiated traffic may include the processor being configured to filter a packet from the differentiated traffic based on the packet being assigned to a traffic sub-class of the multiple traffic sub-classes having a priority in the order of precedence of the prioritization that is below a priority at which packets of the differentiated traffic are not filtered from the differentiated traffic.

In at least one representative embodiment, the processor may be configured to schedule the filtered traffic.

In at least one representative embodiment, the processor may be configured to the filtered traffic for transmission based on the prioritization of the multiple traffic sub-classes.

In at least one representative embodiment, the processor being configured to schedule the filtered traffic may include the processor being configured to adjust a scheduled time of transmission of a packet the filtered traffic based on the prioritization of the multiple traffic sub-classes.

In at least one representative embodiment, the processor may be configured to detect the congestion.

In at least one representative embodiment, the congestion may include user plane congestion in a radio access network (RAN).

In at least one representative embodiment, the bearer may be associated with the RAN.

In at least one representative embodiment, the processor may be configured to detect the lack of resources.

In at least one representative embodiment, the apparatus may be any of (i) a wireless transmit and/or receive unit (WTRU), (ii) a base station, and (iii) a node of a core network, including a packet data network (PDN) gateway (PGW).

In at least one representative embodiment, an apparatus may include a processor, and the processor may be configured to obtain traffic mapped to a bearer formed in accordance with a QoS class.

In at least one representative embodiment, the processor may be configured to differentiate the traffic within the bearer into multiple traffic sub-classes.

In at least one representative embodiment, the processor may be configured to schedule the differentiated traffic for transmission based on a policy for managing the multiple traffic sub-classes.

In at least one representative embodiment, an apparatus may include a processor, and the processor may be configured to obtain traffic mapped to a bearer formed in accordance with a QoS class.

In at least one representative embodiment, the processor may be configured to differentiate the traffic within the bearer into multiple traffic sub-classes.

In at least one representative embodiment, the processor may be configured to filter the differentiated traffic based on a policy for managing the multiple traffic sub-classes.

In at least one representative embodiment, the apparatus may be any of (i) a wireless transmit and/or receive unit (WTRU), (ii) a base station, and (iii) a node of a core network, including a packet data network (PDN) gateway (PGW).

In at least one representative embodiment, a method may include performing hierarchical traffic differentiation within a same QCI level.

In at least one representative embodiment, the hierarchical traffic differentiation may be performed in view of UPCON.

In at least one representative embodiment, a method may include mitigating and/or otherwise affecting UPCON based on intra-QCI level traffic differentiation.

In at least one representative embodiment, the other affectation may have a positive effect on the UPCON, such as, e.g., a reduction in an amount of the UPCON.

In at least one representative embodiment, the other affectation may have a negative effect on the UPCON, such as, e.g., an increase in an amount of the UPCON.

In at least one representative embodiment, the other affectation may have no net effect on the UPCON, such as e.g., a reduction in one amount of the UPCON and a corresponding increase in another amount of the UPCON.

In at least one representative embodiment, the mitigation and/or other affectation of the UPCON may have a positive effect in that such may cause a reduction in an amount of the UPCON with respect to a single user or multiple users.

In at least one representative embodiment, the mitigation and/or other affection of the UPCON may have a negative effect in that such may cause an increase in an amount of the UPCON with respect to a single user or multiple users.

In at least one representative embodiment, the mitigation and/or other affectation of the UPCON may have a no net effect in that such causes (i) a reduction in an amount of the UPCON with respect to a single user or multiple users, and (ii) an increase in an amount of the UPCON with respect to a single user or multiple users.

In at least one representative embodiment, the mitigating and/or otherwise affecting UPCON based on intra-QCI level traffic differentiation may be carried out using a PCC system along with PCC policies and/or rules for reducing, and in turn, enforcing, quality of service (QoS) for one or more IP flows/sub-flow having (e.g., low priority) sub-QCIs.

In at least one representative embodiment, the mitigating and/or otherwise affecting UPCON based on intra-QCI level traffic differentiation may include traffic shaping.

In at least one representative embodiment, the traffic shaping may be based, at least in part, on sub-QCIs, such as low-priority and/or high priority sub-QCIs.

In at least one representative embodiment, the traffic shaping may be based, at least in part, on sub-QCIs, such as low-priority and/or high priority sub-QCIs, along with one or more other factors.

In at least one representative embodiment, the factors may include any of a user subscription profile, volume usage, and spending limits of one or more users.

In at least one representative embodiment, a method may include: enforcing a reduced QoS for an IP flow/sub-flow having a low priority sub-QCI.

In at least one representative embodiment, enforcing a reduced QoS may include performing deep pack inspection of traffic.

In at least one representative embodiment, enforcing a reduced QoS may include discarding a packet of the IP flow/sub-flow having that has the low priority sub-QCI.

In at least one representative embodiment, enforcement of the reduced QoS may be carried out at any of a packet data gateway, a policy charging and control (PCC) entity and a base station.

In at least one representative embodiment, enforcing a reduced QoS may include applying any of one or more PCC policies, one or more PCC rules and one or more QoS rules.

In at least one representative embodiment, the method may include generating any of the one or more PCC policies, one or more PCC rules and one or more QoS rules.

In at least one representative embodiment, any of the one or more PCC policies, one or more PCC rules and one or more QoS rules may be based, at least in part, on user plane congestion (UPCON).

In at least one representative embodiment, any of the one or more PCC policies, one or more PCC rules and one or more QoS rules may be based, at least in part, on user plane congestion (UPCON) and on one or more other factors.

In at least one representative embodiment, the one or more other factors may include any of a user subscription profile, volume usage, and spending limits of one or more users.

In at least one representative embodiment, the QoS rules may include a rule to adjust a current maximum bit rate (MBR) to a new MBR.

In at least one representative embodiment, the new MBR may be less than the current MBR.

In at least one representative embodiment, enforcing a reduced QoS may include ensuring a bit rate of the IP flow/sub-flow having a low priority sub-QCI does not exceed the new MBR.

In at least one representative embodiment, the rule to adjust a current maximum bit rate (MBR) to a new MBR may be based, at least in part, on a bit rate associated with the low priority sub-QCI.

In at least one representative embodiment, a method may include initiating a gateway control session establishment procedure by way of a request message.

In at least one representative embodiment, the request message may be from a BBERF.

In at least one representative embodiment, the request message may include congestion load information.

In at least one representative embodiment, the method may include receiving a request for IP CAN Bearer establishment.

In at least one representative embodiment, the request for IP CAN Bearer establishment may be received at a PCEF.

In at least one representative embodiment, the method may include receiving the congestion load information.

In at least one representative embodiment, the congestion load information may be received, at the PCEF.

In at least one representative embodiment, the method may include sending a message requesting authorization of allowed service(s) and/or for PCC Rules information.

In at least one representative embodiment, the message requesting authorization of allowed service(s) and/or for PCC Rules information may be sent from the PCEF to a PCRF.

In at least one representative embodiment, the message requesting authorization of allowed service(s) and/or for PCC Rules information may include the congestion load information.

In at least one representative embodiment, the method may include sending a message requesting the user profile and/or other information related to the IP CAN session.

In at least one representative embodiment, the message requesting the user profile and/or other information related to the IP CAN session may be sent from the PCRF.

In at least one representative embodiment, the method may include sending a message requesting the user profile and/or other information related to the IP CAN session.

In at least one representative embodiment, the message requesting the user profile and/or other information related to the IP CAN session may be sent from the PCRF.

In at least one representative embodiment, the message requesting the user profile and/or other information related to the IP CAN session may be sent if the PCRF lacks subscription related information for one or more subscribers.

In at least one representative embodiment, the method may include receiving the message requesting the user profile and/or other information related to the IP CAN session.

In at least one representative embodiment, the message requesting the user profile and/or other information related to the IP CAN session may be received at a network entity, such as, for example, an HSS and/or SPR.

In at least one representative embodiment, the network entity may maintain policies.

In at least one representative embodiment, the policies may be based on UPCON load.

In at least one representative embodiment, the policies may include any of one or more policies based on a type or level of the subscriber, IP flows/sub-flows reported, application type reported, volume usage level, user spending limits, and/or based on the sub-QCIs for IP flows/sub-flows.

In at least one representative embodiment, the policies may include one or more policies based on low and/or high priority sub-QCIs.

In at least one representative embodiment, the one or more polices may indicate that the IP flows/sub-flows having high priority sub-QCIs are to be prioritized over the IP flows/sub-flows having low priority sub-QCIs with respect to traffic shaping.

In at least one representative embodiment, the method may include sending the subscription related information.

In at least one representative embodiment, the subscription related information may be sent from the network entity (e.g., the HSS and/or SPR).

In at least one representative embodiment, the method may include receiving and/or storing the subscription related information at the PCRF.

In at least one representative embodiment, the subscription related information may be received by, and/or stored at, the PCRF.

In at least one representative embodiment, the subscription related information may include any of the information about the allowed service(s) and/or PCC Rules information, MPS EPS Priority, MPS Priority Level and IMS Signaling Priority for establishing a packet switched (PS) session with priority, and/or user profile configuration information, including information that indicates whether application detection and control should be enabled for the IP-CAN session.

In at least one representative embodiment, the method may include sending an initial, intermediate and/or final spending limit report request.

In at least one representative embodiment, the initial, intermediate and/or final spending limit report request may be sent from the PCRF.

In at least one representative embodiment, the initial spending limit report request may be sent if a determination (e.g., by the PCRF) is made that a policy decision depends on a status of policy counters available at the OCS, including for policies based on low priority sub-QCIs and spending limits, and such policy counter status reporting is not established for the subscriber.

In at least one representative embodiment, the method may include receiving the initial, intermediate and/or final spending limit report request.

In at least one representative embodiment, the initial, intermediate and/or final spending limit report request may be received at the OCS.

In at least one representative embodiment, the method may include making an authorization and policy decision at the PCRF.

In at least one representative embodiment, making an authorization and policy decision may include making the authorization and policy decision taking into account congestion load reports for the user (and/or other users), if available.

In at least one representative embodiment, the authorization and policy decision may be made at, and/or by, the PCRF.

In at least one representative embodiment, the method may include making sending, from the PCRF, a message requesting the TDF to establish a relevant session towards the PCRF; and/or providing ADC rules to the TDF, as per the user profile configuration.

In at least one representative embodiment, the method may include receiving, at the TDF, the message requesting the TDF to establish a relevant session towards the PCRF; and receiving, at the TDF, the ADC rules.

In at least one representative embodiment, the method may include determining that the policy decisions depend on the application used.

In at least one representative embodiment, the method may include sending, from the TDF, an acknowledgement (ACK) message to inform the PCRF about an outcome of actions related to the decision(s) received In at least one representative embodiment, the ACK message may include a list of Event Triggers to report.

In at least one representative embodiment, the Event Triggers may indicate to the PCRF one or more events to be forwarded from the PCRF to the TDF.

In at least one representative embodiment, the method may include sending, from the PCRF, an acknowledgement (ACK) message acknowledging IP CAN session establishment.

In at least one representative embodiment, the method may include receiving, at the PCEF, the acknowledgement (ACK) message acknowledging IP CAN session establishment.

In at least one representative embodiment, the ACK message may include the decision(s).

In at least one representative embodiment, the decision(s) may include PCC rules aimed at mitigating congestion, including, PCC rules for reducing QoS of IP flows/sub-flows having low priority sub-QCIs, such as reducing the MBR of IP flows/sub-flows having low priority sub-QCIs.

In at least one representative embodiment, the method may include providing, from the PCRF, a default charging method and/or information to indicate which PCC Rules to activate and which Event Triggers to report.

In at least one representative embodiment, the method may include providing applicable ADC rules, wherein the applicable ADC rules are, or are in accordance with, the ADC rules from the user profile configuration.

In at least one representative embodiment, a method may include providing and/or revoking, by an AF, 272 service information responsive to an AF session signaling.

In at least one representative embodiment, the method may include the AF 272 subscribing to notification of bearer level events related to the service information.

In at least one representative embodiment, to facilitate generating the applicable events, a PCRF may instruct a PCEF to report events related to corresponding PCC rules.

In at least one representative embodiment, the method may include receiving the service information at the PCRF.

In at least one representative embodiment, the method may include storing, by the PCRF, the service information, and/or responding with an ACK message to the AF.

In at least one representative embodiment, the method may include receiving, at the PCEF, IP CAN session signaling for the IP CAN Session modification.

In at least one representative embodiment, the IP CAN session signaling may carries congestion load information.

In at least one representative embodiment, the method may include making a decision at the PCEF to trigger the IP CAN Session modification.

In at least one representative embodiment, the method may include making a decision at the PCEF to trigger the IP CAN Session modification responsive to IP CAN session signaling for the IP CAN Session modification; based on an internal decision; and/or based on, e.g., whether the PCEF 270 is enhanced with ADC and has detected the start/stop of application traffic as requested by one or more activated ADC Rules.

In at least one representative embodiment, the method may include making the decision at the PCEF to trigger the IP CAN Session modification responsive to a TDF detecting an application that needs to be reported due to high congestion load.

In at least one representative embodiment, the method may include making a decision at the PCEF to trigger the IP CAN Session modification.

In at least one representative embodiment, the PCEF may make the decision to trigger based on a determination that a PCC interaction is required.

In at least one representative embodiment, the method may include sending, from the PCEF, an indication of the IP CAN Session modification.

In at least one representative embodiment, the method may include correlating, at the PCRF, the request for PCC Rules with the IP CAN session and service information available at the PCEF.

In at least one representative embodiment, the method may include reporting, from the PCRF to the AF, an event related to transmission resources.

In at least one representative embodiment, the method may include sending, from the AF, an ACK message to acknowledge the event report, and/or to respond with the requested information.

In at least one representative embodiment, the method may include altering, by the PCRF, a subscribed list of policy counters using an Initial, Intermediate or Final Spending Limit Report Request procedure.

In at least one representative embodiment, the method may include making an authorization and policy decision at the PCRF.

In at least one representative embodiment, the method may include making an authorization and policy decision at the PCRF taking into account the congestion load reported.

In at least one representative embodiment, the method may include making an authorization and policy decision at the PCRF taking into account the congestion load reported along with any of the following information (if available): spending limits of the user(s), the volume usage levels, specific IP flows/sub-flows/application(s) reported, and sub-QCIs of one or more of the IP flows/sub-flows.

In at least one representative embodiment, the method may include performing TDF solicited application reporting.

In at least one representative embodiment, performing TDF solicited application reporting may include any of (i) providing new ADC decisions to the TDF, including any of ADC Rules activation, deactivation and modification; and (ii) indicating to the TDF to report specific applications that need to be monitored in case of high UPCON.

In at least one representative embodiment, the method may include sending, from the TDF, an ACK message to inform the PCRF about the outcome of the actions related to the decision(s) received.

In at least one representative embodiment, the method may include sending, from the PCRF an ACK message acknowledging the IP CAN Session modification.

In at least one representative embodiment, the method may include receiving, at the PCEF, the ACK message acknowledging the IP CAN Session modification.

In at least one representative embodiment, the method may include enforcing, by the PCEF, the decision.

In at least one representative embodiment, a method may include providing and/or revoking, by an AF, service information responsive to AF session signaling.

In at least one representative embodiment, a method may include providing and/or revoking, by an AF, service information responsive a TDF detecting a start/stop of an application traffic that matches one or more active ADC Rules.

In at least one representative embodiment, a method may include providing and/or revoking, by an AF, service information responsive to an OCS may provide a Spending Limit Report to a PCRF 220

In at least one representative embodiment, the PCRF may be subscribed to be notified if the user spending limit(s) has been met based on UPCON load policies provided by a HSS/SPR.

In at least one representative embodiment, the method may include storing, by the PCRF, 220 the service information if available, and/or responding to the AF with an ACK message.

In at least one representative embodiment, the method may include altering, by the PCRF, a subscribed list of policy counters using an Initial, Intermediate or Final Spending Limit Report Request procedure.

In at least one representative embodiment, the method may include making an authorization and policy decision by the PCRF.

In at least one representative embodiment, the method may include making an authorization and policy decision taking into account any of congestion load reported, the spending limit, the volume usage level, IP flows/sub-flows reported and application information reported), and/or on HSS/SPR policies for UPCON load including policies based on sub-QCI parameters of the IP flows/sub-flows, if available.

In at least one representative embodiment, the method may include storing, by the PCRF, the application information (if provided), and/or responding with an ACK message to the TDF or a TDF session modification.

In at least one representative embodiment, the method may include sending, from the TDF, a Provision ACK or an Ack is to inform the PCRF about the outcome of the actions related to the received ADC decision(s).

In at least one representative embodiment, the method may include initiating, by the PCRF, a GW Control and QoS Rules Provision Procedure.

In at least one representative embodiment, the method may include sending, from the PCRF, the policy and charging rules provision.

In at least one representative embodiment, the method may include receiving, at the PCEF, the policy and charging rules provision.

In at least one representative embodiment, the method may include enforcing, at the PCEF, the decision.

In at least one representative embodiment, a method may include receiving, at a BBERF, a request to report an event and/or obtain QoS rules for a gateway control session.

In at least one representative embodiment, the method may include receiving UPCON load information at the BBERF.

In at least one representative embodiment, the method may include sending, from the BBERF a gateway control and QoS rules request; and/or receiving, at a PCRF, the gateway control and QoS rules request.

In at least one representative embodiment, the gateway control and QoS rules request may include congestion load information.

In at least one representative embodiment, the method may include sending, from the BBERF, a result to an entity that triggered the procedure if the BBERF is requested to report an event.

In at least one representative embodiment, the method may include carrying out a PCRF-initiated IP CAN Session Modification Procedure responsive to the gateway control and QoS rules request procedure, including, the PCRF making a PCC rule decision taking into account UPCON, if available.

In at least one representative embodiment, the method may include sending, from the PCRF, a gateway control and QoS rules reply In at least one representative embodiment, the method may include receiving the gateway control and QoS rules reply at the BBERF.

In at least one representative embodiment, the gateway control and QoS rules reply may include new QoS rules, IP CAN-specific parameters and/or Event Triggers.

In at least one representative embodiment, the method may include deploying, by the BBERF, the QoS Rules and/or Event Triggers, if any, received by the BBERF.

In at least one representative embodiment, the method may include initiating, by the BBERF, IP CAN Bearer signaling.

In at least one representative embodiment, the method may include receiving, at the BBERF, a response for the IP CAN Bearer signaling.

In at least one representative embodiment, the method may include returning a result of the QoS rule activation to the PCRF.

In at least one representative embodiment, the returned result may indicate whether the resources requested have been successfully allocated.

In at least one representative embodiment, a method may include detecting, at a base station, a lack of resources to deliver all user plane traffic.

In at least one representative embodiment, the method may include sending, by the base station, a notification or other report carrying UPCON information.

In at least one representative embodiment, the method may include receiving, by an MME, the notification or other report carrying UPCON information.

In at least one representative embodiment, sending, by the base station, a notification carrying UPCON information may be triggered if the base station does not possess UE context stored for a particular user.

In at least one representative embodiment, the base station may send the notification or other report carrying the UPCON information via NAS signaling.

In at least one representative embodiment, the method may include providing, from the MME 262, updated UE context information.

In at least one representative embodiment, the method may include performing packet inspection (e.g., DPI) at the base station on data plane traffic.

In at least one representative embodiment, the method may include dropping, at the base station, IP packets of the IP flows/sub-flows having (e.g., low priority) sub-QCIs based on the UE context information provided by the MME and the packet inspection performed.

In at least one representative embodiment, a method may include performing hierarchical traffic differentiation within a same QCI level, and allocating or otherwise managing wireless system resources based on the hierarchical traffic differentiation.

In at least one representative embodiment, performing the hierarchical traffic differentiation within a same QCI level may include differentiating the traffic in accordance with one or more intra-QCI levels.

In at least one representative embodiment, performing hierarchical traffic differentiation may include applying a tree-based structure and/or methodology.

In at least one representative embodiment, the tree-based structure and/or methodology may includes, for a QCI level, one or more intra-QCI levels and/or one or more sub-QCIs.

In at least one representative embodiment, the sub-QCIs may be associated with respective priorities of sub-flows with a flow of the traffic.

In at least one representative embodiment, the traffic may be mapped to a single bearer.

In at least one representative embodiment, the traffic may include different types of traffic.

In at least one representative embodiment, a TFT assigned to a bearer for carrying the traffic may include an application-specific signature for distinguishing the different types of traffic.

In at least one representative embodiment, the application-specific signature may be maintained in, and/or obtainable from, a user profile and/or a UE context.

In at least one representative embodiment, the user profile and/or the UE context may be maintained in, and/or obtainable, from a repository.

In at least one representative embodiment, the repository may be any of a HSS and a SPR.

In at least one representative embodiment, the TFT that may include the application-specific signature may be provisioned into and/or maintained in one or more network nodes, including any of one or more core network nodes and one or more RAN nodes.

In at least one representative embodiment, the network nodes may be provisioned with and/or maintain respective policy tables.

In at least one representative embodiment, each of the policy tables may include rules for any of (i) handling specific sub-flows within a bearer, (ii) their relative priority with respect to each other, and (iii) their share of the QoS parameters.

In at least one representative embodiment, the method may include detecting, at one or more network nodes, which of the sub-flows at least one packet of the traffic belongs to.

In at least one representative embodiment, detecting which of the sub-flows at least one packet of the traffic belongs to may include performing packet inspection (e.g., DPI) using the application signatures.

In at least one representative embodiment, the method may include performing packet inspection to determine the sub-QCI of at least one packet of the traffic; and forwarding, in the user plane, the at least one packet of the traffic in accordance and the determined information.

In at least one representative embodiment, the method may include recovering the sub-QCI associated with at least one user-plane packet, and using the policy table to determine handling for such at least one user-plane packet.

In at least one representative embodiment, the method may include configuring any of network and RAN layers to handle interactions between an application and core network so as to provide the traffic at a granularity attendant to the sub-QCI level.

In at least one representative embodiment, the method may include configuring any of network and RAN layers to handle any of creation and removal of dedicated EPS and radio bearers in accordance with the QoS differentiation.

In at least one representative embodiment, the method may include assigning a sub-QCI (or intra-QCI) label to the flows based on a sub-priority of a sub-flow within each flow.

In at least one representative embodiment, the method may include assigning a sub-QCI (or intra-QCI) label may include assigning the sub-QCI (or intra-QCI) label using a tree-based priority mapping structure.

In at least one representative embodiment, the method may include the sub-QCI labels may be disposed on the tree-based priority mapping structure as leaves subordinate to the QCIs.

In at least one representative embodiment, the method may include provisioning one or more network nodes with mapping rules to support any of the sub-QCI label and the tree-based priority mapping structure.

In at least one representative embodiment, the tree-based priority mapping structure may be configured in accordance with QCI types, corresponding attributes of each of the QCI types, and example sub-QCI labels for the QCI types listed in Table 2.

In at least one representative embodiment, the method may include extracting sub-QCI information from a user-plane packet.

In at least one representative embodiment, extracting sub-QCI information from the user-plane packet may be carried out by one or more network nodes.

In at least one representative embodiment, the method may include deriving sub-QCI information by performing deep packet inspection using an application-specific signature.

In at least one representative embodiment, deriving the sub-QCI information may be carried out by one or more network nodes.

In at least one representative embodiment, the method may include using sub-QCI information for any of scheduling and radio resource management (RRM) decisions.

In at least one representative embodiment, the method may include using sub-QCI information for traffic shaping.

In at least one representative embodiment, the method may include using sub-QCI information for deciding which frames or other form of the traffic to drop.

In at least one representative embodiment, values of the information associated with the sub-QCI may be indicative of relative priority and/or drop precedence of packets within any of the same bearer and the same QCI level.

In at least one representative embodiment, the sub-QCI may be associated with an individual maximum bit rate (MBR).

In at least one representative embodiment, the sub-QCI may be associated with a wildcard that indicates that at least a portion of the traffic may be allocated resources not consumed by other higher-precedence sub-flows.

In at least one representative embodiment, a method may include managing first and second flows concurrently.

In at least one representative embodiment, the first flow may be allocated wireless system resources at a QCI level, and the second flow may be allocated resources at a sub-QCI level.

In at least one representative embodiment, managing first and second flows concurrently may include deriving first and second sets of QoS rules for the first and second flows, respectively.

In at least one representative embodiment, deriving first and second sets of QoS rules may occur during bearer setup.

In at least one representative embodiment, the first set of QoS rules may be for a QCI, and the second set of QoS rules may be for both a QCI and a sub-QCI.

In at least one representative embodiment, managing first and second flows concurrently may include applying the first and second sets of QoS rules to the first and second flows.

In at least one representative embodiment, managing first and second flows concurrently may include performing service differentiation at the QCI level for the first and second flows.

In at least one representative embodiment, managing first and second flows concurrently may include performing service differentiation at the sub-QCI level for the second flow.

In at least one representative embodiment, managing first and second flows concurrently may include performing active queue management for any of the first and second flows.

In at least one representative embodiment, performing active queue management for any of the first and second flows may include performing active queue management for the second flow in accordance with the sub-QCI information.

In at least one representative embodiment, the method may include allocating wireless system resources according to a measure of QoE.

In at least one representative embodiment, the QoE may be determined based in part on subjective dynamic parameters.

In at least one representative embodiment, the method may include a WTRU obtaining measures of subjective dynamic parameters and/or providing them to any of a RAN element and a core network element.

In at least one representative embodiment, the QoE may be based in part on one or more of the following parameters: type of video packet (e.g., temporal layers in hierarchical P), delay jitter, motion (between the UE and the end user), illumination/lighting, end user feedback, device information: display type, display size, viewing angle, and viewing distance.

In at least one representative embodiment, the method may include a first WTRU informing a second WTRU of a desired QoE.

In at least one representative embodiment, the method may include the first WTRU providing measures of subjective dynamic parameters to a first network, and/or obtaining a QoE level.

In at least one representative embodiment, the method may include the second WTRU determining if the QoE can be supported by a second network.

In at least one representative embodiment, the wireless system resources may be allocated by a core network element.

In at least one representative embodiment, the wireless system resources may be allocated by an edge network element.

In at least one representative embodiment, a method may include calculating a QoE estimate based on one or more of the following parameters: packet loss rate, packet delay, delay threshold, bit rate, frame rate, viewing distance, viewing angle, ambient lighting, display size.

In at least one representative embodiment, one or more of the parameters are weighted according to a relative measure of importance.

In at least one representative embodiment, the calculation may include a step function based on a difference between a packet delay and a packet threshold.

In at least one representative embodiment, a method may include sending a QoE request to a CSCF.

In at least one representative embodiment, the method may include obtaining an acceptable QoE from a CSCF.

In at least one representative embodiment, the method may include transmitting and end-to-end QoE message.

In at least one representative embodiment, the QoE request may includes one or more of the following parameters: a video application identifier, one or more available codecs, device data regarding display (type and/or size), environmental conditions (ambient lighting and/or viewing angle and/or viewing distance), a desired QoE level.

In at least one representative embodiment, the CSCF may contact a PCRF.

In at least one representative embodiment, a method may include receiving an end-to-end QoE request message from a first WTRU on a first network at a second WTRU.

In at least one representative embodiment, the method may include responsively obtaining an acceptable QoE level at the second WTRU from the second network.

In at least one representative embodiment, the method may include, after receiving the QoE request, determining available QoE based on evaluating local conditions including one or more of the following parameters: viewing angle, lighting conditions, device capabilities.

In at least one representative embodiment, the method may include obtaining parameter values from a user interface.

In at least one representative embodiment, the method may include re-evaluating an achievable end-to-end QoE periodically or based on an event trigger.

In at least one representative embodiment, the event trigger may be a change in the ambient lighting condition.

In at least one representative embodiment, the method may include using QoE feedback and QoE parameters values to alter a resource allocation strategy for a particular end user.

In at least one representative embodiment, the QoE feedback may indicate an increase in resolution.

In at least one representative embodiment, the method may include a network changes its current resource allocation to increase the throughput in view of the indication of an increase in resolution.

In at least one representative embodiment, the change in resource allocation strategy may be passed to the resource allocation algorithm and additional LTE resource blocks may be allocated to the logical channels.

In at least one representative embodiment, the QoE feedback may indicate an increase in resolution a resource allocation algorithm may partition logical channels into two sets: a first set of under-served logical channels, and a second set of over-served logical channels.

In at least one representative embodiment, the QoE feedback may indicate an increase in resolution the resource allocation algorithm may allocates resources, such as PRBs in LTE, for logical channels associated with the under-served set, and then to those in the over-served set.

In at least one representative embodiment, an apparatus, which may include any of receiver, transmitter and processor, is configured to perform a method as in at least one of the preceding the representative embodiments.

In at least one representative embodiment, a system may be configured to perform a method as in at least one of the preceding representative embodiments.

In at least one representative embodiment, a tangible computer readable storage medium may have stored thereon computer executable instructions for performing a method as in at least one of the preceding representative embodiments.

CONCLUSION

Although features and elements are provided above in particular combinations, one of ordinary skill in the art will appreciate that each feature or element can be used alone or in any combination with the other features and elements. In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the provided methods.

No element, act, or instruction used in the description of the present application should be construed as critical or essential to the invention unless explicitly provided as such. Also, as used herein, the articles "a" and "an" are intended to include one or more items. For example, the article "an" in the phrase "in an embodiment" is intended to include, for example, "in a single embodiment", "in multiple embodiments", "in an embodiments" and/or "in all embodiments." Where only one item is intended, the term "single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

Moreover, the claims should not be read as limited to the provided order or elements unless stated to that effect. In addition, use of the terms "means for" in any claim is intended to invoke 35 U.S.C. §112, ¶6 or means-plus-function claim format, and any claim without the terms "means for" is not so intended.

What is claimed is:

1. A method implemented in a base station, the method comprising:
   receiving a user plane packet via a single tunnel established between the base station and a core network entity for a single packet data network connection, wherein the user plane packet comprises a header encapsulating a network layer packet associated to one particular traffic sub-class of various differentiated traffic sub-classes mapped to the tunnel, and wherein the user plane packet is extracted from a transport level packet having a header including an indication of a transport level quality of service (QoS) classification;
   obtaining, from the header of the user plane packet, an indicator indicative of a particular policy of a plurality of policies for handling the various differentiated traffic sub-classes mapped to the tunnel; and
   applying the particular policy on the received user plane packet.

2. The method of claim 1, further comprising: receiving the plurality of policies from any of a policy and charging rules function (PCRF) and an access network discovery and selection function (ANDSF).

3. The method of claim 1, wherein the indicator is included in the header of the user plane packet responsive to user plane congestion.

4. The method of claim 1, wherein the plurality of policies comprise one or more QoS enforcement policies.

5. The method of claim 4, wherein the one or more QoS enforcement policies specify various traffic shaping rules.

6. The method of claim 1, wherein applying the particular policy on the received user plane packet comprises any of:
   (i) delaying scheduling of the network layer packet on condition that the indicator is indicative of the particular policy that specifies the particular traffic sub-class is subordinate to another of the various differentiated traffic sub-classes;
   (ii) dropping any of the user plane packet and the network layer packet on condition that the indicator is indicative of the particular policy that specifies the particular traffic sub-class is subordinate to another of the various differentiated traffic sub-classes;
   (iii) scheduling the network layer packet ahead of other traffic associated with another of the various differentiated traffic sub-classes on condition that the indicator is indicative of the particular policy that specifies the particular traffic sub-class is not subordinate to the other traffic sub-class;
   (iv) performing queue management to de-queue traffic associated with the particular traffic sub-class other than the network layer packet on condition that the indicator is indicative of the particular policy that specifies the particular traffic sub-class is subordinate to another of the various differentiated traffic sub-classes;
   (v) performing queue management to en-queue the network layer packet on condition that the indicator is indicative of the particular policy that specifies the particular traffic sub-class is not subordinate to another of the various differentiated traffic sub-classes;
   (vi) performing queue management to de-queue traffic associated with another of the various differentiated traffic sub-classes on condition that the indicator is indicative of the particular policy that specifies the other traffic sub-class is subordinate to the particular traffic sub-class; and (vii) performing queue management to en-queue the network layer packet on condition that the indicator is indicative of the particular policy that specifies the particular traffic sub-class is subordinate to another of the various differentiated traffic sub-classes.

7. The method of claim 1, wherein applying the particular policy on the received user plane packet comprises: applying the particular policy responsive to user plane congestion.

8. The method of claim 1, further comprising: detecting user plane congestion.

9. The method of claim 8, wherein applying the particular policy comprises: applying the particular policy responsive to the user plane congestion.

10. The method of claim 1, further comprising: receiving an indication of user plane congestion.

11. The method of claim 10, wherein applying the particular policy on the received user plane packet comprises: applying the particular policy responsive to the indication of the user plane congestion.

12. The method of claim 10, wherein the indication of the user plane congestion being is received by the base station via a wireless medium.

13. The method of claim 1, wherein the network layer packet is part of network layer traffic from a single application, and wherein the network layer traffic is differentiated into the particular traffic sub-class and another of the various differentiated traffic sub-classes.

14. The method of claim 13, wherein the network layer traffic comprises first and second flows, wherein the first flow is differentiated into the particular traffic sub-class, and wherein the second flow is differentiated into the other traffic sub-class.

15. The method of claim 1, further comprising:
receiving information for configuring the base station with the plurality of policies for handling various differentiated traffic sub-classes.

16. The method of claim 15, wherein the information for configuring the base station with the plurality of policies is received in connection with establishment of the single packet data network connection.

17. The method of claim 15, wherein the information for configuring the base station with the plurality of policies is received after establishment of the single packet data network connection.

18. A base station comprising:
a processor configured to:
receive a user plane packet via a single tunnel established between the base station and a core network entity for a single packet data network connection, wherein the user plane packet comprises a header encapsulating a network layer packet associated to one particular traffic sub-class of various differentiated traffic sub-classes mapped to the tunnel, and wherein the user plane packet is extracted from a transport level packet having a header including an indication of a transport level quality of service (QoS) classification;
obtain, from the header of the user plane packet, an indicator indicative of a particular policy of a plurality of policies for handling the various differentiated traffic sub-classes mapped to the tunnel; and
apply the particular policy on the received user plane packet.

19. The base station of claim 18, wherein the processor is configured to receive the plurality of policies from any of a policy and charging rules function (PCRF) and an access network discovery and selection function (ANDSF).

20. The base station of claim 18, wherein the indicator is included in the header of the user plane packet responsive to user plane congestion.

21. The base station of claim 18, wherein the plurality of policies comprise one or more QoS enforcement policies.

22. The base station of claim 21, wherein the one or more QoS enforcement policies specify various traffic shaping rules.

23. The base station of claim 18, wherein the processor being configured to apply the particular policy on the received user plane packet comprises any of:

(i) the processor being configured to delay scheduling of the network layer packet on condition that the indicator is indicative of the particular policy that specifies the particular traffic sub-class is subordinate to another of the various differentiated traffic sub-classes;

(ii) the processor being configured to drop any of the user plane packet and the network layer packet on condition that the indicator is indicative of the particular policy that specifies the particular traffic sub-class is subordinate to another of the various differentiated traffic sub-classes;

(iii) the processor being configured to schedule the network layer packet ahead of other traffic associated with another of the various differentiated traffic sub-classes on condition that the indicator is indicative of the particular policy that specifies the particular traffic sub-class is not subordinate to the other traffic sub-class;

(iv) the processor being configured to perform queue management to de-queue traffic associated with the particular traffic sub-class other than the network layer packet on condition that the indicator is indicative of the particular policy that specifies the particular traffic sub-class is subordinate to another of the various differentiated traffic sub-classes;

(v) the processor being configured to perform queue management to en-queue the network layer packet on condition that the indicator is indicative of the particular policy that specifies the particular traffic sub-class is not subordinate to another of the various differentiated traffic sub-classes;

(vi) the processor being configured to perform queue management to de-queue traffic associated with another of the various differentiated traffic sub-classes on condition that the indicator is indicative of the particular policy that specifies the other traffic sub-class is subordinate to the particular traffic sub-class; and (vii) the processor being configured to perform queue management to en-queue the network layer packet on condition that the indicator is indicative of the particular policy that specifies the particular traffic sub-class is subordinate to another of the various differentiated traffic sub-classes.

24. The base station of claim 18, wherein the processor is configured to apply the particular policy responsive to user plane congestion.

25. The base station of claim 18, wherein the processor is configured to detect user plane congestion.

26. The base station of claim 25, wherein the processor is configured to apply the particular policy responsive to the user plane congestion.

27. The base station of claim 18, wherein the processor is configured to receive an indication of user plane congestion.

28. The base station of claim 27, wherein the processor is configured to apply the particular policy responsive to the indication of user plane congestion.

29. The base station of claim 27, wherein the indication of the user plane congestion being is received by the base station via a wireless medium.

30. The base station of claims 18, wherein the network layer packet is part of network layer traffic from a single application, and wherein the network layer traffic is differentiated into the particular traffic sub-class and another of the various differentiated traffic sub-classes.

31. The base station of claim 30, wherein the network layer traffic comprises first and second flows, wherein the first flow is differentiated into the particular traffic sub-class, and wherein the second flow is differentiated into the other traffic sub-class.

32. The base station of claim 18, wherein the processor is configured to:
receive information for configuring the base station with the plurality of policies for handling various differentiated traffic sub-classes.

33. The base station of claim 32, wherein the information for configuring the base station with the plurality of policies is received in connection with establishment of the single packet data network connection.

34. The base station of claim 32, wherein the information for configuring the base station with the plurality of policies is received after establishment of the single packet data network connection.

\* \* \* \* \*